United States Patent
Jensen et al.

(10) Patent No.: US 11,115,927 B2
(45) Date of Patent: Sep. 7, 2021

(54) METHODS AND APPARATUS TO CONTROL COMMUNICATION DATA RATES OF LOW-ENERGY DEVICES

(71) Applicant: Fisher Controls International LLC, Marshalltown, IA (US)

(72) Inventors: Kurtis K. Jensen, Marshalltown, IA (US); Kenneth William Junk, Marshalltown, IA (US); Gregory Robert Bulleit, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 126 days.

(21) Appl. No.: 16/372,364

(22) Filed: Apr. 1, 2019

(65) Prior Publication Data

US 2019/0246353 A1 Aug. 8, 2019

Related U.S. Application Data

(63) Continuation-in-part of application No. 16/144,748, filed on Sep. 27, 2018, now Pat. No. 10,855,367.
(Continued)

(51) Int. Cl.
*H04W 52/02* (2009.01)
*G06F 9/48* (2006.01)
(Continued)

(52) U.S. Cl.
CPC ...... *H04W 52/0225* (2013.01); *G05B 19/042* (2013.01); *G06F 9/4893* (2013.01);
(Continued)

(58) Field of Classification Search
CPC ... H04W 52/0225; H04W 4/80; H04W 12/10; G05B 19/042; G05B 2219/25186;
(Continued)

(56) References Cited

U.S. PATENT DOCUMENTS

| | | | |
|---|---|---|---|
| 5,870,685 A * | 2/1999 | Flynn | H02J 7/0063 455/573 |
| 6,434,157 B1 | 8/2002 | Dube' et al. | |

(Continued)

FOREIGN PATENT DOCUMENTS

| | | |
|---|---|---|
| DE | 102014106727 | 11/2015 |
| EP | 3255906 | 12/2017 |
| WO | WO-2016/073215 A1 | 5/2016 |

OTHER PUBLICATIONS

International Search Report received for PCT/US2019/051467 dated Feb. 13, 2020.
(Continued)

*Primary Examiner* — Zhitong Chen
(74) *Attorney, Agent, or Firm* — Hanley, Flight & Zimmerman, LLC

(57) ABSTRACT

Methods, apparatus, and articles of manufacture are disclosed to control communication data rates of low-energy devices. An example apparatus includes a Bluetooth Low Energy (BLE) radio, and a power manager to determine whether to divide a first computation task into at least a second and a third computation task based on (1) energy stored in a power supply associated with the BLE radio and (2) a charging rate of the power supply, and when the first computation task is to be executed by the BLE radio and the first computation task is divided based on the determination, instruct the BLE radio to enter a sleep mode after the second computation task is executed, and invoke the BLE radio to transition from the sleep mode to an operating mode to execute the third computation task, the invoking in response to a measurement associated with the power supply satisfying an energy threshold.

27 Claims, 38 Drawing Sheets

Related U.S. Application Data

(60) Provisional application No. 62/567,051, filed on Oct. 2, 2017.

(51) Int. Cl.
 *G05B 19/042* (2006.01)
 *H04W 4/80* (2018.01)
 *H04L 12/801* (2013.01)
 *H04B 1/40* (2015.01)
 *H04L 29/08* (2006.01)
 *H04L 29/06* (2006.01)
 *H04W 12/10* (2021.01)

(52) U.S. Cl.
 CPC ............... *H04B 1/40* (2013.01); *H04L 47/14* (2013.01); *H04L 67/12* (2013.01); *H04W 4/80* (2018.02); *G05B 2219/25186* (2013.01); *G05B 2219/2639* (2013.01); *H04L 69/18* (2013.01); *H04W 12/10* (2013.01)

(58) Field of Classification Search
 CPC . G05B 2219/2639; G06F 9/4893; H04B 1/40; H04L 47/14; H04L 69/18
 See application file for complete search history.

(56) References Cited

U.S. PATENT DOCUMENTS

| | | | |
|---|---|---|---|
| 2004/0204181 A1* | 10/2004 | Cromer | H04W 52/0277 455/574 |
| 2005/0240675 A1 | 10/2005 | Caspers et al. | |
| 2010/0190442 A1 | 7/2010 | Citrano, III et al. | |
| 2012/0210325 A1* | 8/2012 | de Lind van Wijngaarden | G06F 1/329 718/103 |
| 2013/0086149 A1 | 4/2013 | Shi et al. | |
| 2013/0122804 A1* | 5/2013 | Narendra | H04W 52/0277 455/41.1 |
| 2017/0083068 A1 | 3/2017 | Kashyap et al. | |
| 2017/0099527 A1 | 4/2017 | Propst, Jr. et al. | |
| 2017/0359675 A1* | 12/2017 | Gopalakrishnan | H04W 4/80 |
| 2019/0103914 A1 | 4/2019 | Junk et al. | |

OTHER PUBLICATIONS

Written Opinion received for PCT/US2019/051467, dated Feb. 13, 2020.
International Searching Authority "International Search Report," issued in connection with International Patent Application No. PCT/US2018/053497, dated Jan. 10, 2019 (6 pages).
International Searching Authority "Written Opinion," issued in connection with International Patent Application No. PCT/US2018/053497, dated Jan. 10, 2019 (8 pages).
United States Patent and Trademark Office, "Non-Final Office Action", issued in connection with U.S. Appl. No. 16/144,748, dated Oct. 9, 2019, (7 pages).
United States Patent and Trademark Office, "Final Office Action", issued in connection with U.S. Appl. No. 16/144,748, dated Feb. 10, 2020, (10 pages).
United States Patent and Trademark Office, "Advisory Action", issued in connection with U.S. Appl. No. 16/144,748, dated Apr. 20, 2020, (2 pages).
United States Patent and Trademark Office, "Notice of Allowance", issued in connection with U.S. Appl. No. 16/144,748, dated Jul. 29, 2020, (8 pages).
Bluetooth, "Specification of the Bluetooth System," Version 4.2, Dec. 2, 2014 (2772 pages).

* cited by examiner

CHARACTERISTICS WITH COMBINED TX AND RX DATA FLOWS

| ITEM | CHARACTERISTIC | DATA FLOW | CHARACTERISTIC PROPERTIES |
|---|---|---|---|
| 1 | INDUSTRIAL PROTOCOL | CLIENT TO FIELD DEVICE AND FIELD DEVICE TO CLIENT | WRITE WITHOUT RESPONSE / NOTIFY |
| 2 | ANCILLARY COMMANDS | CLIENT TO FIELD DEVICE AND FIELD DEVICE TO CLIENT | WRITE WITHOUT RESPONSE / NOTIFY |
| 3 | FLOW CONTROL | CLIENT | WRITE WITHOUT RESPONSE / NOTIFY |

920 — ITEM 1
930 — ITEM 2
940 — ITEM 3

CHARACTERISTICS WITH INDIVIDUAL TX AND RX DATA FLOWS

| ITEM | CHARACTERISTIC | DATA FLOW | CHARACTERISTIC PROPERTIES |
|---|---|---|---|
| 1 | INDUSTRIAL PROTOCOL RX | CLIENT TO FIELD DEVICE | WRITE WITH RESPONSE, WRITE WITHOUT RESPONSE |
| 2 | INDUSTRIAL PROTOCOL TX | FIELD DEVICE TO CLIENT | READ / NOTIFY |
| 3 | ANCILLARY COMMANDS RX | CLIENT TO FIELD DEVICE | WRITE WITH RESPONSE, WRITE WITHOUT RESPONSE |
| 4 | ANCILLARY COMMANDS TX | FIELD DEVICE TO CLIENT | READ / NOTIFY |
| 5 | FLOW CONTROL RX | CLIENT TO FIELD DEVICE | WRITE WITH RESPONSE, WRITE WITHOUT RESPONSE |
| 6 | FLOW CONTROL TX | FIELD DEVICE TO CLIENT | READ / NOTIFY |

962 — ITEM 1
964 — ITEM 2
966 — ITEM 3
968 — ITEM 4
970 — ITEM 5
972 — ITEM 6

ATTRIBUTES FOR COMBINED TX / RX CHARACTERISTICS

| PROPERTY | VALUE | NOTES |
|---|---|---|
| DECLARATION — 1010 | | |
| HANDLE (1012) | 0xNNNN | |
| TYPE (16-BIT UUID) (1014) | 0x2803 | CHARACTERISTIC DECLARATION |
| PERMISSIONS (1016) | GATT_PERMIT_READ | |
| PROPERTIES (1018) | GATT_PROP_WRITE_NO_RSP \| GATT_PROP_NOTIFY | |
| VALUE — 1020 | | |
| HANDLE (1012) | 0xNNNN | |
| TYPE (128-BIT UUID) (1014) | zz:zz: ... :zz | CHARACTERISTIC UUID |
| PERMISSIONS (1016) | GATT_PERMIT_WRITE_NO_RSP | |
| DATA (1019) | UINT8[244] ARRAY | |
| DESCRIPTOR — 1030 | | |
| HANDLE (1012) | 0xNNNN | |
| TYPE (128-BIT UUID) (1014) | 0x2902 | CLIENT CHARACTERISTIC CONFIGURATION DESCRIPTOR (CCCD) |
| PERMISSIONS (1016) | GATT_PERMIT_READ \| GATT_PERMIT_WRITE | |
| DATA (1019) | 0x0000 NOTIFICATIONS DISABLED<br>0x0001 NOTIFICATIONS ENABLED | |

FIG. 10

ATTRIBUTES FOR RX CHARACTERISTICS

| PROPERTY | 922 VALUE | NOTES |
|---|---|---|
| DECLARATION 1010 | | |
| HANDLE (1012) | 0xNNNN | CHARACTERISTIC DECLARATION |
| TYPE (16-BIT UUID) (1014) | 0x2803 | |
| PERMISSIONS (1016) | GATT_PERMIT_READ | |
| PROPERTIES (1018) | GATT_PROP_NOTIFY<br>GATT_PROP_WRITE_NO_RSP | |
| VALUE 924 1020 | | |
| HANDLE (1012) | 0xNNNN | CHARACTERISTIC UUID |
| TYPE (128-BIT UUID) (1014) | xx:xx: ... :xx | |
| PERMISSIONS (1016) | GATT_PERMIT_WRITE<br>GATT_PERMIT_WRITE_NO_RSP | |
| DATA (1018) | UINT8[244] ARRAY | |

ATTRIBUTES TX CHARACTERISTICS — 1200

| PROPERTY | VALUE | NOTES |
|---|---|---|
| DECLARATION — 922 | | |
| HANDLE (1012) | 0xNNNN | ←1010 |
| TYPE (16-BIT UUID) (1014) | 0x2803 | CHARACTERISTIC DECLARATION |
| PERMISSIONS (1016) | GATT_PERMIT_READ | |
| PROPERTIES (1018) | GATT_PROP_READ \| GATT_PROP_NOTIFY | |
| VALUE — 924 | | |
| HANDLE (1012) | 0xNNNN | ←1020 |
| TYPE (128-BIT UUID) (1014) | yy:yy: ... :yy | CHARACTERISTIC UUID |
| PERMISSIONS (1016) | GATT_PERMIT_READ | |
| DATA (1018) | UINT8[244] ARRAY | |
| DESCRIPTOR — 926 | | |
| HANDLE (1012) | 0xNNNN | |
| TYPE (128-BIT UUID) (1014) | 0x2902 | ←1030 CLIENT CHARACTERISTIC CONFIGURATION DESCRIPTOR (CCCD) |
| PERMISSIONS (1016) | GATT_PERMIT_READ \| GATT_PERMIT_WRITE | |
| DATA (1018) | 0x0000 NOTIFICATIONS DISABLED<br>0x0001 NOTIFICATIONS ENABLED | |

FIG. 12

| SERVICE | USER | CRYPTO OFFICER | UNAUTHENTICATED |
|---|---|---|---|
| SYSTEM | | | |
| PING | ✓ | | |
| REBOOT | ✓ | | |
| FACTORY DEFAULT | ✓ | | |
| GET DEVICE NAME | ✓ | ✓ | |
| SET DEVICE NAME | ✓ | | |
| GET INDUSTRIAL PROTOCOL TYPE | ✓ | | |
| GET FIRMWARE REVISION | ✓ | | |
| GET ALERTS | ✓ | | |
| SET RADIO PARAMS | ✓ | | |
| OTA RADIO FW DOWNLOAD | ✓ | ✓ | |
| KILL RADIO | ✓ | ✓ | |
| POSITIVE DEVICE IDENTIFICATION | ✓ | ✓ | |
| GAP | | | |
| GET BLE ADDRESS | ✓ | ✓ | |
| DISCONNECT | ✓ | ✓ | ✓ |
| HW AUTHENTICATION | | | |
| SET CHALLENGE MESSAGE | ✓ | ✓ | ✓ |
| GET PUBLIC KEY | ✓ | ✓ | ✓ |
| GET SIGNATURE | ✓ | ✓ | ✓ |
| LOGIN | | | |
| SET AUTHENTICATION TOKEN | | | ✓ |
| DH KEY EXCHANGE | | | |
| GET DH PUBLIC KEY A | | | ✓ |
| GET DH PUBLIC KEY B | | | ✓ |
| OTAR | | | |
| ENABLE | ✓ | | |
| REKEY | ✓ | ✓ | |
| SET DEVICE UID | ✓ | ✓ | |
| GET DEVICE UID | ✓ | ✓ | |
| DELETE KEY | ✓ | ✓ | |
| SET OTAR PROPERTIES | ✓ | ✓ | |
| MANUFACTURER SPECIFIC | | | |
| MFR_SPECIFIC_0 | ✓ | | |
| MFR_SPECIFIC_1 | ✓ | | |
| ... | ... | | |
| MFR_SPECIFIC_31 | ✓ | | |

FIG. 13A

SYSTEM_PING PROTOCOL FORMAT 1350

| TYPE | LENGTH | OP CODE | PAYLOAD | |
|---|---|---|---|---|
| | | | BYTE INDEX | VALUE |
| CMD | 0x00 | 0x00 | | |
| RSP | 0x06 | 0x00 | [0 - 3] | UNIT32 – SECONDS SINCE REBOOT |
| | | | [4 - 5] | UNIT16 – FRACTIONS OF A SECOND (1/32768 SEC) |

1360 — CMD
1370 — RSP

FIG. 13B

METHODS AND APPARATUS TO CONTROL COMMUNICATION DATA RATES OF LOW-ENERGY DEVICES

RELATED APPLICATION

This patent arises from a continuation-in-part of U.S. patent application Ser. No. 16/144,748, which was filed on Sep. 27, 2018, which arises from an application claiming the benefit of U.S. Provisional Patent Application Ser. No. 62/567,051, which was filed on Oct. 2, 2017. U.S. patent application Ser. No. 16/144,748 and U.S. Provisional Patent Application Ser. No. 62/567,051 are hereby incorporated herein by reference in their entirety. Priority to U.S. patent application Ser. No. 16/144,748 and U.S. Provisional Patent Application Ser. No. 62/567,051 are hereby claimed.

FIELD OF THE DISCLOSURE

This disclosure relates generally to process control systems, and, more particularly, to methods and apparatus to control communication date rates of low-energy devices.

BACKGROUND

Industrial communication protocols are implemented to manage industrial process control operations associated with field devices and other types of process equipment located in industrial process control environments. Examples of such industrial communication protocols include the Highway Addressable Remote Transducer (HART) communication protocol, the PROFIBUS communication protocol, the FOUNDATION Fieldbus communication protocol, the MODBUS communication protocol, etc.

Bluetooth Low Energy (BLE) communication protocols are implemented as wireless personal area network communication protocols that facilitate wireless communications between BLE-compatible devices. Examples of such BLE-compatible devices commonly include desktop computers, laptop computers, tablets, smartphones, and personal digital assistants (PDAs). Conventionally, data formatted according to BLE communication protocols is not compatible with data formatted according to the above-described industrial communication protocols.

SUMMARY

Methods and apparatus to control communication data rates of low-energy devices are disclosed herein. In some disclosed examples, an apparatus to manage a power profile of a network bridge of a field device in a process control environment is disclosed. The example apparatus includes a Bluetooth Low Energy (BLE) radio, and a power manager to determine whether to divide a first computation task into at least a second computation task and a third computation task based on (1) energy stored in a power supply associated with the BLE radio and (2) a charging rate of the power supply, and when the first computation task is to be executed by the BLE radio and the first computation task is divided based on the determination: instruct the BLE radio to enter a sleep mode after the second computation task is executed, and invoke the BLE radio to transition from the sleep mode to an operating mode to execute the third computation task, the invoking in response to a measurement associated with the power supply satisfying an energy threshold.

In some disclosed examples, a non-transitory computer readable storage medium comprising instructions is disclosed. The example instructions, when executed, cause at least one processor of a network bridge of a field device in a process control environment to at least determine whether to divide a first computation task into at least a second computation task and a third computation task based on (1) energy stored in a power supply associated with a BLE radio of the network bridge and (2) a charging rate of the power supply, and when the first computation task is to be executed by the BLE radio and the first computation task is divided based on the determination: instruct the BLE radio to enter a sleep mode after the second computation task is executed, and invoke the BLE radio to transition from the sleep mode to an operating mode to execute the third computation task, the invoking in response to a measurement associated with the power supply satisfying an energy threshold.

In some disclosed examples, a method to manage a power profile of a network bridge of a field device in a process control environment is disclosed. The example method includes determining whether to divide a first computation task into at least a second computation task and a third computation task based on (1) energy stored in a power supply associated with a BLE radio of the network bridge and (2) a charging rate of the power supply, and when the first computation task is to be executed by the BLE radio and the first computation task is divided based on the determination: instructing the BLE radio to enter a sleep mode after the second computation task is executed, and invoking the BLE radio to transition from the sleep mode to an operating mode to execute the third computation task, the invoking in response to a measurement associated with the power supply satisfying an energy threshold.

BRIEF DESCRIPTION OF THE DRAWINGS

FIG. 9B is an example table of an example implementation of the manufacturer command service of FIG. 9A.

FIG. 9C is an example table of another example implementation of the manufacturer command service of FIG. 9A, where transmit and receive data flows are separate.

FIG. 10 is an example table depicting example attributes corresponding to an example characteristic of an example manufacturer command service, where the characteristic includes both example transmit characteristics and example receive characteristics.

FIG. 11 is an example table depicting example declaration attributes and example value attributes corresponding to a characteristic of an example manufacturer command service, where the characteristic separates example transmit characteristics and example receive characteristics.

FIG. 12 is an example table depicting example declaration attributes, example value attributes, and example descriptor attributes corresponding to a characteristic of an example manufacturer command service, where the characteristic separates example transmit characteristics and example receive characteristics.

FIG. 13A is an example table depicting example services corresponding to example Application Program Interface (API) commands.

FIG. 13B is an example table depicting an example format of an example API command and an example API response.

Figure 1:
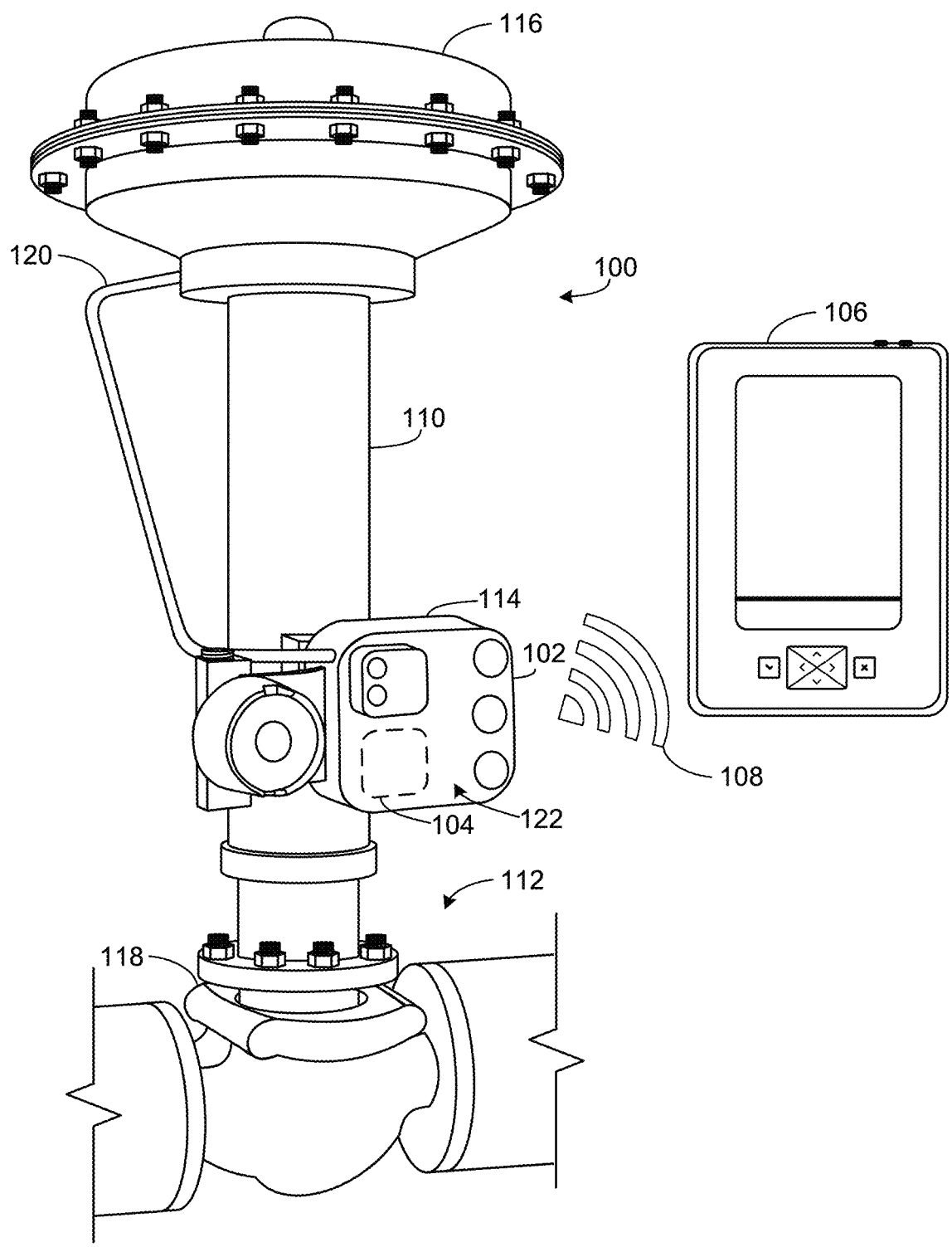
FIG. 1 is a schematic illustration of an example environment including an example field device having an example network bridge to bridge communications between the field device and an example remote device over an example BLE connection in accordance with the teachings of this disclosure.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, Bluetooth® technology has become increasingly utilized in industrial applications to facilitate communication between devices. Bluetooth is a wireless technology standard for exchanging data over short distances using short-wavelength ultra-high frequency radio waves in the industrial, scientific, and medical (ISM) radio bands (e.g., 2.4 to 2.4835 GHz). Conventional methods of implementing Bluetooth in industrial applications such as process control systems include communicatively coupling an industrial protocol communicator such as a Highway Addressable Remote Transducer (HART) modem to a typical Bluetooth radio (e.g., a Bluetooth radio whose operation is based on the Bluetooth Core Specification Version 5.0).

For example, a field device (e.g., a field device with a sufficient power budget to operate a Bluetooth radio) may encapsulate HART information within a Bluetooth packet and transmit the Bluetooth packet to a remote client, where the remote client receives the information via a typical Bluetooth radio communicatively coupled to a main processor via a bus. In such examples, the typical Bluetooth radios may transmit or receive information without concern for the available power budget. As used herein, the terms "power accumulator" and "power budget" are used interchangeably and refer to a quantity of electrical energy (e.g., electrical energy based on a voltage, a current, etc., and/or a combination thereof associated with an energy storage device) available to be used by a component of the field device to perform an operation (e.g., a computation task, a process control operation, a BLE operation, a communication operation, etc.) at a specified rate. For example, the power budget can correspond to an energy quantity that can be used to perform an operation for a given or specified time duration. In such examples, the remote client can transmit information using an entirety of the allowable power budget to increase a range and/or a data throughput of the typical Bluetooth radio.

Typically, standard Bluetooth radios have not been integrated into certain process control system field devices such as valve positioners or other low-power instruments due to power budget constraints. For example, a valve positioner may operate on a power budget based on a 4-20 milliamp (mA) current loop provided by an external data acquisition and control system. In such an example, the valve positioner may utilize a majority of the available power budget to perform a primary function (e.g., a primary process control function) of the valve positioner. In some examples, power constraints can be imposed on standard Bluetooth radios when the valve positioner utilizes the majority of the available power budget. In some examples, a standard Bluetooth integrated circuit utilizes approximately 150 milliwatts (mW) of power to function compared to an example power budget of less than 3 mW available on the valve positioner for a potential Bluetooth interface. For example, there may not be enough energy available in the power budget of the valve positioner for the standard Bluetooth radio to use in providing an efficient communication pathway between the field device and another device (e.g., another field device, a remote device, etc.). As a result, a standard Bluetooth radio may not be an ideal choice for a low-powered field device to use for communication operations with another device based on a constrained or limited power budget of the low-powered field device.

Bluetooth Low Energy (Bluetooth LE or BLE) is a wireless communication technology that operates in a communication or spectrum range of 2.4-2.4835 GHz. For example, BLE radio frequency (RF) channels are a subset of classic Bluetooth channels BLE is intended to provide considerably reduced power consumption and cost while maintaining a similar communication range. BLE is structurally different from and is not compatible with classic Bluetooth. For example, BLE uses a different set of channels compared to classic Bluetooth. In such examples, BLE can have 40 2-MHz channels compared to classic Bluetooth's 79 1-MHz channels. In other examples, BLE does not support Serial Port Profile (SPP) which is used to replace a serial communication interface (e.g., RS-232 communication, RS-485 communication, etc.).

Examples disclosed herein use BLE to form a communication bridge between one or more low-powered devices to improve interoperability of communication, reduce cost and complexity of performing the communication, and to increase a speed of the communication between the devices. In some disclosed examples, the BLE bridge apparatus facilitates communication between one or more client devices (e.g., an Emerson AMS TREX™, a mobile device, etc.) and a server device (e.g., a field device, a controller, a valve positioner, etc.). For example, the BLE bridge apparatus may be coupled and/or communicatively coupled to a field device such as a local controller, a headless controller (e.g., a PLC-type device), a valve positioner, a pressure transmitter, a temperature transmitter, a level transmitter, etc. For example, the BLE bridge apparatus may be used to establish peer-to-peer communications with one or more client devices, one or more field devices, etc., and/or a combination thereof.

In some disclosed examples, the field device is communicatively coupled to one or more remote devices such as the Emerson AMS Trex. For example, the remote device may include a process control related software application operating on a standard operating system (e.g., a Windows™-based operating system, an Apple macOS® operating system, an Android™ operating system, a Linux® operating system, etc.). In such examples, the remote device can communicate to the field device via BLE.

In some disclosed examples, the field device is communicatively coupled to one or more other field devices. For example, the field device may obtain information from the one or more other field devices via an industrial communication protocol and transmit the information to a remote device, a process control system, etc., via BLE or any other wired or wireless communication method. In some disclosed examples, the field device is communicatively coupled to the one or more other field devices via a wired or wireless industrial communication protocol such as a HART communication protocol, a WirelessHART (WiHART) communication protocol, a PROFIBUS communication protocol, a FOUNDATION Fieldbus communication protocol, or a MODBUS communication protocol. In some disclosed examples, the field device is communicatively coupled to the one or more other filed devices via the wired or wireless industrial communication protocol and via BLE.

Examples disclosed herein improve communication interoperability between devices because the BLE bridge apparatus can facilitate communication between (1) a field device using a conventional industrial communication protocol and (2) a remote device via BLE. Examples disclosed herein reduce cost and complexity because the BLE bridge apparatus can facilitate communication between field devices without additional specialized hardware to perform communication translation and transmission (e.g., an external communication gateway device and corresponding hardware such as a power supply, a circuit breaker, an enclosure, etc.).

Examples disclosed herein can be implemented in a software application layer above the physical hardware layer of a BLE radio (e.g., a BLE transceiver). The example BLE bridge apparatus can include the software application layer that corresponds to a software adaptation layer that can convert a standard supported industrial protocol to a compressed format or version for over-the-air (OTA) transmissions. In an example where a standard HART message is to be transmitted OTA, the software adaptation layer can strip out unnecessary data, such as the HART address, a checksum, etc., to generate a compressed or modified HART message and package the compressed HART message into the BLE format for transmission. In an example where the compressed HART message is to be received OTA, the software adaptation layer can reconstruct the HART message by adding back the previously removed HART address, checksum, etc. In such examples, one or both of the field device or the remote device can include the software adaptation layer.

Advantageously, the software adaptation layer can use standard industrial communication protocol messages, compress and/or otherwise modify the messages, and transmit the modified messages as standard BLE protocol data units (PDUs). Accordingly, the standard industrial communication protocol data payloads are unchanged and, thus, eliminate a need to develop custom software, individualized drivers, etc., for different hardware on different platforms. As a result, examples disclosed herein can improve interoperability between the remote device and the field device as the remote device can use any conventional industrial communication protocol, operating system, BLE radio, etc. The examples disclosed herein improve operation of the conventional operating system and the conventional BLE radio by providing additional functions, communication interoperability, communication flexibility, etc., compared to prior BLE systems.

In some disclosed examples, the BLE bridge apparatus facilitates a transmission of information from the field device to the remote device. The field device may support an industrial communication protocol such as HART protocol. For example, HART protocol defines a data packet to be structured based on the Bell 202 Modem Standard. As a result, HART data packet supporting information (e.g., a HART preamble, a HART address, etc.) do not need to be sent to the remote device via BLE. For example, the HART preamble is used for carrier detection and synchronization per the Bell 202 Modem Standard and does not need to be included in the BLE data packet since there are no Bell 202 modems to detect or synchronize. For example, the BLE bridge apparatus may receive a HART protocol data packet from the field device, remove HART protocol information from the HART protocol data packet, and transmit payload data (e.g., transmit only payload data) of the HART protocol data packet to the remote device via BLE. In such examples, the remote device can reconstruct the HART protocol data packet including the payload data and transmit the reconstructed HART protocol data packet to an application operating on the remote device (e.g., an application expecting and/or otherwise configured to obtain HART protocol data packets).

In some disclosed examples, the BLE bridge apparatus facilitates a transmission of information from the remote device to the field device. The example BLE bridge apparatus may identify one or more protocols supported by the field device. In response to receiving a receive request from the BLE radio of the field device, the BLE bridge apparatus determines whether the receive request corresponds to a protocol supported by the field device. In response to determining that the receive request corresponds to a supported protocol, the BLE bridge apparatus approves the receive request and receives one or more data packets from the remote device. The example BLE bridge apparatus removes BLE information from the received data packets, adds supported-protocol information (e.g., a HART protocol preamble, a HART protocol address, etc.) to the received data packets, and transmits the processed data packets to a microcontroller unit (MCU) of the field device via a universal asynchronous receiver-transmitter (UART) terminal, an inter-integrated circuit (I2C) bus, a serial peripheral interface (SPI) bus, etc. For example, the MCU may be one or more processors executing one or more process control operations (e.g., measuring a valve position, transmitting information via an industrial communication protocol, etc.) of the field device. In some disclosed examples, the BLE bridge apparatus removes BLE information from a data packet received from the remote device and transmits the data packet to the MCU of the field device without adding supported-protocol information to the data packet.

In some disclosed examples, receiving a data packet from the remote device with protocol information removed increases a data receiving rate based on a constrained power budget. For example, additional information (e.g., additional payload data) can be transmitted in place of the protocol information to the field device. In such examples, the removed protocol information can be header data. For example, headers for individual data payloads can be replaced with a single header, where additional data payloads can be concatenated to replace the removed headers and, thus, increase a payload-to-header ratio for BLE communication. In some disclosed examples, transmitting a data packet to the remote device with protocol information removed increases a data transmission rate based on the constrained power budget. For low-powered field devices where an available power budget is constrained, the example BLE bridge apparatus may reduce an amount of non-data payload information such as protocol information to increase the data transmission rate between the field device and the remote device. By increasing the amount of payload information to be included in the data packet, examples disclosed herein improve the efficiency of using a BLE radio to perform improved data transfer between devices compared to prior BLE systems. Accordingly, examples disclosed herein are directed to one or more improvements in the functioning of one or more processors associated with the BLE radio, the field device, and/or the remote device.

In some disclosed examples, the BLE bridge apparatus includes a power manager to facilitate execution of computation tasks based on a power budget. In some disclosed examples, the power budget is substantially limited (e.g., limited to a power budget of consuming 25 micro-Joules (uJ) per second (s), 75 uJ/s, 125 uJ/s, etc.). For example, the BLE bridge apparatus may be included in a field device operating in an explosive atmosphere environment where electrical equipment is power limited to prevent the generation of explosion-inducing sparks. In some disclosed examples, the power manager determines zero or more computation tasks (e.g., radio receptions or transmissions, device connection tasks, authentication and/or encryption tasks, etc.) to be executed by the BLE bridge apparatus based on available energy associated with the power budget. For example, the power manager may determine a quantity of energy that computation tasks in a computation queue can consume and/or a time to execute the computation tasks to determine a quantity of the computation tasks that can be completed based on the available power budget. In such examples, the power manager can determine that one or more computation tasks can be executed when a first threshold is satisfied indicative of the BLE bridge apparatus energy source having a sufficient voltage or stored energy quantity to execute the one or more computation tasks. In other examples, the power manager can determine that no computation tasks can be executed when a second threshold is not satisfied indicative of the BLE bridge apparatus energy source having an insufficient voltage or quantity of stored energy.

FIG. 1 is a schematic illustration of an example environment 100 including an example field device 102 having an example network bridge 104 (referred to herein as the BLE bridge 104, the BLE MCU 104, or the field device BLE MCU 104) to bridge communications between the field device 102 and an example remote device 106 over an example wireless connection 108 (referred to herein as the BLE network 108, the BLE connection 108, the BLE medium 108, etc.). The network bridge 104 can include one or more processors to execute a computation task in connection with communicating data through a BLE connection. For example, the network bridge 104 can include a first processor to execute a first computation task, such as generating a BLE packet. In such examples, the network bridge 104 can include a second processor (e.g., a BLE radio processor) to execute a second computation task, such as transmitting the BLE packet to a different device. In the illustrated example, the field device 102 is coupled to a fluid flow control assembly 110 operating in a process control environment 112. The fluid flow control assembly 110 of the illustrated example is a pneumatically actuated valve assembly. Alternatively, the fluid flow control assembly 110 may be any other type of process control related assembly (e.g., an electrically actuated valve assembly, a hydraulically actuated valve assembly, a motor, a pump, etc.).

In the illustrated example of FIG. 1, an enclosure 114 is coupled to the fluid flow control assembly 110, which includes at least an actuator 116 and a valve 118 (e.g., a butterfly valve, a globe valve, etc.). Although the BLE bridge 104 is included in the enclosure 114 in the illustrated example, alternatively the BLE bridge 104 may be located elsewhere (e.g., external to the enclosure 114, in a separate enclosure from the enclosure 114, etc.). The actuator 116 of the illustrated example is activated via changes in pneumatic pressure from a pneumatic tube connection 120. Alternatively, the actuator 116 may be activated via changes in an electrical signal from an electrical connection, a hydraulic flow from a hydraulic tube connection, etc.

In the illustrated example of FIG. 1, the field device 102 is a valve controller. Alternatively, the field device 102 may be a controller (e.g., a local single-loop process controller), a pressure transmitter, a temperature transmitter, a level transmitter, a pH transmitter, valve positioner, etc. The field device 102 of the illustrated example controls, measures, and/or monitors one or more process control operation(s) associated with the fluid flow control assembly 110. For example, the field device 102 may be implemented as a controller that controls, measures, and/or monitors the operation of the actuator 116 operatively coupled to the valve 118 and transmits the information corresponding to the operation to an external device such as the remote device 106. In such examples, the controller can control the operation of the actuator 116 and/or the position of the valve 118 (e.g., the extent to which the valve is opened or closed via the actuator 116).

In the illustrated example of FIG. 1, the field device 102 controls, measures, and/or monitors the one or more process control operation(s) associated with the fluid flow control assembly 110 (e.g., a process control operation of opening the valve 118, calibrating the valve 118, closing the valve 118, etc.) based on data (e.g., control commands, control signals, etc.) formatted according to an industrial communication protocol and communicated to and/or from the field device 102 over an industrial communication network. In some examples, the industrial communication protocol can be one of a HART communication protocol, a PROFIBUS communication protocol, a FOUNDATION Fieldbus communication protocol, or a MODBUS communication protocol. Alternatively, any other industrial communication protocol may be used.

In the illustrated example of FIG. 1, the field device 102 communicates with the remote device 106 using the BLE bridge 104 via the BLE connection 108. In FIG. 1, an example antenna 122 is embedded in and/or otherwise coupled to a panel (e.g., a front panel, a side panel, etc.) of the field device 102 (e.g., in a front panel of the enclosure 114). Alternatively, the antenna 122 may be coupled to any other position of the field device 102. In some examples, the field device 102 communicates field device information to the remote device 106 such as process control parameters corresponding to the fluid flow control assembly 110. Example process control parameters may include an actuator pressure, a supply pressure, a valve position, etc. In some examples, the field device 102 communicates field device information to the remote device 106 such as configuration information, diagnostic information, etc., of the field device 102. Example configuration information, diagnostic information, etc., may include an identity of logged-in users to the field device 102, an internal event log, a calibration version of the controller, a firmware version of the controller, a model number of the fluid flow control assembly 110, etc. In some examples, the field device 102 communicates field device information to the remote device 106 such as alert information. Example alert information may include a calibration error, a missing position feedback alert, a low supply pressure alarm, a security exception from a non-BLE interface, a security exception using a port of the BLE radio, etc. Additionally or alternatively, any other field device information may be communicated to the remote device 106 using the BLE bridge 104.

In some examples, the remote device 106 communicates information to the field device 102 using the BLE bridge 104 via the BLE connection 108. For example, the remote device 106 may obtain configuration information from the field device 102 such as a firmware version associated with the controller such as a BLE MCU firmware, a field device MCU firmware, etc. In response to the remote device 106 determining that the firmware version of the BLE MCU firmware, the field device MCU firmware, etc., is not current, the remote device 106 may download a current version of the firmware to the field device 102 via the BLE connection 108. In other examples, the remote device 106 can configure one or more parameters associated with the fluid flow control assembly 110 via the BLE connection 108. For example, the remote device 106 may adjust an overpressure alarm setting, a unit of measure parameter, a process control variable minimum and/or maximum range setting, etc., of the field device 102 to control, measure, and/or otherwise monitor the fluid flow control assembly 110.

Performing such actions wirelessly via the BLE connection 108 reduces a complexity of performing operations (e.g., maintenance operations, technician operations, user operations, etc.) on and/or otherwise associated with the fluid flow control assembly 110. For example, in absence of the BLE connection 108, a hot work permit may need to be obtained to open the enclosure 114 to access the controller. In other examples, process control operations in the process control environment 112 may need to be shut down prior to performing work on the field device 102 to prevent potential electric sparks from causing an explosion in a hazardous gas atmosphere. In yet other examples, water ingress protection of the field device 102 may be compromised when re-sealing the field device 102. The BLE bridge 104 reduces complexity of performing operations by facilitating communication between the field device 102 and the remote device 106 via the BLE connection 108.

Figure 2:
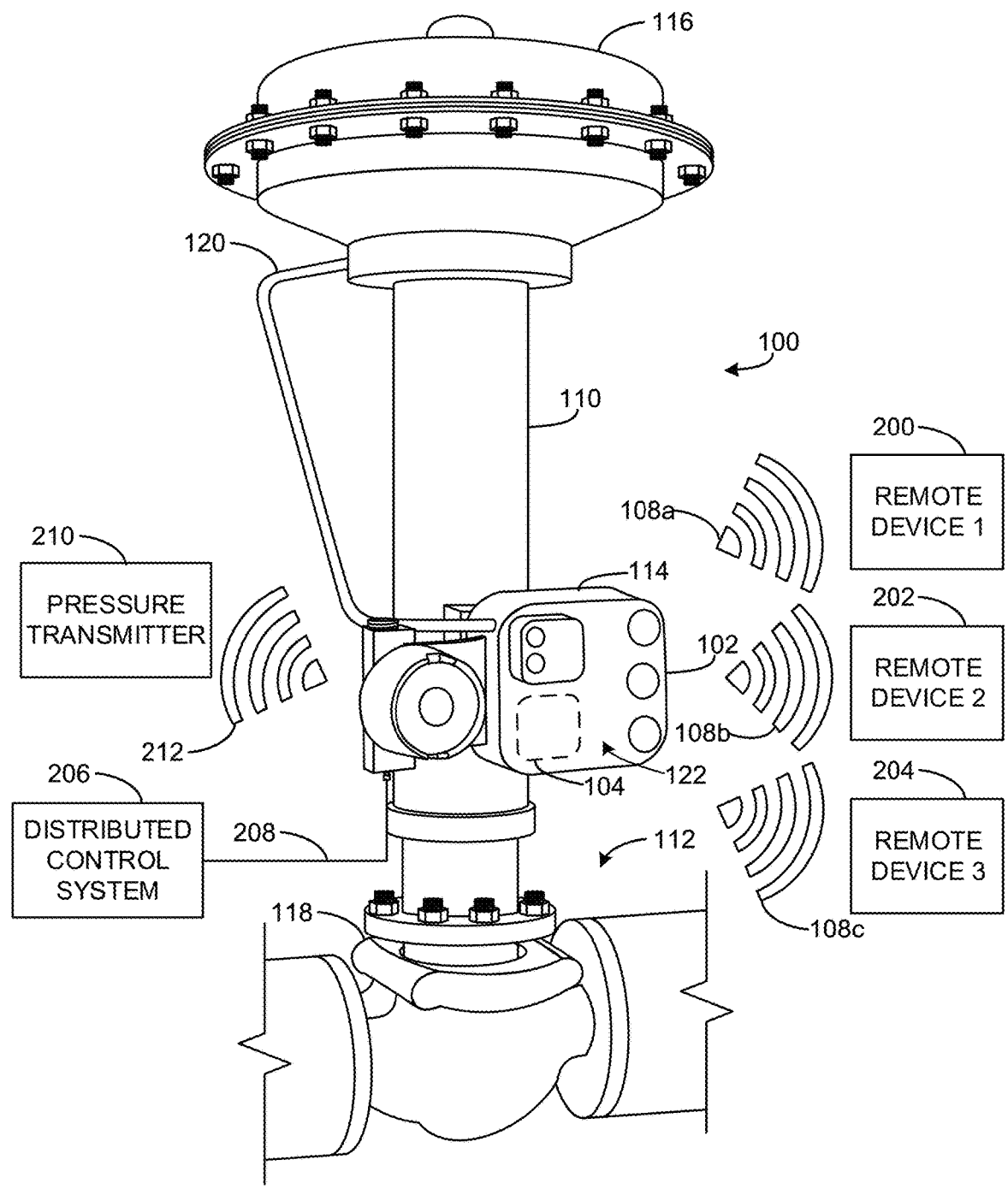
FIG. 2 is another schematic illustration of the example environment of FIG. 1 including the example field device of FIG. 1 having the example network bridge of FIG. 1 to bridge communications between the field device and first through third example remote devices over an example BLE connection in accordance with the teachings of this disclosure.

FIG. 2 is another schematic illustration of the environment 100 of FIG. 1 including the field device 102 of FIG. 1 having the BLE bridge 104 of FIG. 1 to bridge communications between example remote devices 200, 202, 204 including Remote Device 1 200, Remote Device 2 202, and Remote Device 3 204. In FIG. 2, the BLE bridge 104 is processing (e.g., capable of processing, capable of simultaneously processing, etc.) one or more BLE communication connections between the field device 102 and the Remote Devices 1-3 200, 202, 204. For example, the field device 102 may transmit field device information to one or more of the Remote Devices 1-3 200, 202, 204 and/or receive information (e.g., a firmware executable, a configuration setting, etc.) from one or more of the Remote Devices 1-3 200, 202, 204. In FIG. 2, the BLE bridge 104 is in communication with Remote Device 1 200 via a first BLE connection 108a, Remote Device 2 202 via a second BLE connection 108b, and Remote Device 3 204 via a third BLE connection 108c. Although only the Remote Devices 1-3 200, 202, 204 are depicted in FIG. 2, fewer or more than the Remote Devices 1-3 200, 202, 204 may be used.

In the illustrated example of FIG. 2, the field device 102 is communicatively coupled to a distributed control system (DCS) 206. For example, the DCS 206 may include one or more data acquisition and control systems including one or more controllers. The field device 102 of FIG. 2 is communicatively coupled to the DCS 206 via an example connection 208. In FIG. 2, the connection 208 is a cable that includes one or more wires. Additionally or alternatively, the field device 102 may be connected to the DCS 206 via a wireless connection. For example, the field device 102 may communicate with the DCS 206 via the connection 208 corresponding to a WirelessHART (WiHART) connection, a Wi-Fi Direct® network connection, etc., and/or a combination thereof. Alternatively, the field device 102 may communicate with one or more of the Remote Devices 1-3 200, 202, 204 via the BLE bridge 104 while not being communicatively coupled to the DCS 206.

In the illustrated example of FIG. 2, the field device 102 is communicatively coupled to a pressure transmitter 210 via a wireless connection 212. For example, the pressure transmitter may be a ROSEMOUNT™ 30515 Wireless Differential Pressure Flow Transmitter. Alternatively, the pressure transmitter 210 may be any other type of field device such as a flow rate transmitter, a temperature transmitter, a valve positioner, etc. The wireless connection 212 of the illustrated example is a WiHART connection. Alternatively, any other wireless connection may be used. In FIG. 2, the field device 102 transmits information to the pressure transmitter 210 and receives information from the pressure transmitter 210. For example, the pressure transmitter 210 may transmit information (e.g., a pressure measurement, a diagnostic of the pressure transmitter 210, a configuration parameter of the pressure transmitter 210, etc.) to the field device 102. In other examples, the field device 102 can transmit information (e.g., a request for field device information, configuration information, etc.) to the pressure transmitter 210.

Figure 3:
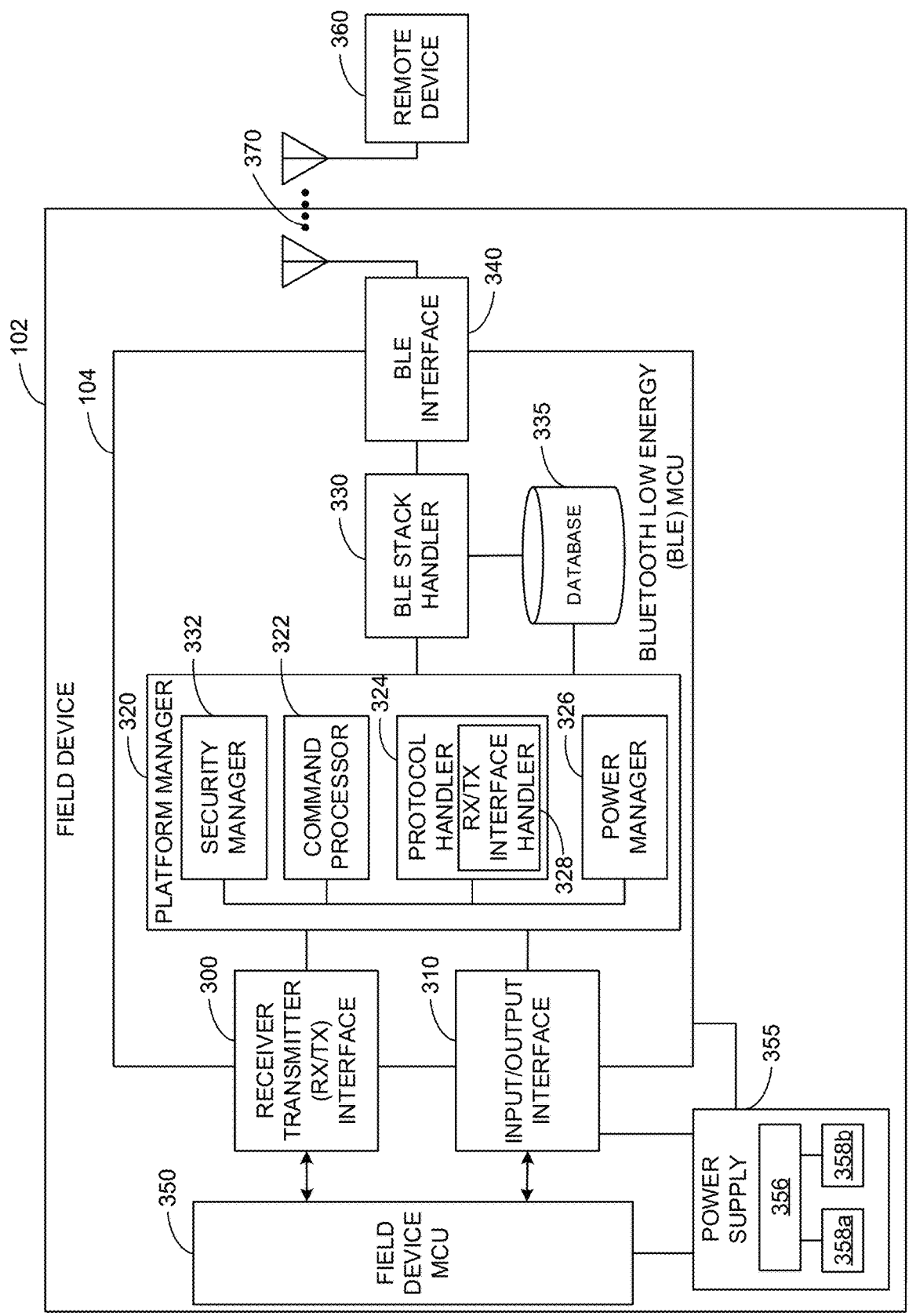
FIG. 3 is a block diagram of an example implementation of the example network bridge of FIGS. 1-2.

FIG. 3 is a block diagram of an example implementation of the BLE bridge 104 of FIGS. 1-2 of the field device 102 of FIGS. 1-2. In FIG. 3, the BLE bridge 104 is a BLE MCU that includes one or more processors executing machine readable instructions that, when executed, cause the one or more processors to execute one or more computation tasks. In FIG. 3, the BLE bridge 104 includes an example receiver transmitter (RX/TX) interface 300, an example input/output interface 310, an example platform manager 320, an example Bluetooth Low Energy (BLE) stack handler 330, an example database 335, and an example BLE interface 340. The platform manager 320 of the illustrated example includes an example command processor 322, an example protocol handler 324, an example power manager 326, and an example security manager 332. In FIG. 3, the protocol handler 324 includes an example RX/TX interface handler 328. Further shown are an example field device MCU 350, an example power supply 355, an example remote device 360, and an example BLE wireless connection 370 (e.g., referred to herein as the BLE network 370, the BLE communication medium 370, the BLE connection 370, etc.).

In the illustrated example of FIG. 3, the BLE bridge 104 is an MCU used to execute and/or otherwise facilitate communication operations between the field device MCU 350 and an external BLE-compatible device such as the remote device 360. In FIG. 3, the field device MCU 350 is an MCU that includes one or more processors executing machine readable instructions that, when executed, cause the one or more processors to execute one or more computation tasks. The remote device 360 of FIG. 3 may correspond to the remote device 106 of FIG. 1, one or more of the Remote Devices 1-3 200, 202, 204 of FIG. 2, etc., and/or a combination thereof. The BLE interface 340 of the illustrated example facilitates BLE communication via the BLE connection 370. The BLE connection 370 of FIG. 3 may correspond to the BLE connection 108 of FIG. 1 and/or the BLE connections 108a-c of FIG. 2. The BLE bridge 104 of the illustrated example is included in the field device 102. Alternatively, the BLE bridge 104 may not be included in the field device 102, where the BLE bridge 104 is communicatively coupled to the field device 102 via a cable or other means for communication. In some examples, the field device MCU 350 transmits data packets to the BLE bridge 104 in a format (e.g., a data format) defined by an industrial communication protocol supported by the field device 102. For example, the field device 102 may support HART protocol. In such examples, the field device MCU 350 can transmit data packets to the BLE bridge 104 via the receiver transmitter interface 300 and/or the input/output interface 310 in a HART protocol format.

In the illustrated example of FIG. 3, the BLE bridge 104 includes the receiver transmitter interface 300 to enable communication between the BLE bridge 104 and the field device MCU 350. For example, the receiver transmitter interface 300 can facilitate inter-processor communications (IPC) corresponding to information exchanged between one or more processors of the field device MCU 350 and the one or more processors of the BLE bridge 104. The receiver transmitter interface 300 of the illustrated example is a UART. For example, the receiver transmitter interface 300 may transmit information to and/or receive information from the field device MCU 350 using an industrial communication protocol (e.g., a HART communication protocol, a PROFIBUS communication protocol, a WiHART communication protocol, etc.). Alternatively, the receiver transmitter interface 300 may be an I2C bus, a SPI bus, or other similar interface between integrated circuits (e.g., microcontrollers, processors, etc.).

In the illustrated example of FIG. 3, the BLE bridge 104 includes the input/output interface 310 to enable and/or otherwise facilitate communication between the BLE bridge 104 and the field device MCU 350. The input/output interface 310 of the illustrated example corresponds to one or more analog-to-digital converters. For example, the input/output interface 310 may transmit a current signal, a voltage signal, etc., to the field device MCU 350 corresponding to information obtained from the remote device 360. In other examples, the input/output interface 310 may obtain a current signal, a voltage signal, etc., from the field device MCU 350. In yet other examples, the input/output interface 310 can transmit a current signal, a voltage signal, etc., associated with the power supply 355 to the power manager 326. Alternatively, the example input/output interface 310 may be a general-purpose input/output (GPIO) interface or any other type of input/output interface.

In the illustrated example of FIG. 3, the BLE bridge 104 includes the platform manager 320 to analyze and generate commands, convert data packets based on identified protocols and security measures, and/or manage a power budget of the BLE bridge 104. In FIG. 3, the platform manager 320 includes the command processor 322 to determine and direct a communication operation based on a direction of data flow. In some examples, the command processor 322 is a command controller corresponding to and/or otherwise associated with one or more processors of the BLE bridge 104 that can execute machine readable instructions. For example, the command controller may be implemented by the one or more processors that can execute the machine readable instructions. In some examples, the command processor 322 identifies one or more supported protocols of the field device 102. For example, the command processor 322 may determine that the field device 102 supports HART communication protocol and PROFIBUS communication protocol. In such examples, the command processor 322 can determine the supported protocols by querying the field device MCU 350, by querying the database 335, etc. For example, the command processor 322 may determine the supported protocols in response to querying the field device MCU 350. In such examples, the command processor 322 can store information such as identifier(s) or value(s) corresponding to the identified supported protocol(s) in the database 335 for future retrieval by the command processor 322. In other examples, the command processor 322 can determine the supported protocols based on querying a fixed or hard-coded parameter stored in the database 335 corresponding to the supported protocols of the field device 102.

In some examples, the command processor 322 determines a direction of data flow based on a master and slave communication model. For example, the command processor 322 may determine that a data packet corresponds to a transmit request from the receiver transmitter interface 300 (e.g., a slave transmitting a notification to a master). In such examples, the command processor 322 can direct the data packet to be processed and transmitted from the receiver transmitter interface 300 to the BLE stack handler 330. In other examples, the command processor 322 can determine that a data packet corresponds to a receive request from the BLE interface 340 (e.g., a master transmitting a data packet to a slave without requiring a response from the slave). In such examples, the command processor 322 can direct the data packet to be processed and transmitted from the BLE interface 340 to the receiver transmitter interface 300.

In some examples, the command processor 322 evaluates read and write BLE requests based on security information (e.g., security permissions, security rules, etc.). For example, the command processor 322 may determine that a receive request is authorized based on comparing an opcode (e.g., a data field, a data parameter, etc.) of the receive request to a list of authorized opcodes. In such examples, the command processor 322 can receive a data packet associated with the receive request and transmit the data packet to the security manager 332 for decryption. In other examples, the command processor 322 can reject the receive request when the command processor 322 determines that the opcode is not authorized. For example, an unauthorized opcode may indicate that a computing device, a user associated with the computing device, etc., transmitting information to the field device 102 via the BLE bridge 104 is not permitted to access information, change information, etc., on the field device 102.

In some examples, the command processor 322 executes communication operations of the BLE bridge 104 based on determining whether a value of an opcode corresponds to a specific industrial communication protocol. For example, the command processor 322 may determine that a value of an opcode corresponding to a receive request at the BLE interface 340 corresponds to HART protocol. The command processor 322 may determine that the field device 102 supports HART protocol. In such examples, the command processor 322 can direct the BLE interface 340 to receive the information from the remote device 360, where the direction is based on the command processor 322 comparing the protocol indicated by the opcode value to the supported protocol of the field device 102. In some examples, the command processor 322 rejects the receive request by determining that there is a mismatch of the protocol indicated by the opcode value and the supported protocol(s) of the field device 102. In some examples, the command processor 322 directs a processing of a data packet received from the field device MCU 350 and/or the remote device 360 by invoking the protocol handler 324 and/or the security manager 332 to perform one or more operations associated with the data packet.

In some examples, the command processor 322 processes a radio-specific command. For example, the command processor 322 may process a command described below in connection with FIGS. 13A-13B. For example, the command processor 322 may direct the BLE stack handler 330 to adjust or change the transmit power levels of the BLE interface 340 in response to processing a radio-specific command. For example, the command processor 322 may direct the BLE stack handler 330 to reduce the transmit power level of the BLE interface 340 to conserve power. In other examples, the command processor 322 can direct the BLE stack handler 330 to increase the transmit power level of the BLE interface 340 to increase a transmission range of the BLE interface 340. In some examples, the command processor 322 processes a radio-specific command by executing a filter (e.g., a notch-filter) when the command processor 322 detects a problem with existing radio frequencies of the BLE interface 340. In some examples, the command processor 322 processes a radio-specific command by turning off the BLE interface 340 completely to go into a full-radio-silence mode.

In the illustrated example of FIG. 3, the platform manager 320 includes the protocol handler 324 to execute and/or otherwise facilitate communication operations based on a direction of data flow between the field device MCU 350 and the remote device 360. In some examples, the protocol handler 324 is a protocol controller corresponding to and/or otherwise associated with the one or more processors of the BLE bridge 104 that can execute machine readable instructions. For example, the protocol controller may be implemented by the one or more processors that can execute the machine readable instructions. In some examples, the protocol handler 324 executes communication operations based on data flow from the field device MCU 350 to the BLE bridge 104. In such examples, the protocol handler 324 can determine whether a data packet for transmission is a first data packet for a communication session. In response to determining that the data packet is the first data packet of the communication session, the protocol handler 324 may read and store a protocol address (e.g., a HART protocol address, a PROFIBUS address, etc.), a protocol header (e.g., a HART header, a PROFIBUS header, etc.), etc., of the field device MCU 350. In response to determining that the data packet is not the first data packet of the communication session, the protocol handler 324 may remove a protocol address from the data packet.

In some examples, the protocol handler 324 includes the protocol address in the data packet to be transmitted to the remote device 360 for industrial communication protocol data packet reconstruction. For example, the first data packet to be transmitted to the remote device 360 may include the protocol address that the remote device 360 may use for future communication operations. Alternatively, the remote device 360 may transmit a read request to the field device 102, where the read request includes an opcode that corresponds to the protocol-specific address. Alternatively, the protocol handler 324 may define a first opcode that returns HART messages with addresses and a second opcode that returns HART messages without addresses. For example, the remote device 360 may transmit a data packet including the first opcode to cause the field device 102 to return a HART message with an address of the field device 102. In such examples, the protocol handler 324 can remove the protocol information such as the HART preamble, the message integrity checks, etc., and insert the HART address into a data payload of the data packet to be transmitted to the remote device 360 for data packet reconstruction.

In some examples, the protocol handler 324 removes protocol information (e.g., header data, a checksum, etc.) from a data packet prior to transmitting the data packet via the BLE interface 340. For example, the field device MCU 350 may transmit a HART 5 formatted data packet to the protocol handler 324. In such examples, the protocol handler 324 can remove HART 5 protocol information such as a HART 5 protocol preamble, a HART 5 protocol address, a HART 5 message integrity check, etc., from the HART 5 formatted data packet. In response to removing the protocol information from the data packet, the protocol handler 324 can concatenate payload data, where the concatenated payload data can replace the removed protocol information. For example, instead of transmitting a first header and a first payload data, a second header and a second payload data, etc., the protocol handler 324 can generate a concatenated data packet including the first header, the first payload data, and the second payload data without including the second header. In response to removing the protocol information from the data packet, the protocol handler 324 may invoke the security manager 332 to encrypt the data packet. In response to the data packet being encrypted, the security manager 332 may direct the BLE stack handler 330 to generate a BLE data packet (e.g., a BLE PDU) based on the encrypted data packet and transmit the BLE data packet via the BLE interface 340.

In some examples, the protocol handler 324 adds protocol information such as a protocol preamble, a protocol address, a protocol message integrity check, etc., based on a supported protocol of the field device 102. For example, the BLE interface 340 may receive a BLE data packet from the remote device 360 including an opcode corresponding to HART 7 protocol. In such examples, the security manager 332 can decrypt the BLE data packet (e.g., extract and decrypt the data payload included in the BLE data packet) and transmit the decrypted data packet to the protocol handler 324. The protocol handler 324 may add HART 7 protocol information such as a HART 7 protocol preamble, a HART 7 protocol address, a HART 7 message integrity check, etc., to the decrypted data packet to generate an industrial protocol formatted data packet. In response to generating the industrial protocol formatted data packet, the protocol handler 324 may instruct the receiver transmitter interface 300 to transmit the industrial protocol formatted to the field device MCU 350.

In some examples, the protocol handler 324 executes communication operations based on data flow from the remote device 360 to the BLE bridge 104. For example, the protocol handler 324 may determine whether a data packet received at the BLE interface 340 is valid or properly formed (e.g., has a valid syntax), formatted, etc. In such examples, the protocol handler 324 can protect the field device MCU 350 from intentionally malformed data or partially malformed data (e.g., fuzzing) by determining whether the data packet is properly formed.

In some examples, the protocol handler 324 determines whether the data packet is a compliant data packet and/or otherwise is a properly formed data packet based on evaluating an industrial protocol command. For example, the protocol handler 324 may receive a data packet including an industrial protocol command In such examples, the protocol handler 324 can determine that the industrial protocol command is valid (e.g., a received HART command 0 is valid) or not valid (e.g., a received HART command 255 is not valid). The protocol handler 324 may (1) accept the data packet based on verifying that the industrial protocol command is valid or (2) reject the data packet based on not verifying that the industrial protocol command is valid.

In some examples, the protocol handler 324 determines whether the data packet is properly formed based on evaluating a data length (e.g., a number of bytes) corresponding to an industrial protocol command. For example, the protocol handler 324 may receive a data packet including an industrial protocol command with a corresponding data length of 8 bytes. In such examples, the protocol handler 324 can determine that the industrial protocol command is defined by a maximum of 6 bytes to be properly formed. The protocol handler 324 may compare the received data length of 8 bytes to the defined properly formed length of 6 bytes and determine that the data packet is not properly formed based on the comparison. In such examples, the protocol handler 324 can reject the data packet and/or transmit an error code to a transmitter of the data packet (e.g., the remote device 360) based on determining that the data packet is not properly formed.

In some examples, the protocol handler 324 determines whether the data packet is properly formed based on evaluating a range of a parameter value included in the data packet. For example, the protocol handler 324 may receive a data packet including a value for a valve position setpoint parameter of 2000%. In such examples, the protocol handler 324 can determine that the valve position setpoint parameter is defined by a range of 0-100% to be properly formed. The protocol handler 324 may compare the received range of 2000% to the defined properly formed range of 0-100% and determine that the data packet is not properly formed based on the comparison. In such examples, the protocol handler 324 can reject the data packet and/or transmit an error code to a transmitter of the data packet (e.g., the remote device 360) based on determining that the data packet is not properly formed.

In the illustrated example of FIG. 3, the protocol handler 324 includes the RX/TX interface handler 328 to process communication operations between the field device MCU 350 and the BLE interface 340. In some examples, the RX/TX interface handler 328 is a RX/TX interface controller corresponding to and/or otherwise associated with the one or more processors of the BLE bridge 104 that can execute machine readable instructions. For example, the RX/TX controller may be implemented by the one or more processors that can execute the machine readable instructions. In some examples, the RX/TX interface handler 328 receives a data packet from the receiver transmitter interface 300 and/or the input/output interface 310 and transmits the data packet to the BLE interface 340 via the BLE stack handler 330. For example, the RX/TX interface handler 328 may include a TX buffer to obtain a data packet designated to be transmitted to the BLE interface 340 from the field device MCU 350. In some examples, the RX/TX interface handler 328 receives a data packet from the BLE interface 340 and transmits the data packet to the field device MCU 350. For example, the RX/TX interface handler 328 may include a RX buffer to obtain a data packet designated to be transmitted to the field device MCU 350 from the BLE interface 340. The BLE interface 340 and the field device MCU 350 of the illustrated example support UART, I2C, SPI, and/or other similar integrated circuit communication protocol.

In the illustrated example of FIG. 3, the platform manager 320 includes the power manager 326 to determine a mode of the field device 102, perform a power evaluation of an available power budget of the BLE bridge 104, and/or adjust one or more parameters of the BLE interface 340 based on a power evaluation event. In some examples, the power manager 326 is a power controller corresponding to and/or otherwise associated with the one or more processors of the BLE bridge 104 that can execute machine readable instructions. For example, the power controller may be implemented by the one or more processors that can execute the machine readable instructions. In some examples, the power manager 326 can instruct, direct, invoke, etc., a different component of the platform manager 320 (e.g., the security manager 332, the command processor 322, the protocol handler 324, the RX/TX interface handler 328, etc.), and/or, more generally, the BLE MCU 104 (e.g., the RX/TX interface 300, the input/output interface 310, the BLE stack handler 330, etc.) to execute a computation task by generating one or more threads (e.g., a computing thread, a processor thread, etc.) for one or more processors of the BLE MCU 104 to execute. In such examples, the one or more processors of the BLE MCU 104 can execute the computation task by executing the thread. For example, the power manager 326 can invoke the security manager 332 to execute a security task or operation by generating a thread associated with the security task. In such examples, the security manager 332 can execute the security task by executing the thread.

In the illustrated example of FIG. 3, the power manager 326 manages a power profile of the BLE bridge 104. For example, the power profile can correspond to a power budget allocated to the BLE bridge 104, a power dissipation rate of the BLE bridge 104, etc. In some examples, the power manager 326 instructs the input/output interface 310 to measure a parameter of the power supply 355 and generate a request to the field device MCU 350 to adjust power delivery of the power supply 355 based on the measured parameter. In some examples, the power manager 326 determines the mode of the field device 102 by querying the database 335, the field device MCU 350, etc. For example, the mode may be a standard operation mode, a maintenance mode, a secure mode (e.g., a security mode), etc. For example, the power manager 326 may determine that the field device 102 is in a maintenance mode based on information obtained from the field device MCU 350, information in the database 335, etc.

In some examples, the power manager 326 determines that the field device 102 is in a secure mode based on information from the security manager 332, in the database 335, from the field device MCU 350, etc. In such examples, the power manager 326 can disable write access to one or more field device parameters. For example, the power manager 326 may disable write access to a firmware version value, a serial number value, an error log file, a BLE interface parameter (e.g., a BLE connection interval, a BLE radio address, etc.), etc., stored in the database 335, the field device MCU 350, etc.

In some examples, the power manager 326 requests additional current from the field device MCU 350 to charge the power supply 355. For example, the power manager 326 can request additional current to be supplied to the power supply 355 when the field device 102 is in the maintenance mode or in a different mode. In some examples, the field device MCU 350 adjusts an operation of the field device 102 to satisfy the request from the power manager 326 by providing the additional current to the power supply 355. In other examples, the field device MCU 350 can reject the request from the power manager 326 because the field device 102 is operating in a mode (e.g., a standard operation mode) where the field device MCU 350 cannot adjust operation of the field device 102. In some examples, the field device MCU 350 instructs the power manager 326 to reduce power consumption by the BLE bridge 104. For example, the field device MCU 350 may generate a GPIO interrupt, a UART message, a SPI message, etc., to invoke the power manager 326 to transition to a power conservation state. In such examples, the power manager 326 can transition from a first state where a first quantity of computation tasks is being executed to a second state where a second quantity of computation tasks is being executed, where the second quantity (e.g., zero, one, or more computation tasks) is less than the first quantity.

In the illustrated example of FIG. 3, the field device 102 includes the power supply 355 to provide power and/or otherwise facilitate operation of the field device 102 including the BLE bridge 104. For example, the power supply 355 may be electrically coupled to an external power source, a power source powering the field device MCU 350, etc. In FIG. 3, the power supply 355 is a current source. For example, the power supply 355 may be a 0.25 mA current source at 3.8 VDC, a 0.5 mA current source at 3.8 VDC, etc., that provides an input current to the BLE bridge 104.

In the illustrated example of FIG. 3, the power supply 355 includes an example energy storage device 356 to ensure continuous radio communication of the BLE interface 340 when needed. Alternatively, the power supply 355 may include two or more instances of the energy storage device 356. In FIG. 3, the energy storage device 356 is a capacitor (e.g., a storage capacitor). Alternatively, the energy storage device 356 may be a battery or any other type of energy storage device.

In some examples, supply current (e.g., 0.15 mA, 0.25 mA, etc.) to the energy storage device 356 is less than the drawn current (e.g., current in a range of 3-15 mA) from the energy storage device 356. In such examples, the power manager 326 can monitor the voltage of the energy storage device 356 to draw current when the energy storage device 356 is sufficiently charged (e.g., above an energy storage threshold, a voltage threshold, etc.). In FIG. 3, the power manager 326 obtains energy measurements associated with the power supply 355 via GPIO or analog-to-digital converter hardware included in the input/output interface 310. For example, the power manager 326 can obtain an analog current value, an analog voltage value, etc. In other examples, the power manager 326 can obtain a digital value (e.g., a logic High value, a logic Low value, 0, 1, etc.) corresponding to the analog current value, the analog voltage value, etc. In some examples, the power manager 326 uses a filter (e.g., a Kalman filter) based on an input power (e.g., an input current, an input voltage, etc.) and/or an output power (e.g., an output current, an output voltage, etc.) of the BLE bridge 104, and/or, more generally the field device 102.

In the illustrated example of FIG. 3, the power supply 355 includes example comparators (e.g., voltage comparators) 358a-b including a first example comparator 358a and a second example comparator 358b to determine energy stored in the power supply 355 for the BLE bridge 104. For example, the comparators 358a-b may be used to determine stored energy by and/or otherwise included in the power supply 355. Alternatively, the power supply 355 may include fewer or more than the comparators 358a-b depicted in FIG. 3. The power supply 355 includes the comparators 358a-b to measure a voltage across and/or otherwise associated with the energy storage device 356 to determine an indication of energy storage by the energy storage device 356. In some examples, the comparators 358a-b determine whether the voltage across the energy storage device 356 satisfies an energy threshold (e.g., a high-energy threshold, a low-energy threshold, etc.). In other examples, the comparators 358a-b determine whether the voltage across the energy storage device 356 satisfies a voltage threshold. For example, the voltage threshold can be a high-voltage threshold, a low-voltage threshold, etc.

In the illustrated example of FIG. 3, the power supply 355 includes (1) the first comparator 358a to indicate whether a voltage of the energy storage device 356 satisfies a high-voltage threshold and (2) the second comparator 358b to determine whether the voltage satisfies a low-voltage threshold. In such examples, the first comparator 358a is a high-voltage comparator that can generate or output a first digital signal and the second comparator 358b is a low-voltage comparator corresponding that can generate or output a second digital signal, where the first and second digital signals can be measured and/or otherwise obtained by the input/output interface 310. For example, the first comparator 358a may compare a measured voltage of the energy storage device 356 to a high-voltage threshold (e.g., 1.8 V, 2 V, etc.) that corresponds and/or otherwise translates to a high-energy threshold (e.g., 350 uJ, 380 uJ, etc.). For example, the power manager 326 can set a power budget or a power accumulator to a known value (e.g., 350 uJ, 380 uJ, etc.) when the high-energy threshold is satisfied. The first comparator 358a may assert a logic High (e.g., a voltage corresponding to a digital one) signal as a first digital input signal to the input/output interface 310 when the measured voltage satisfies the high-voltage threshold. The measured voltage may satisfy the high-voltage threshold when the measured voltage is greater than or equal to the high-voltage threshold. In other examples, the second comparator 358b can compare the measured voltage to a low-voltage threshold (e.g., 0.8 V, 1 V, etc.) that corresponds to a low-energy threshold (e.g., 140 uJ, 180 uJ, etc.). The second comparator 358b may assert a logic High signal as a second digital input signal to the input/output interface 310 when the measured voltage satisfies the low-voltage threshold. The measured voltage may satisfy the low-voltage threshold when the measured voltage is greater than or equal to the low-voltage threshold. In other examples, the first comparator 358a can generate a logic Low (e.g., a voltage corresponding to a digital zero) signal when the high-voltage threshold is not satisfied. In yet other examples, the second comparator 358b can generate a logic Low signal when the low-voltage threshold is not satisfied.

In some examples, the high-energy threshold is indicative of the power supply 355 being able to provide sufficient power to the BLE bridge 104 to execute one or more computation tasks. For example, if the power manager 326 determines that a logic High signal has been asserted by the first comparator 358a, the power manager 326 may determine that the BLE bridge 104 can execute one or more computation tasks without draining the power supply 355 and, thus, abruptly turning off. In some examples, the low-energy threshold is indicative of the power supply 355 being able to provide sufficient power to the BLE bridge 104 to execute one or more computation tasks. For example, if the power manager 326 determines that a logic High signal has not been asserted by the second comparator 358b and, thus, the low-energy threshold is not satisfied, the power manager 326 may determine that the BLE bridge 104 cannot execute one or more computation tasks without draining the power supply 355 and prematurely shut down during execution of the one or more computation tasks (e.g., the BLE bridge 104 may brown out).

In some examples, the power manager 326 determines a state of the power supply 355. For example, the power manager 326 can determine whether the power supply 355 is in a first state, a second state, a third state, etc., based on assertions by the comparators 358a-b. For example, the state of the power supply 355 can be indicative of a quantity or a level of energy stored by the energy storage device 356. In other examples, the state of the power supply 355 can be indicative of a quantity of computation tasks that can be executed prior to consuming or exhausting a portion or an entirety of the available energy associated with and/or otherwise corresponding to the state without causing the BLE bridge 104 to shut down, turn off, etc., due to a lack of available energy.

In some examples, the power manager 326 can determine that the power supply 355 is in the first state. The first state can correspond to the energy storage device 356 being fully charged or approximately fully charged (e.g., 90% charged, 95% charged, 99% charged, etc.). The power manager 326 can determine that the power supply 355 is in the first state when the first comparator 358a asserts a logic High signal or when the first and second comparators 358a-b assert logic High signals. The first state can correspond to an ENERGY_STATE_HIGH power state (e.g., a HIGH-HIGH power state) where the first comparator 358a and the second comparator 358b assert a logic High signal. The first state is indicative of the energy storage device 356 being fully charged or approximately fully charged. In the first state, the power supply 355 can facilitate a high-powered, one-shot event, such as a radiofrequency operation (e.g., the BLE interface 340 receiving a BLE packet, the BLE interface 340 transmitting a BLE packet, etc.), a non-volatile memory (NVM) flash erase (e.g., a NVM flash erase of the database 335 or a portion thereof), a NVM flash write (e.g., a NVM flash write to the database 335), or an asymmetric cryptographic calculation performed by the security manager 332. For example, the one-shot event can correspond to an energy commitment by the power supply 355 to provide a quantity of energy to the BLE bridge 104 to execute a computation task associated with the one-shot event. In other examples, the one-shot event can correspond to a power commitment by the power supply 355 to provide a quantity of energy at a specified rate to the BLE bridge 104 to execute a computation task associated with the one-shot event.

In some examples, the power manager 326 can determine that the power supply 355 is in the second state. The second state can correspond to the energy storage device 356 being less (e.g., substantially less) than fully charged (e.g., 25% charged, 35% charged, 50% charged, etc.). The power manager 326 can determine that the power supply 355 is in the second state based on a non-assertion (or lack of assertion) by the first comparator 358a and an assertion by the second comparator 358b. A lack of assertion can correspond to generating a logic Low signal as the digital input signal. The second state can correspond to an ENERGY_STATE_MEDIUM power state (e.g., a LOW-HIGH power state) indicative of the voltage associated with the energy storage device 356 being less than fully charged but are above a voltage level associated with the second comparator 358b. In the second state, the power supply 355 can facilitate high-speed data transfers, where the BLE bridge 104 is operating at a specified data transfer rate until the second comparator 358b changes state (e.g., output changes from a logic High value to a logic Low value). In the second state, the power supply 355 may not have sufficient energy to support one-shot events.

In some examples, the power manager 326 can determine that the power supply 355 is in the third state. The third state can correspond to the energy storage device 356 having an insufficient quantity of stored energy (e.g., less than 120 uJ, 160 uJ, etc.) to execute one or more computing tasks and, accordingly, the BLE bridge 104 needs to be put to sleep prior to the BLE bridge 104 browning out due to insufficient power from the power supply 355. The power manager 326 can determine that the power supply 355 is in the third state based on a lack of assertion from the first comparator 358a and the second comparator 358b. The third state can correspond to an ENERGY_STATE_LOW power state (e.g., a LOW-LOW power state) indicative of the voltage across the energy storage device 356 having insufficient energy to support one or more functions of the BLE bridge 104. In the third state, the power manager 326 may instruct the BLE bridge 104 to enter a sleep mode or a standby mode until a value of the first comparator 358a and/or the second comparator 358b changes. In such examples, the sleep mode or the standby mode can correspond to an example where the BLE interface 340 is disabled and/or otherwise not executing a radiofrequency operation.

In some examples, the power manager 326 determines an input power (e.g., an input current, an input voltage, etc.) of the BLE bridge 104 during every cycle (e.g., every control cycle, every 100 milliseconds (ms), every 1 second, etc.). For example, the input power can correspond to power delivered to the power supply 355 by the field device MCU 350. In some examples, the field device MCU 350 transmits information to the BLE bridge 104 corresponding to the input power. For example, the field device MCU 350 can generate and transmit a SPI message to the RX/TX interface 300. The RX/TX interface 300 can obtain the SPI message and write first data (e.g., a machine readable value, a hex value, a binary value, etc.) included in the SPI message in memory. For example, the field device MCU 350 can set a SPI bus chip select value to a logic High, write the first data to the data buffer when the SPI bus chip select value is a Logic High, and set the SPI bus chip select value to a logic Low after the first data has been written to the data buffer. The power manager 326 can retrieve the first data from the data buffer in response to a hardware interrupt that can be generated based on the SPI bus chip select value changing values.

In some examples, the RX/TX interface 300 stores the first data in a data buffer included in the database 335. The power manager 326 can read the first data from the data buffer and determine a first charging rate of the power supply 355 based on the first data in the data buffer, where the field device MCU 350, and/or, more generally, the field device 102 can write the first data to the data buffer (e.g., via the RX/TX interface 300). For example, the first data may indicate that the field device MCU 350 is providing power and/or is otherwise charging the power supply 355 at a rate of 0.25 mW. In some examples, the power manager 326 determines a power budget associated with the BLE interface 340 based on the first charging rate. For example, the power manager 326 can determine a power budget based on at least one of (1) stored energy indicated by at least one of the comparators 358a-b or (2) the first charging rate. In some examples, the field device MCU 350 adjusts the first charging rate to a second charging rate, where the second charging rate can be greater or less than the first charging rate. For example, the field device MCU 350 can write second data different from the first data to the data buffer, where the second data indicates that the field device MCU 350 is charging the power supply 355 at a rate of 0.5 mW. In response to the adjustment, the power manager 326 can adjust the power budget when the first charging rate is changed to the second charging rate when the field device MCU 350 writes the second data to the data buffer.

In some examples, the power manager 326 can compare the charging rate to a charging rate threshold and determine whether the charging rate satisfies the charging rate threshold based on the comparison. For example, the power manager 326 may determine that the first charging rate is 0.25 mW based on the first data in the data buffer, compare the first charging rate to a charging rate threshold of 0.15 mW, and determine that the first charging rate satisfies the charging rate threshold because the first charging rate is greater than the charging rate. In such examples, the power manager 326 can identify a power evaluation event based on the first charging rate satisfying the charging rate threshold. In other examples, the power manager 326 can identify a power evaluation event in response to a change of data in the data buffer (e.g., in response to the second data replacing the first data, in response to the second data being written to the data buffer, etc.).

In some examples, the power manager 326 performs a power evaluation of the power supply 355, and/or, more generally, the field device 102. A power evaluation can correspond to the power manager 326 determining a current state, status, etc., of one or more components of the field device 102, such as the BLE interface 340, the power supply 355, etc. For example, the power manager 326 can measure a quantity of stored energy of the power supply 355 and/or a measure of power that can be provided by the power supply 355. In other examples, the power manager 326 can identify a state, a status, etc., of the BLE interface 340 including an energy consumption, a power consumption, etc., by the BLE interface 340, a data transmission or a data reception rate of the BLE interface 340, whether the BLE interface 340 is transmitting a data packet, receiving a data packet, etc., and/or a combination thereof. In some examples, the power manager 326 performs a power evaluation by measuring a radio transmission rate of the BLE interface 340. For example, the power manager 326 may calculate a transmission rate (e.g., a radio transmission rate, an instant radio transmission rate, etc.) of the BLE interface 340 based on a number of bytes transmitted by the BLE interface 340 per second (e.g., calculate a transmission rate in bytes/second).

In some examples, the power manager 326 calculates a radio energy consumption (REC) value (e.g., an REC value measured in uJ) based on the radio transmission rate. For example, the power manager 326 may determine an amount of energy consumed by activating, enabling, waking up, etc., the BLE interface 340. For example, the power manager 326 may determine an energy overhead value of the BLE interface 340 including the power to (1) execute machine readable instructions or processes with the platform manager 320, the BLE stack handler 330, etc., (2) process data from the receiver transmitter interface 300, (3) encrypt data received from the receiver transmitter interface 300 with the security manager 332, (4) decrypt data received from the BLE interface 340, etc., and/or a combination thereof.

In some examples, the power manager 326 calculates the REC value without including the activation energy of the BLE interface 340 (e.g., the activation energy is calculated separately). For example, the power manager 326 may calculate the REC based on multiplying (1) a first energy overhead (EO) (e.g., an EO measured in mJ) per byte of data and a quantity of bytes transmitted per connection interval (e.g., a data interval), which is measured in seconds. For example, the power manager 326 may calculate the REC based on Equation (1) as described below:

$$REC(mW) = \frac{EO \text{ mJ}}{\text{byte}} * \frac{\text{bytes}}{\text{connection interval } s} \qquad \text{Equation (1)}$$

In some examples, the power manager 326 calculates the REC value including the activation energy of the BLE interface 340. For example, the power manager 326 may calculate the REC based on a sum of (1) multiplying the first EO per byte of data and the quantity of bytes transmitted per connection interval and (2) multiplying an amount of energy (e.g., activation energy, start-up energy, etc.) per second and an amount of time the BLE interface 340 takes to activate (activation time). For example, the power manager 326 may calculate the REC based on Equation (2) as described below:

$$REC(mW) = \left(\frac{EO \text{ mJ}}{\text{byte}} * \frac{\text{bytes}}{\text{connection interval } s}\right) + \qquad \text{Equation (2)}$$
$$\left(\frac{\text{activation energy}}{\text{second}} * \text{activation time}\right)$$

In some examples, the power manager 326 performs the power evaluation by determining the energy associated with the power supply 355 based on values generated by the comparators 358a-b, determining a power budget (e.g., an available power budget) based on the determined voltage, and determining a quantity of zero or more computation tasks included in a task queue to perform based on the power budget. For example, the power manager 326 can determine that the power supply 355 has a voltage of 1.8 V based on the first and second comparators 358a-b asserting logic High signals as obtained by the input/output interface 310. In such examples, the power manager 326 can determine a power budget of 380 uJ because the measured 1.8 V corresponds to 380 uJ of stored energy by the energy storage device 356.

In some examples, the power manager 326 determines an available power budget of the power supply 355 by determining a quantity of power delivered to the power supply 355 and by determining a quantity of power being used from the power supply 355. For example, the field device MCU 350 can assert a logic value (e.g., a logic High value) to be read by the power manager 326 when the field device MCU 350 is providing power to the power supply 355. In such examples, the power manager 326 can read data from the database 335 to determine a charging rate during a time period when the field device MCU 350 asserts the logic value. The power manager 326 can determine the quantity of power delivered to the power supply 355 using Equation (3) as described below:

$$\text{Energy Input} = \text{Power Input} * \text{Charging Time} \qquad \text{Equation (3)}$$

In the illustrated example of Equation (3) above, the Power Input can correspond to a pre-determined rate of energy transfer value of 1 mW or any other value by the field device MCU 350. For example, the power manager 326 can determine that the field device MCU 350 provided an Energy Input of 10 uJ based on an Power Input value of 1 mW and a Charging Time of 10 ms. The power manager 326 can determine the quantity of power being used from the power supply using Equation (4) as described below:

$$\text{Energy Output} = \text{Power Output} * \text{Power Consumption Time} \qquad \text{Equation (4)}$$

In the illustrated example of Equation (4) above, the Power Output can correspond to a pre-determined rate of energy transfer value for a computation task to be executed by the field device MCU 350. For example, the power manager 326 can determine that the BLE interface 340 is to transmit a BLE packet for 10 ms and can require 1 mA of current at 3 V to execute the transmission. In such examples, the power manager 326 can determine that the quantity of energy being used from the power supply is 30 uJ (e.g., Energy Output=30 uJ) based on a Power Output of 1 mA at 3 V for 10 ms. Accordingly, the power manager 326 can determine the power budget of the BLE MCU 104 based on a difference between the energy input and the energy output as described above in connection with Equation (3) and Equation (4) above.

In some examples, the power manager 326 obtains a task queue of one or more items that can include an authentication task, a connection establishment task, an encryption task, a radiofrequency task (e.g., a radio transmission task, a radio reception task, etc.), etc. The power manager 326 can assign and/or otherwise determine a quantity of energy that each of the tasks included in the task queue can consume (e.g., an energy consumption parameter, an energy consumption value, etc.) if executed. For example, the power manager 326 can determine that the authentication task in the task queue can consume 80 uJ (i.e., has an energy consumption value of 80 uJ). In other examples, the power manager 326 can obtain the energy consumption value from the database 335. The power manager 326 can determine whether zero, one, or more of the tasks of the task queue can be executed based on the power budget. For example, the power manager 326 can determine a quantity of the computation tasks in the task queue to execute prior to transitioning the BLE MCU 104 to sleep mode to facilitate charging of the power supply 355.

In some examples, the power manager 326 performs a power evaluation in response to a power evaluation event. The power evaluation event can include a change in assertion or state of one or both of the comparators 358a-b, a timer elapsing, a sudden change in power of the field device 102, a change in amount of data to be transmitted by the field device 102, a change in amount of data to be received from the remote device 360, a change in charging rate, etc. In some examples, the power evaluation event is the first comparator 358a and/or the second comparator 358b transitioning from generating a logic Low signal to asserting a logic High signal. In some examples, the power evaluation event is the first comparator 358a and/or the second comparator 358b transitioning from asserting a logic High signal to generating a logic Low signal. In some examples, the power evaluation event is a start-up of the BLE bridge 104, the field device 102, etc. In some examples, the power evaluation event is an asynchronous trigger from the power manager 326, a computing device, a user via the computing device, an external device such as the remote device 360, etc. In some examples, the power manager 326 reads data from the database 335 indicative of the input power to the power supply 355 corresponding to an output from the field device MCU 350 when a power evaluation event is detected and/or otherwise occurs.

In some examples, the power manager 326 determines a size of a requested communication operation. For example, the power manager 326 may calculate a quantity of data packets, or data quantity, to execute a data transmission operation or a data receiving operation. In some examples, the power manager 326 determines a data rate to support the size of the requested communication operation. For example, the power manager 326 may determine a data transmission rate to send field device information from the BLE interface 340 to the remote device 360 based on an available power budget of the BLE bridge 104, a time-based requirement to complete a communication operation, etc. In some examples, the power manager 326 calculates a maximum transmission rate based on the power evaluation (e.g., the available power budget determined by the power evaluation).

In some examples, the power manager 326 directs the BLE stack handler 330 to adjust a parameter of the BLE interface 340 based on the power evaluation. In such examples, the BLE stack handler 330 can negotiate with a connected device (e.g., the remote device 106 of FIG. 1) to determine whether the parameter can be adjusted and to adjust the parameter based on the negotiation. For example, the power manager 326 may determine an adjustment to a parameter such as a connection interval, a radio power level (e.g., a radio transmission power level, a radio receiving power level, etc.), a payload size, a latency level (e.g., a slave latency level), etc., and/or a combination thereof and direct the BLE stack handler 330 to implement the adjustment. In such examples, the power manager 326 can determine the adjustment based on a power measurement associated with the power supply 355. In some examples, the power manager 326 determines an adjustment to a parameter such as a data interval. For example, the power manager 326 can invoke the BLE stack handler 330 to change a first data interval to a second data interval, where the first data interval and the second data interval correspond to time durations between radiofrequency operations of the BLE interface 340. In an example where the second data interval is a longer data interval than the first data interval, the power manager 326 can invoke the BLE stack handler 330 to adjust to the second data interval to conserve energy (e.g., at least one of the comparators 358a-b is generating a logic Low value). In an example where the second data interval is a shorter data interval than the first data interval, the power manager 326 can invoke the BLE stack handler 330 to adjust to the second data interval to increase a data rate of the BLE interface because the comparators 358a-b are asserting logic High signals and, thus, indicate that the energy storage device 356 is fully charged.

In some examples, the power manager 326 adjusts a power evaluation event timer (e.g., an amount of time in between power evaluations) based on the power evaluation (e.g., the available power budget determined by the power evaluation). For example, the power manager 326 may increase the power evaluation event timer based on determining a relatively low power budget based on the second comparator 358b not asserting a logic High signal. For example, the power manager 326 may reduce a quantity of power evaluations performed within a time period to conserve power of the field device 102. In some examples, the power manager 326 calculates a power evaluation timer based on an input power to the BLE bridge 104, a quantity of stored energy in the power supply 355, a requested amount of power by the BLE stack handler 330 via the BLE interface 340 to transmit or receive data, etc., and/or a combination thereof.

In some examples, the power manager 326 calculates an amount of time (e.g., a stored energy drain time) the BLE interface 340 can drain the stored energy of the power supply 355 based on a configuration (e.g., an instant transmission rate, an instant antenna power, etc.) of the BLE interface 340. For example, the power manager 326 may calculate a power evaluation timer to be less than the stored energy drain time to ensure that the energy status of the field device 102, the BLE bridge 104, etc., is evaluated prior to the BLE bridge 104 consuming enough of the available power budget to create a power starving event (e.g., an event where the field device 102, the BLE bridge 104, etc., cannot perform a function due to not enough available power, an electrical brown out event, etc.). For example, the power manager 326 may adjust a power evaluation event timer based on the input power to the field device 102 measured in mJ/s, the stored energy of the power supply 355 in mJ, and the output power of the field device 102 measured in mJ as described below in Equation (5):

$$\text{Power Evaluation Event Timer} < \frac{\text{stored power mJ}}{\frac{\text{output power mJ}}{\text{second}} - \frac{\text{input power}}{\text{second}}} \quad \text{Equation (5)}$$

In the illustrated example of FIG. 3, the platform manager 320 includes the security manager 332 to handle and/or otherwise facilitate a decryption or an encryption of data packets processed by the BLE bridge 104. In some examples, the security manager 332 is a security controller corresponding to and/or otherwise associated with the one or more processors of the BLE bridge 104 that can execute machine readable instructions. For example, the security controller may be implemented by the one or more processors that can execute the machine readable instructions. In some examples, the security manager 332 deploys either asymmetric encryption algorithms or symmetric encryption algorithms. For example, the security manager 332 may decrypt/encrypt a data packet using a symmetric encryption technique by converting plaintext and converting the plaintext to ciphertext using the same key, or secret, to encrypt and decrypt the text. For example, the security manager 332 may decrypt/encrypt a data packet using the Advanced Encryption Standard (AES) that includes using a block cipher (e.g., the AES-128 block cipher, the AES-192 block cipher, the AES-256 block cipher, etc.) to encrypt and decrypt text included in the data packet. In other examples, the security manager 332 can decrypt/encrypt a data packet using an AES cipher block chaining (AES-CBC) algorithm, a ciphertext feedback (AES-CFB) algorithm, an AES output feedback (AES-OFB) algorithm, a 2-byte CBC message authentication code (CBC-MAC) algorithm, a Galois MAC (GMAC) algorithm, or a keyed-Hashing MAC (HMAC) algorithm. Alternatively, the security manager 332 may decrypt/encrypt a data packet using any other symmetric algorithm. In other examples, the security manager 332 can decrypt/encrypt a data packet using an asymmetric encryption technique by using two independent keys, a first key to encrypt the data packet and a second key to decrypt the data packet. For example, the security manager 332 may decrypt/encrypt a data packet of interest using a Diffie-Hellman key exchange, a Rivest, Shamir and Adleman (RSA) algorithm, or a cryptographic hash function such as secure hash algorithm 1 (SHA-1), SHA-2, or SHA-3. Alternatively, the security manager 332 may decrypt/encrypt the data packet of interest using any other asymmetric encryption technique.

In some examples, the security manager 332 authenticates and/or otherwise validates connections between the field device 102 and external devices such as the remote device 360. For example, the security manager 332 may determine whether the remote device 360 has authorization to exchange data with the field device MCU 350. In such examples, the security manager 332 can receive a first data packet from the remote device 360 corresponding to a request by the remote device 360 to communicate with the field device 102. In response to receiving the request, the security manager 332 may send a second data packet including a signature request to the remote device 360. For example, the signature request may correspond to a signature associated with an Elliptic Curve Digital Signature Algorithm (ECDSA). In response to receiving the signature request, the remote device 360 may generate and transmit a third data packet including the signature to the security manager 332 via the BLE interface 340. The security manager 332 may authenticate the signature provided by the remote device 360 and validate subsequent data packet transfers between the field device 102 and the remote device 360. Alternatively, the security manager 332 may authenticate hardware wanting to communicate with the field device 102 through any other Digital Signature Algorithm (DSA). In some examples, the security manager 332 performs security associated functions such facilitating OTA requests to change a password or setting of the field device 102, generating security alerts (e.g., a connection request alert, a failed connection alert, etc.), authenticating OTA firmware updates, etc.

In the illustrated example of FIG. 3, the BLE bridge 104 includes the BLE stack handler 330 to facilitate communication operations performed by the BLE interface 340. In some examples, the BLE stack handler 330 emulates a serial port connection over a Bluetooth wireless connection. For example, the BLE stack handler 330 may emulate a UART to facilitate communication between the BLE interface 340 and the platform manager 320. In some examples, the BLE stack handler 330 implements a change to a parameter of the BLE interface 340. For example, the BLE stack handler 330 may adjust a connection interval of the BLE interface 340 based on a determination of a connection interval adjustment by the power manager 326. In other examples, the BLE stack handler 330 can adjust a data interval, a radio power level (e.g., a radio transmission power level, a radio receiving power level, etc.), a payload size, a latency level (e.g., a slave latency level), etc., and/or a combination thereof.

In the illustrated example of FIG. 3, the BLE bridge 104 includes the database 335 to record data (e.g., a firmware of the BLE bridge 104, the mode of the field device 102, the protocol address, a parameter of the BLE stack handler 330, a parameter of the BLE interface 340, a task queue, an energy consumption value for a computation task, a data buffer including data indicative of a charging rate of the power supply 355, etc.). The database 335 may respond to queries for information related to data in the database 335. For example, the database 335 may respond to queries for additional data by providing the additional data (e.g., the one or more data points), by providing an index associated with the additional data in the database 335, etc. The example database 335 may additionally or alternatively respond to queries when there is no additional data in the database 335 by providing a null index, an end of database identifier, etc.

The example database 335 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., read-only memory (ROM), electrically erasable programmable read-only memory (EEPROM), flash memory, etc.). The example database 335 may additionally or alternatively be implemented by one or more double data rate (DDR) memories, such as DDR, DDR2, DDR3, DDR4, mobile DDR (mDDR), etc. The example database 335 may additionally or alternatively be implemented by one or more mass storage devices such as hard disk drive(s), CD drive(s) digital versatile disk (DVD) drive(s), solid-state drive(s), etc. While in the illustrated example the database 335 is illustrated as a single database, the database 335 may be implemented by any number and/or type(s) of databases.

In the illustrated example, the BLE bridge 104 includes the BLE interface 340 to transmit information to and/or receive information from an external device such as the remote device 360. The BLE interface 340 of the illustrated example is a radio transceiver operating in the 2.4 GHz unlicensed ISM band. For example, the BLE interface 340 may operate the radio transceiver based on a connection interval, a radio power level, a latency, etc., defined by the power manager 326 and/or the BLE stack handler 330 and/or implemented by the BLE stack handler 330. The BLE interface 340 includes one or more processors executing machine readable instructions that, when executed, can receive and/or transmit BLE information via the BLE connection 370. For example, the BLE interface 340 may include a radio transceiver and at least one processor, where the at least one processor invokes the radio transceiver to receive and/or transmit one or more BLE packets (e.g., based on a BLE configuration parameter). Alternatively, the BLE interface 340 may be a radio transmitter, a radio receiver, or a radio transceiver operating in any other communication band, spectrum, etc.

While an example manner of implementing the BLE bridge 104 of FIGS. 1-2 is illustrated in FIG. 3, one or more of the elements, processes and/or devices illustrated in FIG. 3 may be combined, divided, re-arranged, omitted, eliminated and/or implemented in any other way. Further, the example receiver transmitter interface 300, the example input/output interface 310, the example platform manager 320, the example command processor 322, the example protocol handler 324, the example power manager 326, the example RX/TX interface handler 328, the example BLE stack handler 330, the example security manager 332, the example database 335, the example BLE interface 340, and/or, more generally, the example BLE bridge 104 of FIGS. 1-2 may be implemented by hardware, software, firmware and/or any combination of hardware, software and/or firmware. Thus, for example, any of the example receiver transmitter interface 300, the example input/output interface 310, the example platform manager 320, the example command processor 322, the example protocol handler 324, the example power manager 326, the RX/TX interface handler 328, the example BLE stack handler 330, the example security manager 332, the example database 335, the example BLE interface 340, and/or, more generally, the example BLE bridge 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example receiver transmitter interface 300, the example input/output interface 310, the example platform manager 320, the example command processor 322, the example protocol handler 324, the example power manager 326, the RX/TX interface handler 328, the example BLE stack handler 330, the example security manager 332, the example database 335, and/or the example BLE interface 340 is/are hereby expressly defined to include a non-transitory computer readable storage device or storage disk such as a memory, a DVD, a CD, a Blu-ray disk, etc. including the software and/or firmware. Further still, the example BLE bridge 104 of FIGS. 1-2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
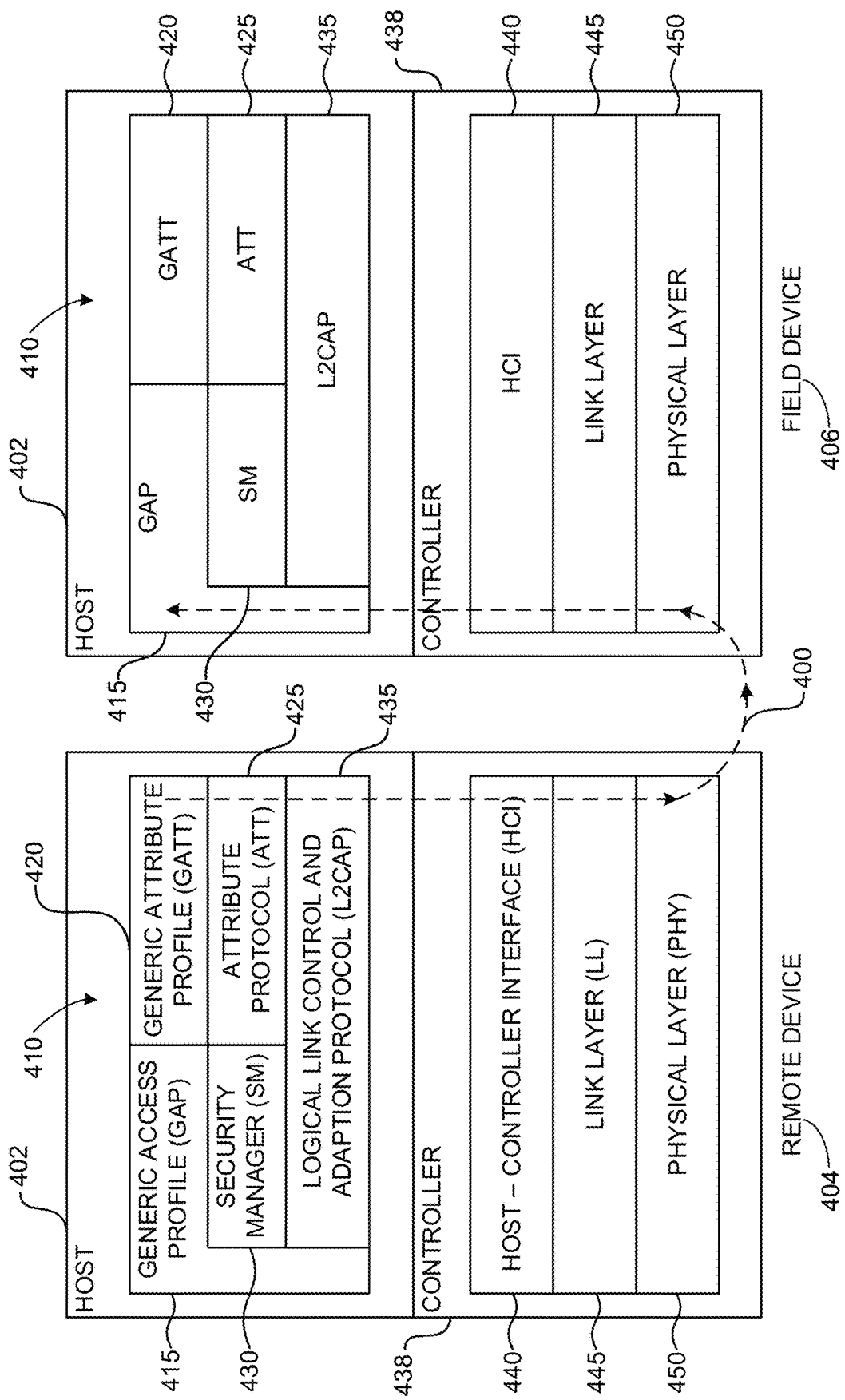
FIG. 4 is a block diagram of an example BLE communication path between an example remote device and an example field device.

FIG. 4 is a block diagram of an example BLE communication path 400 between an example BLE protocol stack 402 of a remote device 404 and the BLE protocol stack 402 of a field device 406. The BLE protocol stack 402 of the illustrated example is based on the Bluetooth Core Specification (e.g., the Bluetooth Core Specification Version 5.0). One or more of the elements, processes and/or blocks illustrated in FIG. 4 may be combined, divided, re-arranged, omitted, eliminated, and/or implemented in any other way. The remote device 404 of the illustrated example of FIG. 4 may correspond to the remote device 106 of FIG. 1, the Remote Devices 1-3 200, 202, 204 of FIG. 2, and/or the remote device 360 of FIG. 3. The field device 406 of the illustrated example of FIG. 4 may correspond to the field device 102 of FIGS. 1-2 and/or the field device MCU 350 of FIG. 3. The BLE protocol stack 402 may be executed with and/or otherwise implemented by the BLE stack handler 330 of FIG. 3. In the illustrated example, the physical layer 450 of the remote device 404 is communicatively coupled to and/or otherwise in communication with the physical layer 450 of the field device 406.

In the illustrated example, the BLE protocol stack 402 includes an example host 410 including an example generic access profile (GAP) layer 415, an example generic attribute profile (GATT) layer 420, an example attribute protocol (ATT) layer 425, an example security manager layer 430, and an example logical link control and adaptation protocol (L2CAP) layer 435. In FIG. 4, the BLE protocol stack 402 includes an example controller 438 including an example host—controller interface (HCI) layer 440, an example link layer 445 and the example physical layer 450.

In the illustrated example of FIG. 4, the BLE protocol stack 402 includes the host 410 to obtain and process application data. For example, the host 410 of the remote device 404 may include an interface to a process control application operating on a standard operating system. In other examples, the host 410 of the field device 406 can include an interface to an application (e.g., a firmware application, a firmware application executing instructions with a processor, etc.) on the field device MCU 350 of FIG. 3. In FIG. 4, the host 410 can correspond to the BLE stack handler 330 packing and unpacking BLE packets for processing by the platform manager 320 of FIG. 3.

In the illustrated example of FIG. 4, the BLE protocol stack 402 includes the GAP layer 415 to define a general topology of the BLE protocol stack 402. For example, the GAP layer 415 defines how the remote device 404 and the field device 406 make themselves available (e.g., broadcasting) and how the remote device 404 and the field device 406 communicate with each other (e.g., connecting). For example, the GAP layer 415 defines the roles of a BLE broadcaster and a BLE observer. For example, a BLE broadcaster may be a device that broadcasts public advertising data packets and a BLE observer may be a device that listens to the data in the advertising packets sent by the broadcaster.

In the illustrated example of FIG. 4, the BLE protocol stack 402 includes the GATT layer 420 to define the roles of a BLE client (e.g., the remote device 106 of FIG. 1) and a BLE server (e.g., the field device 102 of FIGS. 1-3). For example, a BLE client may be a device that sends a request to a GATT server, where the BLE client can read and/or write attributes found in the server. A BLE server may be a device that stores attributes. For example, once the BLE client makes a request, the server must make the attributes available.

In the illustrated example of FIG. 4, the BLE protocol stack 402 includes the ATT layer 425 to define the protocol of transferring the attribute data between the remote device 404 and the field device 406. The example ATT layer 425 includes functionality of the example GATT layer 420 such as Write Request, Write Response, Notification, Read Response, etc. For example, the GATT layer 420 defines and creates appropriate attributes for a given application in the host 410, and the ATT layer 425 creates outgoing data packets and parses incoming data packets that define the action in the GATT layer 420.

In the illustrated example of FIG. 4, the BLE protocol stack 402 includes the security manager layer 430 to process attribute permission levels such as read permissions, write permissions, etc. In some examples, the security manager layer 430 performs services such as device authentication, device authorization, data integrity, data confidentiality, and/or data privacy. In some examples, the security manager layer 430 compares a permission level of a user (e.g., an administrator, an engineer, a user, etc.) to a permission level of an action requested by the user (e.g., a read request, a write request, etc.). In such examples, the security manager layer 430 can prevent a user from performing an action if the permission levels do not match. For example, the security manager layer 430 may discard a data packet corresponding to the unauthorized action and may transmit an error code to the user indicating that the action is unauthorized. In some examples, the security manager layer 430 is bypassed and/or otherwise disabled. For example, the BLE stack handler 330 of FIG. 3 may disable the security manager layer 430 of FIG. 4 to enable the security manager 332 of FIG. 3 to perform security associated functions in place of the security manager layer 430.

In the illustrated example of FIG. 4, the BLE protocol stack 402 includes the L2CAP layer 435 to manage Quality of Service (QoS), routing, fragmentation, and reassembly of data packets for higher layer protocols such as ATT, Security Management Protocol (SMP), etc. In the illustrated example of FIG. 4, the BLE protocol stack 402 includes the HCI layer 440 to interface with the BLE interface 340 of FIG. 3. For example, the HCI layer 440 may transfer BLE commands, BLE events, BLE data packets, etc., between layers of the BLE protocol stack 402. In the illustrated example of FIG. 4, the BLE protocol stack 402 includes the link layer 445 and the physical layer 450 to control, handle, manage, etc., a transfer of L2CAP packets while ensuring delivery (e.g., guaranteed delivery) and integrity of the data.

Figure 5:
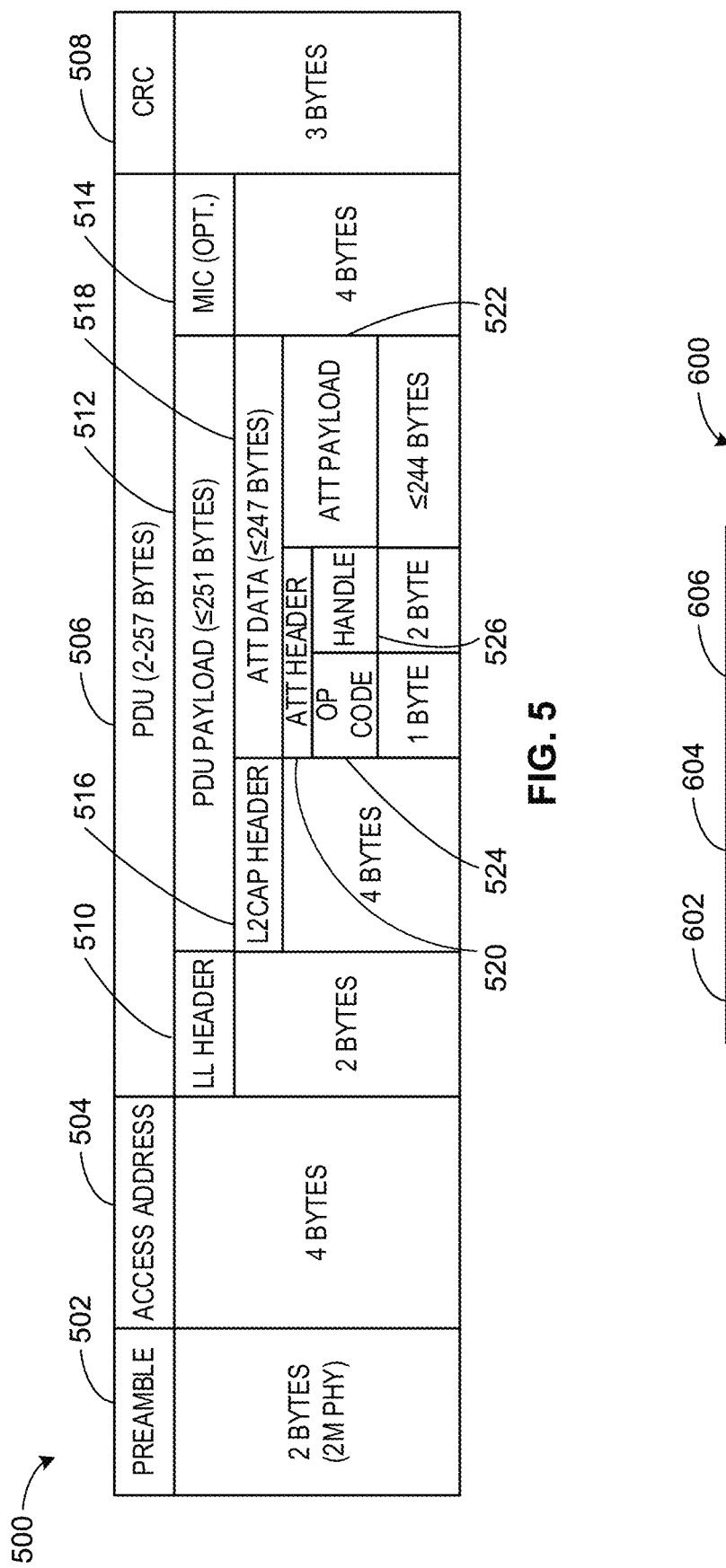
FIG. 5 is a block diagram of an example implementation of an Attribute Protocol packet.

FIG. 5 is a block diagram of an example implementation of an ATT protocol packet 500. In the illustrated example, the ATT protocol packet 500 includes a preamble 502, an access address 504, a protocol data unit (PDU) 506, and a cyclic redundancy check (CRC) 508. The preamble 502 of the illustrated example is a 2-byte value used for synchronization and timing of the receiver of data (e.g., the remote device 404, the field device 406, etc.). For example, a preamble value of 0xAA in a BLE packet may indicate that the BLE packet is a broadcast packet. The access address 504 of the illustrated example is a 4-byte value identifying a BLE device. For example, an access address value of a BLE packet of 0x8E89BED6 may indicate that the BLE packet is a broadcast packet.

In the illustrated example of FIG. 5, the PDU 506 can be a value in a range from 2 to 257 bytes. For example, the power manager 326 of FIG. 3 may determine a size of the PDU 506 based on an available power budget of the BLE bridge 104 of FIG. 3. The PDU 506 includes an example link layer (LL) header 510 which is a 2-byte value which identifies the link layer 445 of FIG. 4. The example PDU 506 includes an example PDU payload 512 which is a value within a range of 0 to 251 bytes. The PDU 506 includes an example message integrity check (MIC) 514 which is a 4-byte value used to evaluate a data integrity of a BLE packet. Alternatively, the MIC 514 may not be used and the 4 bytes of the MIC 514 are reallocated to the PDU payload 512. For example, the PDU payload 512 can have an expanded range of 0 to 255 bytes by not using the MIC 514. In FIG. 5, the PDU payload 512 includes an example L2CAP header 516 which is a 4-byte value identifying the L2CAP layer 435 of FIG. 4.

The PDU payload 512 of the illustrated example of FIG. 5 includes example ATT data 518 which is a value in a range of 0 to 247 bytes. In examples where the MIC 514 is not used, the ATT data 518 can have a range of 0 to 251 bytes. The ATT data 518 includes an example ATT header 520 and an example ATT payload 522. The ATT header 520 is a 3-byte value organized by an example opcode 524 and an example handle 526. The opcode 524 is a 1-byte value that may correspond to an instruction or an operation to be executed. The handle 526 is a 2-byte value which corresponds to an attribute on a GATT server on the example GATT layer 420 of FIG. 4. The ATT payload 522 is a value within a range of 0 bytes to 244 bytes corresponding to data (e.g., field device information, a firmware executable, etc.) to be transmitted to the remote device 404, the field device 406, etc. In examples where the MIC 514 is not used, the ATT payload 522 can have an expanded range of 0 to 248 bytes.

In the illustrated example of FIG. 5, there are one or more elements of the ATT protocol packet 500 that can be adjusted, modified, or removed based on an available power budget. For example, the protocol handler 324 of FIG. 3 may remove the LL header 510, the L2CAP header 516, and/or the MIC 514 prior to transmitting a data packet to the remote device 360 of FIG. 3. In other examples, the power manager 326 of FIG. 3 can instruct the BLE stack handler 330 of FIG. 3 to increase or decrease the size of the PDU 506 based on an available power budget and/or adjust a maximum transmission unit (MTU) parameter. For example, the power manager 326 may invoke the BLE stack handler 330 to negotiate with the remote device 106 of FIG. 1 to increase the size of the PDU 506 from 100 bytes to 257 bytes based on an increase in an available power budget of the BLE bridge 104 and/or an increase in the MTU. In other examples, the power manager 326 can direct the BLE stack handler 330 to negotiate with the remote device 106 of FIG. 1 to decrease the size of the PDU 506 from 257 bytes to 10 bytes based on a decrease in an available power budget of the BLE bridge 104 and/or a decrease in the MTU.

Figure 6A:
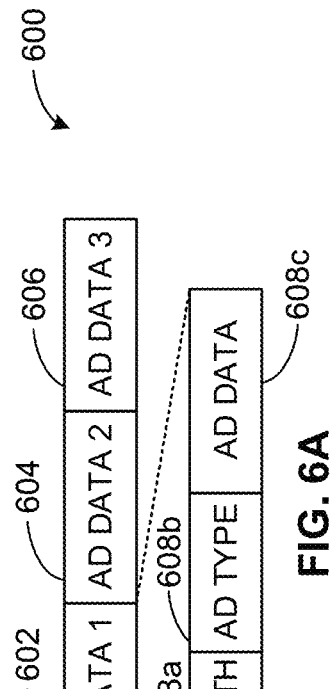
FIG. 6A is a block diagram depicting an example implementation of an example data packet based on an example BLE advertising data format.

FIG. 6A is a block diagram depicting an example implementation of an example BLE advertising data format 600. The BLE advertising data format 600 of the illustrated example is a known legacy BLE PDU format (e.g., based on the Bluetooth Core Specification Version 5.0). The BLE advertising data format 600 describes a format used by a device to generate a BLE packet used for advertising information via a BLE connection. In FIG. 6A, the BLE advertising data format 600 includes three example data structures 602, 604, 606 including AD Data 1 602, AD Data 2 604, and AD Data 3 606, where each one of the data structures 602, 604, 606 includes an example length parameter 608a, an example AD type parameter 608b, and an example AD Data parameter 608c. For example, the length parameter 608a may correspond to a length (e.g., a number of bits, a number of bytes, etc.) of data included in the AD Data parameter 608c. The AD Type parameter 608b may correspond to a data type of the data included in the AD Data parameter 608c. For example, the data type may be a Boolean, an integer, a float, etc.

Figure 6B:
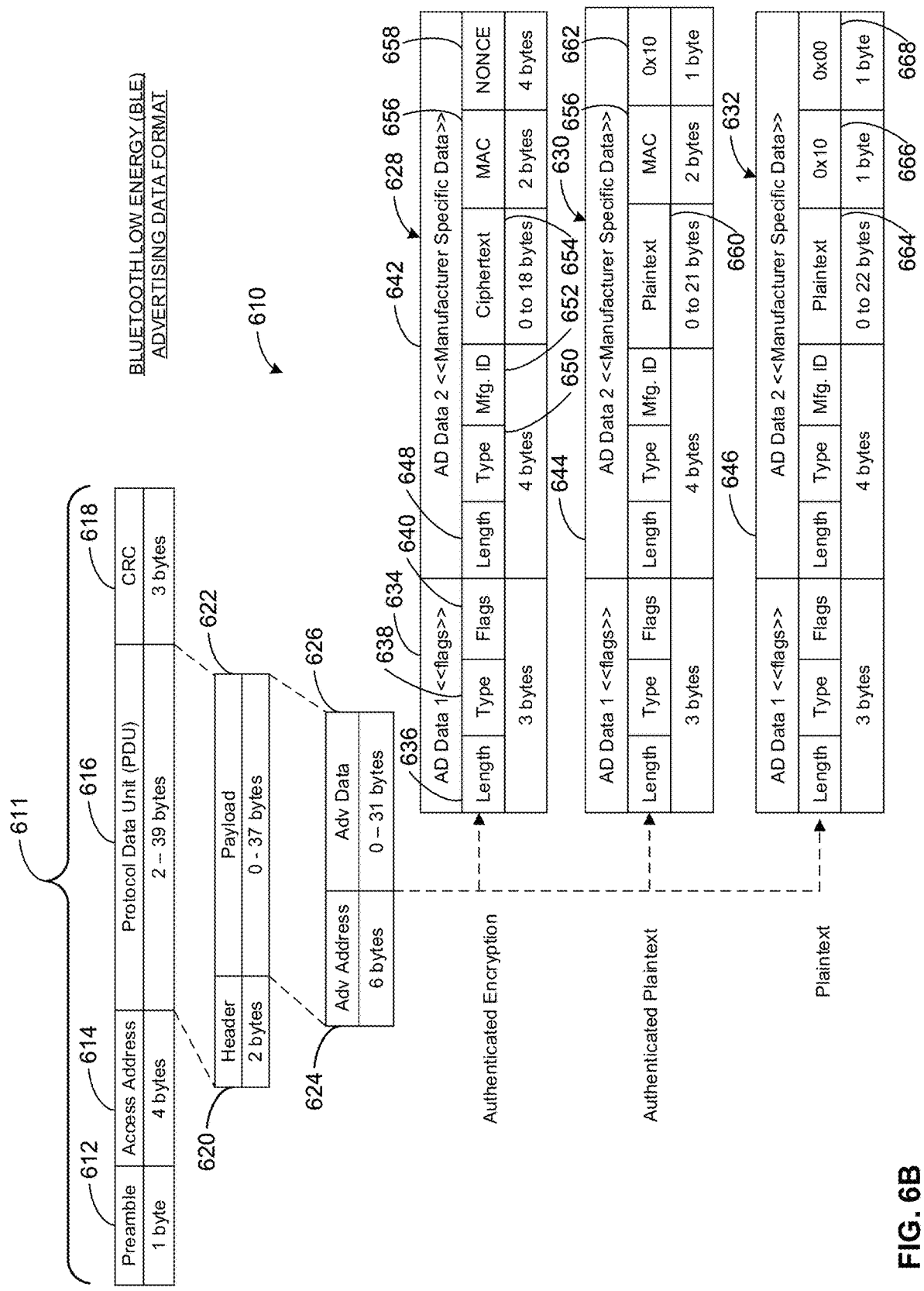
FIG. 6B is a block diagram depicting an example implementation of an example data packet based on an example BLE advertising data format based on the example BLE advertising data format of FIG. 6A.

FIG. 6B is a block diagram of an example data packet 611 based on an example BLE advertising data format 610, which is based on the BLE advertising data format 600 of FIG. 6A. For example, the data packet 611 of FIG. 6B can be an advertising packet, an advertising data packet, etc. The BLE advertising data format 610 describes a format used by a device to generate a BLE packet used for advertising and/or otherwise broadcasting information OTA on a BLE connection. For example, the field device 102 of FIG. 1 may generate an advertising packet based on the BLE advertising data format 610 and transmit the advertising packet to a device (e.g., the remote device 106 of FIG. 1) via the BLE connection 108 of FIG. 1.

In FIG. 6B, the BLE advertising data format 610 includes an example preamble data field 612, an example access address data field 614, an example PDU data field 616, and an example CRC data field 618. In FIG. 6B, the preamble data field 612 has a data size of 1 byte, the access address data field 614 has a data size of 4 bytes, the PDU data field 616 has a data size in a range of 2-39 bytes, and the CRC data field 618 has a data size of 3 bytes. Alternatively, one or more of the preamble data field 612, the access address data field 614, the PDU data field 616, or the CRC data field 618 may have a different data size or data size range. The preamble data field 612 of FIG. 6B can correspond to an identifier that a data packet based on the BLE advertising data format 610 is a broadcast Bluetooth data packet. The access address data field 614 can correspond to an address (e.g., a radio-frequency (RF) address) of the BLE bridge 104, and/or, more generally, an address associated with the field device 102. The PDU data field 616 of FIG. 6B can correspond to a data payload of the data packet. The CRC data field 618 of FIG. 6B can correspond to a CRC value to be used by a receiving device to determine whether the data packet is valid, corrupt, etc. For example, a receiving device such as the remote device 106 of FIG. 1 may reject the data packet by determining that the data packet is corrupt based on the value of the CRC in the CRC data field 618.

In the illustrated example of FIG. 6B, the PDU data field 616 includes an example header data field 620 and an example payload data field 622. The header data field 620 of FIG. 6B has a data size of 2 bytes and the payload data field 622 has a data size in a range of 0-37 bytes. Alternatively, the header data field 620 and/or the payload data field 622 may have a different data size and/or data range. The payload data field 622 of FIG. 6B can correspond to data to be transmitted to the remote device 106 of FIG. 1.

In FIG. 6B, the payload 622 includes an example advertising address (Adv Address) data field 624 and an example advertising data (Adv Data) field 626. The advertising address data field 624 of FIG. 6B has a data size of 6 bytes and the advertising data field 626 has a data size in a range of 0-31 bytes. Alternatively, the advertising address data field 624 and/or the advertising data field 626 may have a different data size and/or data range. The advertising address data field 624 of FIG. 6B can correspond to an address of the BLE bridge 104, and/or, more generally, an address associated with the field device 102 of FIG. 1. For example, the advertising address data field 624 may be assigned and/or otherwise defined by the BLE stack handler 330 of FIG. 3. The advertising data field 626 of FIG. 6B can correspond to data to be transmitted to the remote device 106.

In the illustrated example of FIG. 6B, the advertising data field 626 can be one of three example advertising data formats 628, 630, 632 including a first example advertising data format 628, a second example advertising data format 630, and a third example advertising data format 632. The advertising data field 626 is selected by the field device MCU 350 of FIG. 3 based on a security protocol to be employed by the security manager 332 of FIG. 3. The first advertising data format 628 corresponds to an authenticated encryption security protocol.

The second advertising data format 630 corresponds to an authenticated plaintext security protocol. The third advertising data format 632 corresponds to a plaintext security protocol.

In FIG. 6B, each of the advertising data formats 628, 630, 632 includes example data structure AD Data 1 634. AD Data 1 634 can correspond to broadcasting device description data. For example, AD Data 1 634 may correspond to a <<flags>> data type defined by the Bluetooth Core Specification Version 5.0. For example, AD Data 1 634 may indicate whether the broadcasting device (e.g., the BLE bridge 104) is transmitting at an enhanced data rate, whether the broadcasting device is a low-energy device, etc. In FIG. 6B, AD Data 1 634 includes an example length data field 636, an example type data field 638, and an example flags data field 640. The length data field 636 can correspond to a data size of AD Data 1 634. The type data field 638 can correspond to a data type of data included in the flags data field 640. The flags data field 640 can correspond to data to be transmitted by the broadcasting device. AD Data 1 634 of FIG. 6B has a data size of 3 bytes. For example, the length data field 636, the type data field 638, and the flags data field 640 may each have a data size of 1 byte. Alternatively, each of the data fields 636, 638, 640 of AD Data 1 628 may have a different data size.

In FIG. 6B, each of the advertising data formats 628, 630, 632 has one of second example data structures AD Data 2 642, 644, 646. AD Data 2 642, 644, 646 can correspond to manufacturer specific data. AD Data 2 642, 644, 646 each include a data header that includes an example length data field 648, an example type data field 650, and an example manufacturer identifier (Mfg. ID) data field 652. The length data field 648 can correspond to a data size of data included in AD Data 2 642, 644, 646. The type data field 650 can correspond to a data type (e.g., a float type, an integer type, a string type, etc.) of the data included in AD Data 2 642, 644, 646. The manufacturer identifier data field 652 can correspond to a manufacturer of the broadcasting device. For example, the manufacturer of the field device 102 of FIG. 1 may be Emerson. In such examples, the manufacturer identifier data field 652 of a data packet broadcast by the field device 102 can be 0x04DF.

In the illustrated example of FIG. 6B, AD Data 2 642 of the first advertising data format 628 includes an example ciphertext data field 654, an example message authentication code (MAC) data field 656, and an example nonce data field 658. In FIG. 6B, the ciphertext data field 654 can correspond to encrypted data represented by ciphertext. The MAC data field 656 can correspond to data used by a receiving device to authenticate a message. For example, the remote device 106 may use data included in the MAC data field 656 to confirm that the received data packet came from the stated sender and has not been changed. The MAC defined by the MAC data field 656 may correspond to a MAC based on the CBC-MAC algorithm, the GMAC algorithm, the HMAC algorithm, etc., or any other cryptographic algorithm. The nonce data field 658 is a one-time parameter used to generate an initialization vector for a block cipher (e.g., AES). For example, the BLE bridge 104 may generate a different value for the nonce data field 658 every time a data packet is sent to the remote device 106. In FIG. 6B, the ciphertext data field 654 has a data size in a range of 0-18 bytes, the MAC data field 656 has a data size of 2 bytes, and the nonce data field 658 has a data size of 4 bytes. Alternatively, one or more of the ciphertext data field 654, the MAC data field 656, or the nonce data field 658 may have a different data size and/or range.

In FIG. 6B, AD Data 2 644 of the second advertising data format 630 includes a first example plaintext data field 660, the MAC data field 656 of the first advertising data format 628, and a first example placeholder data field 662. The first plaintext data field 660 can correspond to data in plaintext that has a data size in a range of 0-21 bytes. Alternatively, the first plaintext data field 660 may have a different data size and/or range. As authenticated plaintext security protocol does not need a nonce value, the nonce data field 658 of the first advertising data format 628 has been replaced with the first placeholder data field 662. The first placeholder data field 662 has a data size of 1 byte. Alternatively, the first placeholder data field 662 may have a different size. The first placeholder data field 662 has an example value of 0x10. The value of 0x10 is used to determine a data boundary of the first plaintext data field 660, the MAC data field 656, and the first placeholder data field 662. For example, if the hex representation of the plaintext data field is 0x0000 0000, the hex representation of the MAC data field 656 is 0x0000, then the hex representation of the first placeholder data field 662 can mark the data boundaries when the data fields are concatenated. For example, when concatenated, the hex representation can be 0x0000 0000 0000 10. Reading from right to left, the boundary is apparent. In some examples, to distinguish from ciphertext included in the ciphertext data field 654, the cryptographic nonce value in the nonce data field 658 may not end with 0x10. For example, if the cryptographic nonce value ends with 0x10, the cryptographic nonce value may be incremented by 1 before being used.

In FIG. 6B, AD Data 2 646 of the third advertising data format 632 includes a second example plaintext data field 664, a second example placeholder data field 666, and a third example placeholder data field 668. The second plaintext data field 664 can correspond to data in plaintext that has a data size in a range of 0-22 bytes. Alternatively, the second plaintext data field 664 may have a different data size and/or range. As plaintext security protocol does not need a MAC or a nonce value, the MAC data field 656 of the first and second advertising data formats 628, 630 and the nonce data field 658 of the first advertising data format 628 have been replaced with the second placeholder data field 666 and the third placeholder data field 668, respectively. The second placeholder data field 666 has a data size of 1 byte. Alternatively, the second placeholder data field 666 may have a different size. The second placeholder data field 666 has an example value of 0x10. The value of 0x10 is used to determine a data boundary of the second plaintext data field 664 and the second placeholder data field 666. The third placeholder data field 668 has a data size of 1 byte. Alternatively, the third placeholder data field 668 may have a different size.

In the illustrated example of FIG. 6B, AD Data 2 642, 644, 646 are extendible, flexible structures for advertising data. In some examples, AD Data 2 642, 644, 646 can be structured as required by an operator of the field device 102. For example, an operator in the process control industry can eliminate AD Data 2 642, 644, 646 to implement data privacy (e.g., limit information that is to be broadcasted OTA via a BLE connection) or structure AD Data 2 642, 644, 646 based on requirements of the operator. In such examples, the operator is free to define an order of data, a length of the data up to a maximum PDU size, a number of elements in the data, information included in the data, etc. In some examples, AD Data 2 642, 644, 646 can be dynamic. For example, AD Data 2 642, 644, 646 may be adjustable between data packet transmissions.

Figure 6C:
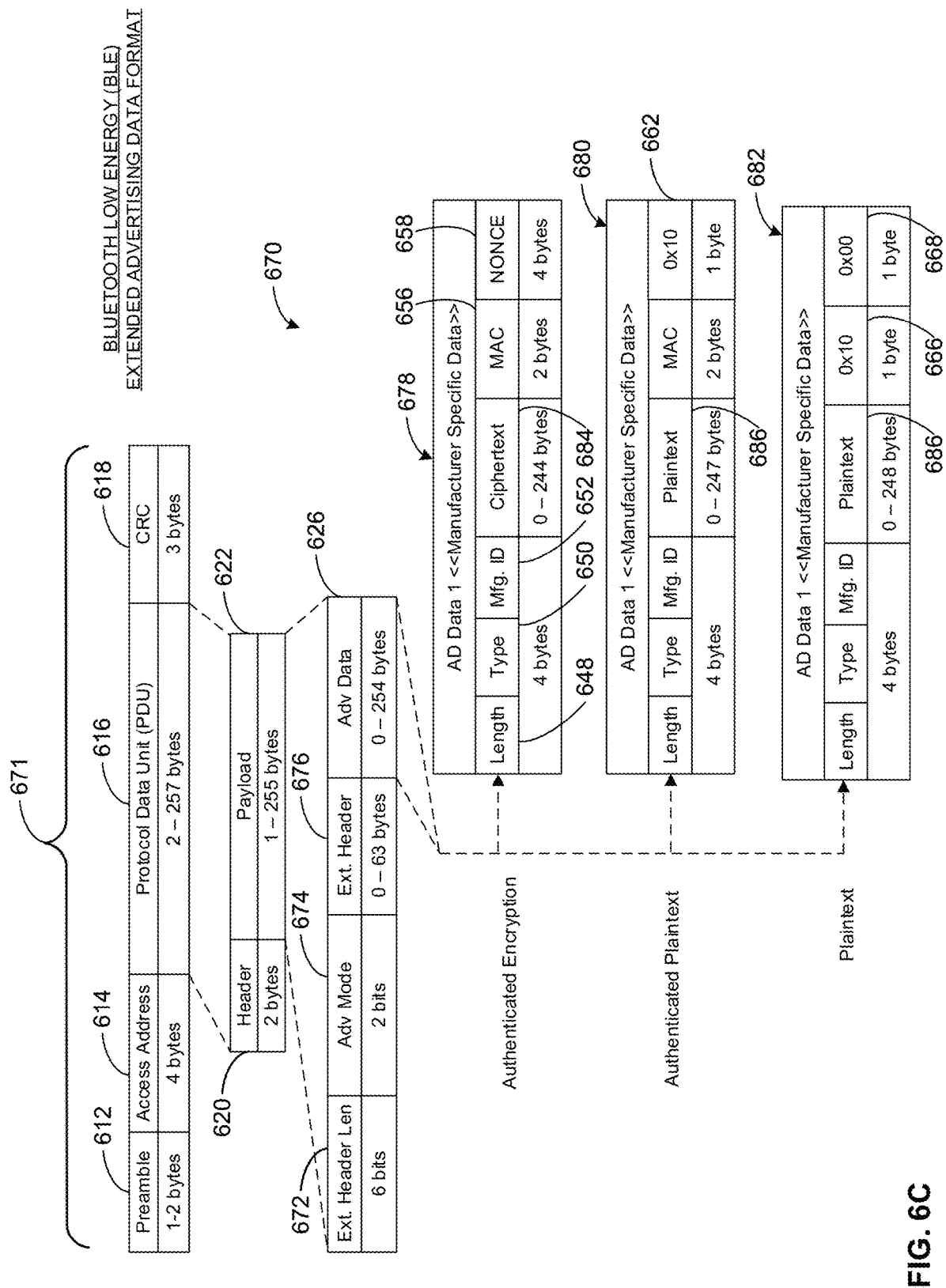
FIG. 6C is a block diagram of an example data packet based on an example BLE extended advertising data format.

FIG. 6C is a block diagram of an example data packet 671 based on an example BLE extended advertising data format 670, which is based on the BLE advertising data format 600 of FIG. 6A. For example, the data packet 671 of FIG. 6C can be an extended advertising packet, an extended advertising data packet, etc. The BLE extended advertising data format 670 describes a format used by a device to generate a BLE packet used for advertising and/or otherwise broadcasting information on a BLE connection. For example, the field device 102 of FIG. 1 may generate an extended advertising packet based on the BLE extended advertising data format 670 and transmit the extended advertising packet to a device (e.g., the remote device 106 of FIG. 1) via the BLE connection 108 of FIGS. 1-2.

In FIG. 6C, the preamble 612 of the BLE extended advertising data format 670 has a data size in a range of 1-2 bytes. In FIG. 6C, the PDU 616 of the BLE extended advertising data format 670 has a data size in a range of 2-257 bytes. In FIG. 6C, the payload 622 of the extended advertising data format 670 has a data size in a range of 1-255 bytes. Alternatively, one or more of the preamble 612, the PDU 616, or the payload 622 may have a different data size and/or range.

In the illustrated example of FIG. 6C, the payload 622 includes the advertising data 626, an example extended header length (Ext. Header Len) 672, an example advertising mode 674, and an example extended header (Ext. Header) 676. In FIG. 6C, the extended header length 672 represents a length of the extended header 676 and has a data size of 6 bits. The advertising mode 674 of FIG. 6C defines a mode of the BLE bridge 104 of FIGS. 1-3 and has a data size of 2 bits. For example, the advertising mode 674 may correspond to a non-connectable and non-scannable mode, a connectable and non-scannable mode, or a non-connectable and scannable mode. The extended header 676 of FIG. 6C defines attributes of the extended advertising event and has a data size in a range of 0-63 bytes. The advertising data 626 of FIG. 6C represents and/or otherwise includes the advertising data to be transmitted to a device (e.g., the remote device 106). The advertising data 626 of FIG. 6C has a data size in a range of 0-254 bytes. Alternatively, one or more of the advertising data 626, the extended header length 672, the advertising mode 674, or the extended header 676 may have a different data size and/or range.

In FIG. 6C, the advertising data 626 can be one of three example extended advertising data formats AD Data 1 678, 680, 682 including a first example extended advertising data format 678, a second example extended advertising data format 680, and a third example advertising data format 682. The advertising data field 626 is selected by the field device MCU 350 of FIG. 3 based on a security protocol to be employed by the security manager 332 of FIG. 3. The first extended advertising data format 678 corresponds to an authenticated encryption security protocol. The second extended advertising data format 680 corresponds to an authenticated plaintext security protocol. The third extended advertising data format 682 corresponds to a plaintext security protocol.

In FIG. 6C, AD Data 1 678, 680, 682 can correspond to manufacturer specific data. AD Data 1 678, 680, 682 each include a data header that includes the length data field 648, the type data field 650, and the manufacturer identifier (Mfg. ID) data field 652 of FIG. 6B. In FIG. 6C, AD Data 1 of the first extended advertising data format 678 includes an example extended ciphertext data field 684, the message authentication code (MAC) data field 656 of FIG. 6B, and the nonce data field 658 of FIG. 6B. In FIG. 6C, the extended ciphertext data field 684 can correspond to encrypted data represented by ciphertext. In FIG. 6C, the extended ciphertext data field 684 has a data size in a range of 0-244 bytes. Alternatively, the extended ciphertext data field 684 may have a different data size and/or range.

In FIG. 6C, AD Data 1 of the second extended advertising data format 680 includes a first example extended plaintext data field 686, the MAC data field 656 of FIG. 6B, and the first placeholder data field 662 of FIG. 6B. The first extended plaintext data field 686 can correspond to data in plaintext that has a data size in a range of 0-247 bytes. Alternatively, the first extended plaintext data field 686 may have a different data size and/or range.

In FIG. 6C, AD Data 1 of the third extended advertising data format 682 includes a second example extended plaintext data field 686, the second placeholder data field 666 of FIG. 6B, and the third placeholder data field 668 of FIG. 6B. The second extended plaintext data field 686 can correspond to data in plaintext that has a data size in a range of 0-248 bytes. Alternatively, the second extended plaintext data field 686 may have a different data size and/or range.

Figure 7A:
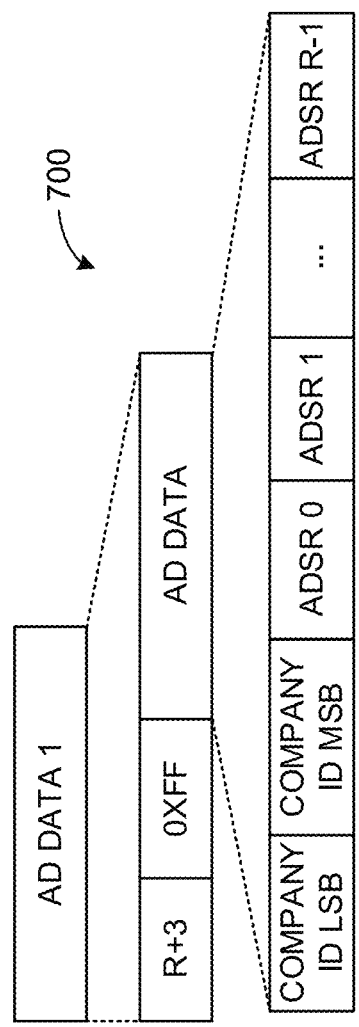
FIG. 7A is a block diagram depicting an example implementation of an example data packet based on an example BLE scan response data format.

FIG. 7A is a block diagram depicting an example implementation of an example BLE scan response data format 700. The BLE scan response data format 700 describes a format used by a device (e.g., an advertising device) to generate a BLE packet in response to receiving a scan request packet (e.g., a device scan packet). For example, the remote device 106 of FIG. 1 may generate a device scan packet in response to receiving an advertising packet (e.g., a packet based on the BLE advertising data format 610 of FIG. 6B, the BLE extended advertising format 670 of FIG. 6C, etc.). In such examples, the remote device 106 can transmit the device scan packet to the field device 102 via the BLE connection 108 of FIG. 1. In response to receiving the device scan packet, the field device 102 may generate a scan response packet based on the BLE scan response data format 700. The field device 102 may transmit the scan response packet to the remote device 106, and/or otherwise facilitate communication of data corresponding to the scan response packet to the remote device 106, via the BLE connection 108. In FIG. 7A, advertising scan response (ADSR) data is concatenated with a total length of R. In some examples, the BLE scan response data format 700 supports both extended advertising and legacy advertising. For example, for extended advertising, the maximum length of R is 247 bytes. In other examples, for legacy advertising, the maximum length is 27 bytes.

Figure 7B:
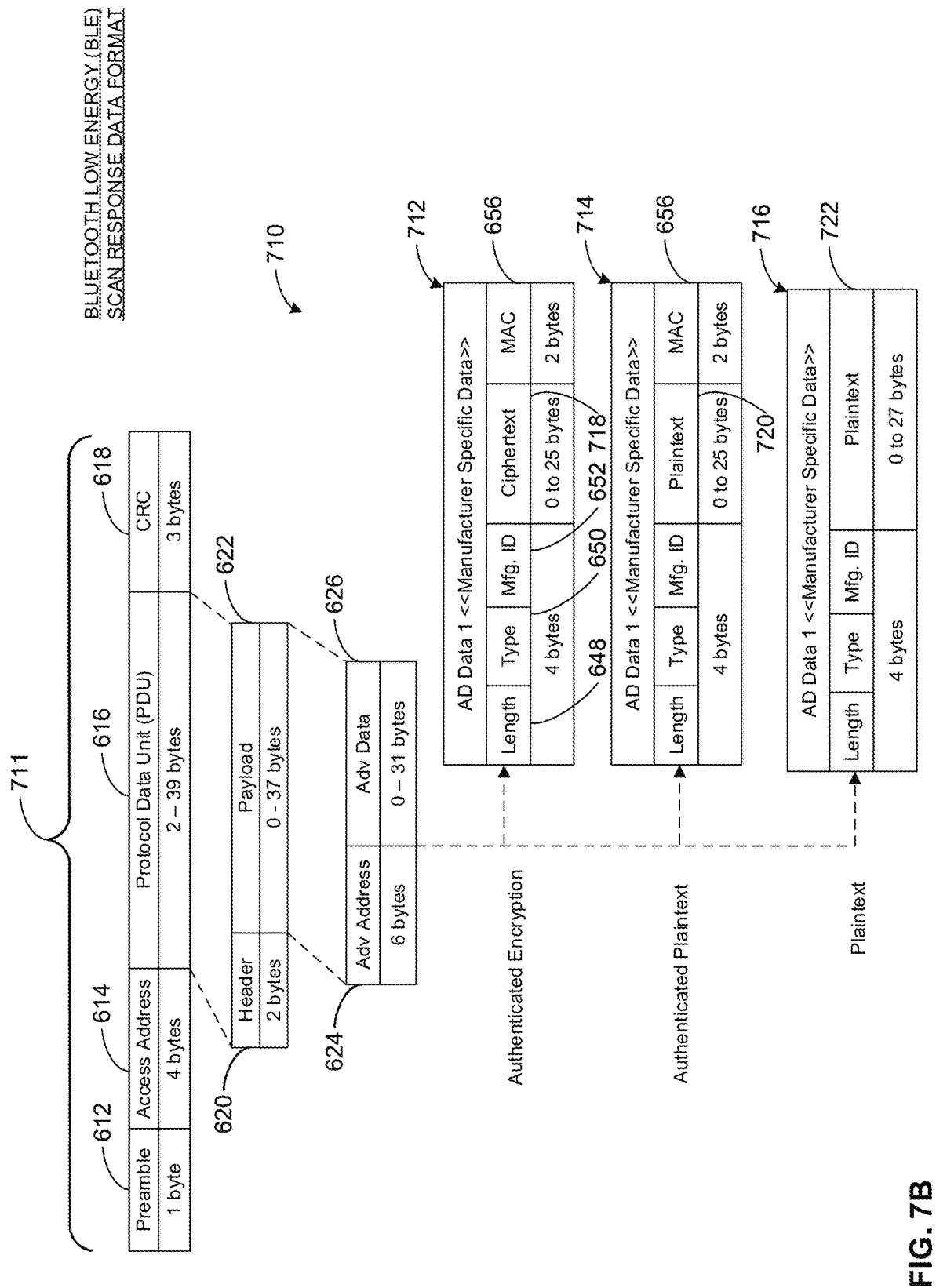
FIG. 7B is a block diagram of an example data packet based on an example BLE scan response data format based on the BLE scan response data format of FIG. 7A.

FIG. 7B is a block diagram of an example data packet 711 based on an example BLE scan response data format 710, which is based on the BLE scan response data format 700 of FIG. 7A. For example, the data packet 711 of FIG. 7B can be a scan response data packet. The BLE scan response data format 710 describes a format used by a device to generate a BLE packet used to respond to a device scan packet in a BLE connection. For example, the field device 102 of FIG. 1 may generate a scan response data packet based on the BLE scan response data format 710 and transmit the scan response data packet to a device (e.g., the remote device 106 of FIG. 1) via the BLE connection 108 of FIG. 1.

In the illustrated example of FIG. 7B, the BLE scan response data format 710 includes the preamble 612, the access address 614, the PDU 616, and the CRC 618 of FIG. 6B. In FIG. 7B, the PDU 616 includes the header 620 and the payload 622 of FIG. 6B. In FIG. 7B, the payload 622 includes the advertising address 624 and the advertising data 626 of FIG. 6B.

In the illustrated example of FIG. 7B, the advertising data 626 can be one of three example scan response data formats AD Data 1 712, 714, 716 including a first example scan response data format AD Data 1 712, a second example scan response data format AD Data 1 714, and a third example scan response data format AD Data 1 716. The advertising data field 626 is selected by the field device MCU 350 of FIG. 3 based on a security protocol to be employed by the security manager 332 of FIG. 3. The first scan response data format 712 corresponds to an authenticated encryption security protocol. The second scan response data format 714 corresponds to an authenticated plaintext security protocol. The third scan response data format 716 corresponds to a plaintext security protocol.

In the illustrated example of FIG. 7B, AD Data 1 712, 714, 716 can correspond to manufacturer specific data. AD Data 1 712, 714, 716 each include a data header that includes the length data field 648, the type data field 650, and the manufacturer identifier (Mfg. ID) data field 652 of FIG. 6B. In FIG. 7B, AD Data 1 of the first scan response data format 712 includes an example ciphertext data field 718 and the message authentication code (MAC) data field 656 of FIG. 6B. In FIG. 7B, the ciphertext data field 718 can correspond to encrypted data represented by ciphertext and has a data size in a range of 0-25 bytes. Alternatively, the ciphertext data field 718 may have a different data size and/or range.

In the illustrated example of FIG. 7B, AD Data 1 of the second scan response data format 714 includes a first example plaintext data field 720 and the MAC data field 656 of FIG. 6B. The first plaintext data field 720 can correspond to data in plaintext that has a data size in a range of 0-25 bytes. Alternatively, the first plaintext data field 720 may have a different data size and/or range. In FIG. 6C, AD Data 1 of the third scan response data format 716 includes a second example plaintext data field 722. The second plaintext data field 722 can correspond to data in plaintext that has a data size in a range of 0-27 bytes. Alternatively, the second plaintext data field 722 may have a different data size and/or range.

Figure 8A:
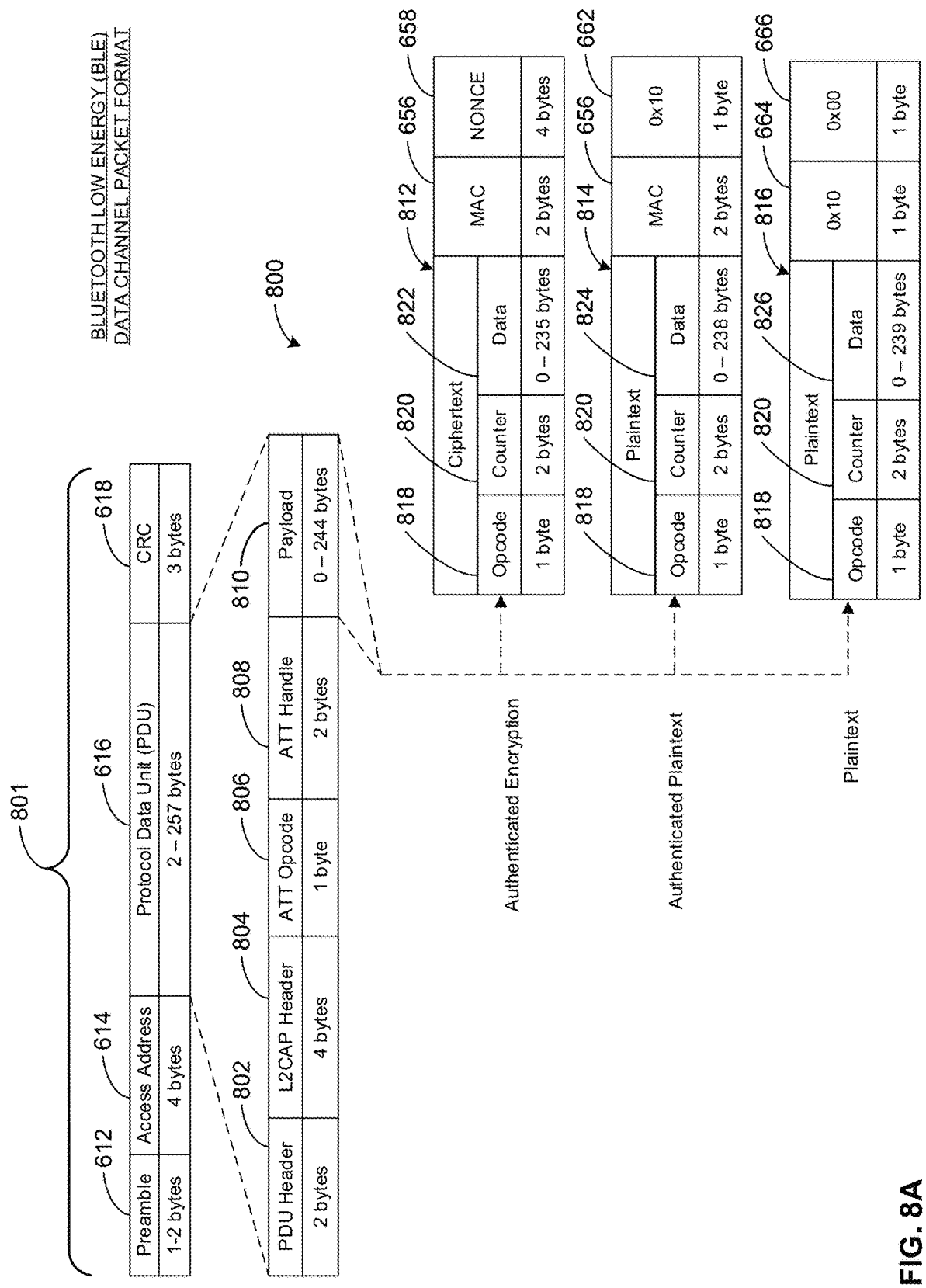
FIG. 8A is a block diagram of an example data packet based on an example BLE data channel packet format.

FIG. 8A is a block diagram of an example data packet 801 based on an BLE data channel packet format 800. For example, the data packet 801 of FIG. 8A can be a BLE data channel packet, a data channel packet, etc. The BLE data channel packet format 800 describes a format used by a device to generate a BLE packet in response to establishing a connection via a BLE connection. For example, the field device 102 of FIG. 1 may generate a BLE data packet based on the BLE data channel packet format 800 and transmit the BLE data packet to a device (e.g., the remote device 106 of FIG. 1) via the BLE connection 108 of FIG. 1. In such examples, the field device 102 and the remote device 106 have established a communication connection via the BLE connection 108.

In the illustrated example of FIG. 8A, the BLE data channel packet format 800 includes the preamble 612, the access address 614, the PDU 616, and the CRC 618 of FIG. 6B. The PDU 616 of FIG. 8A has a data size in a range of 2-257 bytes. Alternatively, the PDU 616 of FIG. 8A may have a different data size and/or range. In FIG. 8A, the PDU 616 includes an example PDU header 802, an example L2CAP header 804, an example ATT opcode 806, an example ATT handle 808, and an example data channel payload 810. The PDU header 802 has a data size of 2 bytes, the L2CAP header 804 has a data size of 4 bytes, the ATT opcode 806 has a data size of 1 byte, the ATT handle 808 has a data size of 2 bytes, and the data channel payload 810 has a data size in a range of 0-244 bytes. Alternatively, one or more of the PDU header 802, the L2CAP header 804, the ATT opcode 806, the ATT handle 808, or the data channel payload 810 may have a different data size and/or range.

In the illustrated example of FIG. 8A, the data channel payload 810 can be one of three example data channel payload formats 812, 814, 816 including a first example data channel payload format 812, a second example data channel payload format 814, and a third example data channel payload format 816. The format of the data channel payload 810 is selected by the field device MCU 350 of FIG. 3 based on a security protocol to be employed by the security manager 332 of FIG. 3. The first data channel payload format 812 corresponds to an authenticated encryption security protocol. The second data channel payload format 814 corresponds to an authenticated plaintext security protocol. The third data channel payload format 816 corresponds to a plaintext security protocol.

In the illustrated example of FIG. 8A, the data channel payload formats 812, 814, 816 each include an example opcode data field 818, an example counter data field 820, and an example data field 822. The opcode data field 818 has a data size of 1 byte and can correspond to a BLE opcode. The counter data field 820 has a data size of 2 bytes and can correspond to a message index used to track a quantity of messages that have been received or transmitted. For example, the counter data field 820 may be used by the BLE bridge 104 of FIGS. 1-3 to prevent a replay attack during an active BLE connection. An example replay attack can occur when an encrypted message is intercepted and replayed at a later time as decryption is not required since the original encrypted message is valid. In some examples, the BLE bridge 104 and/or the remote device 106 of FIG. 1 can reject a message that has a previous index based on analyzing a value of the counter data field 820. For example, the BLE bridge 104 may increment an internal counter when the BLE bridge 104 receives and accepts a valid message. As a result, the BLE bridge 104 will only accept messages with current or future index values. In some examples, future indices are allowed to accommodate instances where messages are dropped and resent with an incremented index.

In the illustrated example of FIG. 8A, the data field 822 has a data size in a range of 0-235 bytes. Alternatively, one or more of the opcode data field 818, the counter data field 820, or the data field 822 may have a different data size and/or range. The opcode data field 818, the counter data field 820, and the data field 822 of the first data channel payload format 812 of FIG. 8A are transmitted using ciphertext. For example, the security manager 332 of FIG. 3 may decrypt the ciphertext representation of the opcode data field 818, the counter data field 820, and the data field 822 by using values included in the MAC data field 656 and the nonce data field 658 of FIG. 6B.

The second data channel payload format 814 of FIG. 8A includes the opcode data field 818 and the counter data field 820 of the first data channel payload format 812. The second data channel payload format 814 includes a first example plaintext data field 824 that has a data size in a range of 0-238 bytes. Alternatively, the first plaintext data field 824 may have a different data size and/or range. The opcode data field 818, the counter data field 820, and the first plaintext data field 824 of the second data channel payload format 814 of FIG. 8A are transmitted using authenticated plaintext. For example, the security manager 332 of FIG. 3 may process the plaintext representation of the opcode data field 818, the counter data field 820, and the first plaintext data field 824 by using values included in the MAC data field 656 and the first placeholder data field 662 of FIG. 6B.

The third data channel payload format 816 of FIG. 8A includes the opcode data field 818 and the counter data field 820 of the first data channel payload format 812. The third data channel payload format 816 includes a second example plaintext data field 826 that has a data size in a range of 0-239 bytes. Alternatively, the second plaintext data field 826 may have a different data size and/or range. The opcode data field 818, the counter data field 820, and the second plaintext data field 826 of the third data channel payload format 816 of FIG. 8A are transmitted using plaintext. For example, the security manager 332 of FIG. 3 may process the plaintext representation of the opcode data field 818, the counter data field 820, and the first plaintext data field 824 by using values included in the second placeholder data field 666 and the third placeholder data field 668 of FIG. 6B.

Figure 8B:
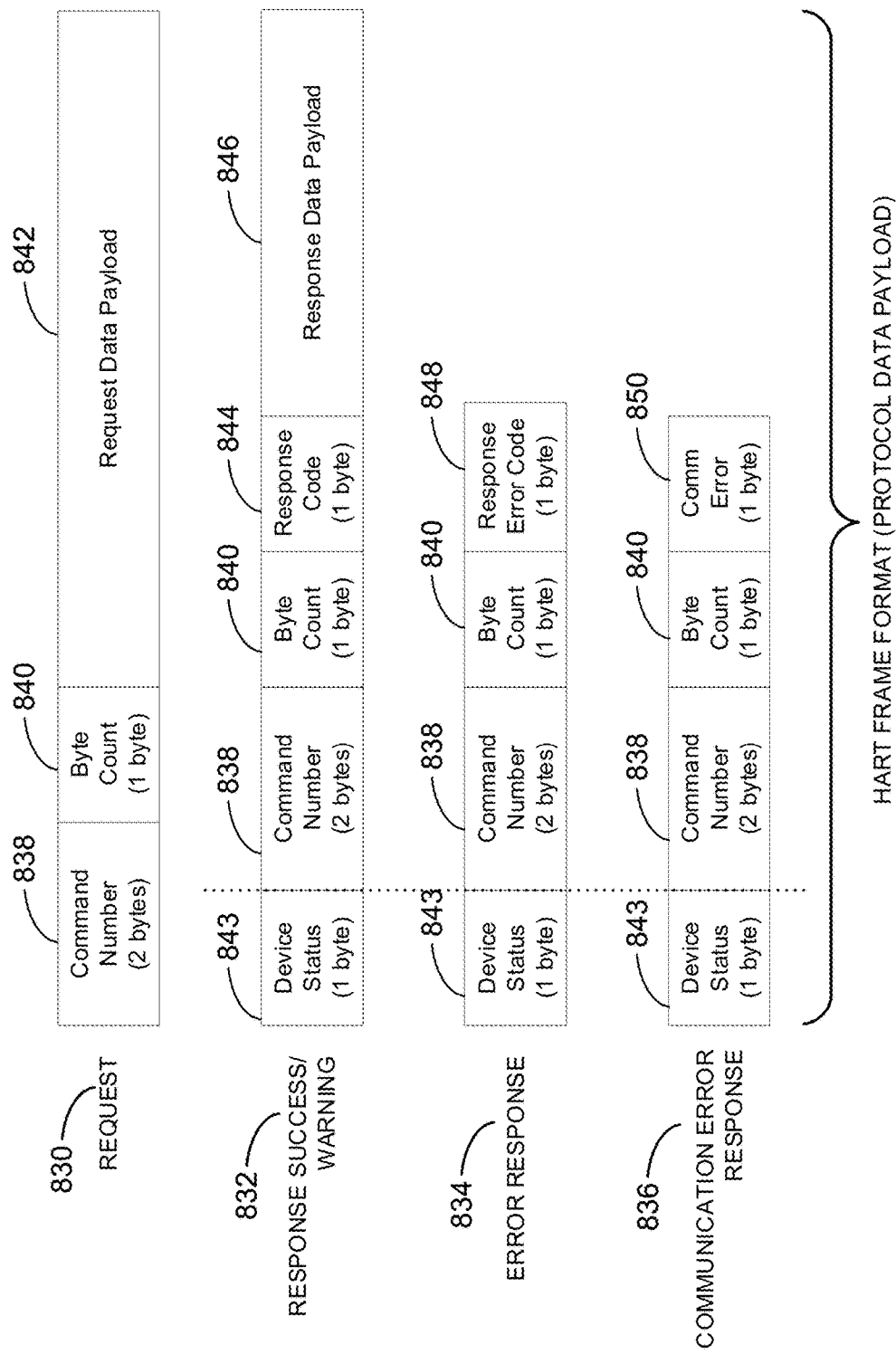
FIG. 8B depicts block diagrams of example industrial protocol data packets that can be processed by the field device of FIGS. 1-2.

FIG. 8B depicts block diagrams of example industrial protocol data packets 830, 832, 834, 836 that can be processed by the field device MCU 350 of FIG. 3. The industrial protocol data packets 830, 832, 834, 836 depicted in FIG. 8B include an example request data packet 830, an example response success/warning data packet 832, an example error response data packet 834, and an example communication error response data packet 836.

In the illustrated example of FIG. 8B, the request data packet 830 can correspond to data transmitted by the remote device 106 of FIG. 1 to the field device 102 of FIG. 1, to request and/or otherwise attempt to retrieve data associated with the field device 102. For example, the remote device 106 may package the request data packet 830 in a BLE data packet and transmit the BLE data packet via the BLE connection 108 of FIG. 1. The request data packet 830 includes an example command number field 838, an example byte count field 840, and an example request data payload 842. The command number field 838 has a data size of 2 bytes and can correspond to a HART protocol command. The byte count field 840 has a data size of 1 byte and can correspond to the counter data field 820 of FIG. 8A. The request data payload 842 has a data size based on whether the request data packet 830 is generated using authenticated encryption security protocol, authenticated plaintext security protocol, or plaintext security protocol in connection with FIG. 8A.

In the illustrated example of FIG. 8B, the response success/warning data packet 832 can correspond to data transmitted by the field device 102 to the remote device 106 of FIG. 1 in response to receiving the response success/warning data packet 832. For example, the field device 102 may package the response success/warning data packet 832 in a BLE data packet and transmit the BLE data packet via the BLE connection 108 of FIG. 1. The response success/warning data packet 832 includes an example device status field 843, the command number field 838, the byte count field 840, an example response code field 844, and an example response data payload 846. The device status field 842 has a data size of 1 byte and can correspond to a HART device status value. The response code 844 has a data size of 1 byte and can correspond to a HART response code. The response data payload 846 has a data size based on whether the response success/warning data packet 832 is generated using authenticated encryption security protocol, authenticated plaintext security protocol, or plaintext security protocol in connection with FIG. 8A.

In the illustrated example of FIG. 8B, the error response data packet 834 can correspond to data transmitted by the field device 102 to the remote device 106 when receiving the response success/warning data packet 832 generates a HART-related error. The error response data packet 834 includes the device status field 843, the command number field 838, the byte count field 840, and an example response error code field 848. The response error code field 848 has a data size of 1 byte and can correspond to a HART response error code.

In the illustrated example of FIG. 8B, the communication error response data packet 836 can correspond to data transmitted by the field device 102 to the remote device 106 when receiving the response success/warning data packet 832 generates a HART-related error (e.g., a HART communication error). The communication error response data packet 836 includes the device status field 843, the command number field 838, the byte count field 840, and an example communication (Comm) error field 850. The communication error field 850 has a data size of 1 byte and can correspond to a HART communication error code.

Figure 8C:
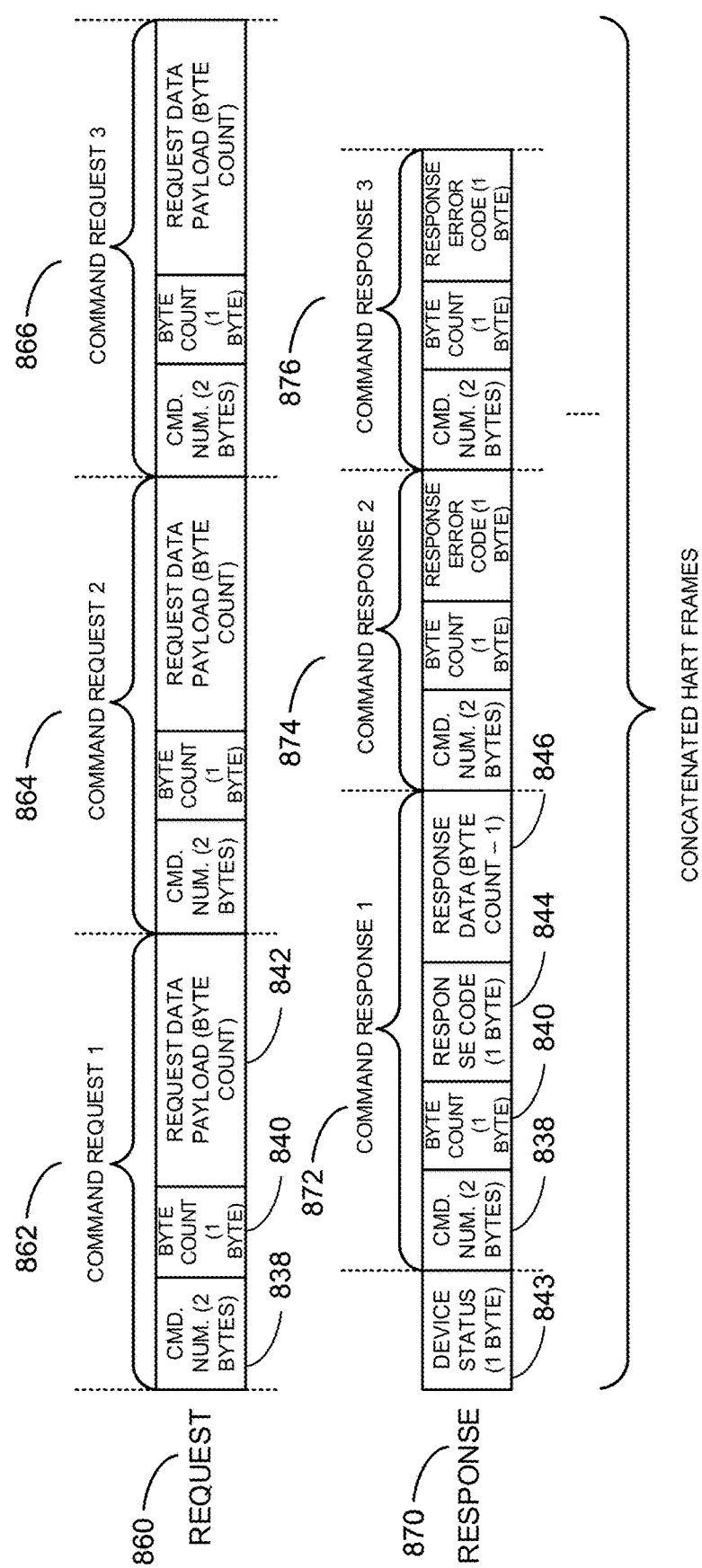
FIG. 8C depicts example concatenated HART frame sets.

FIG. 8C depicts example concatenated HART frame sets 860, 870 including a first example set 860 of concatenated HART request frames and a second example set 870 of concatenated HART response frames. In FIG. 8C, the first set 860 represents three example command request data packets 862, 864, 866. For example, the command request data packets 862, 864, 866 may correspond to the request data packet 830 of FIG. 8B. Each of the command request data packets 862, 864, 866 include the command number field 838, the byte count field 840, and the request data payload 842 of FIG. 8B. For example, the remote device 106 may aggregate a plurality of command request data packets and generate a BLE packet based on the aggregation. In such examples, the remote device 106 can generate a BLE packet based on the BLE data channel packet format 800 of FIG. 8A, where the BLE packet includes the command request data packets 862, 864, 866 of FIG. 8C. For example, the remote device 106 is operative to concatenate and/or otherwise aggregate the command request data packets 862, 864, 866 by incrementing the counter data field 820 of FIG. 8A each time the byte count field 840 of one of the command request data packets 862, 864, 866 is processed.

In the illustrated example of FIG. 8C, the second set 870 represents three example response success/warning data packets 872, 874, 876. Each of the response success/warning data packets 872, 874, 876 include the device status field 843, the command number field 838, the byte count field 840, the response code field 844, and the response data payload 846 of FIG. 8B. For example, the field device 102 may aggregate a plurality of response success/warning data packets 872, 874, 876 and generate a BLE packet based on the aggregation. In such examples, the field device 102 can generate a BLE packet based on the BLE data channel packet format 800 of FIG. 8A, where the BLE packet includes the response success/warning data packets 872, 874, 876 of FIG. 8C. For example, the field device 102 is operative to concatenate and/or otherwise aggregate the response success/warning data packets 872, 874, 876 by incrementing the counter data field 820 of FIG. 8A each time the byte count field 840 of one of the response success/warning data packets 872, 874, 876 is processed.

Figure 9A:
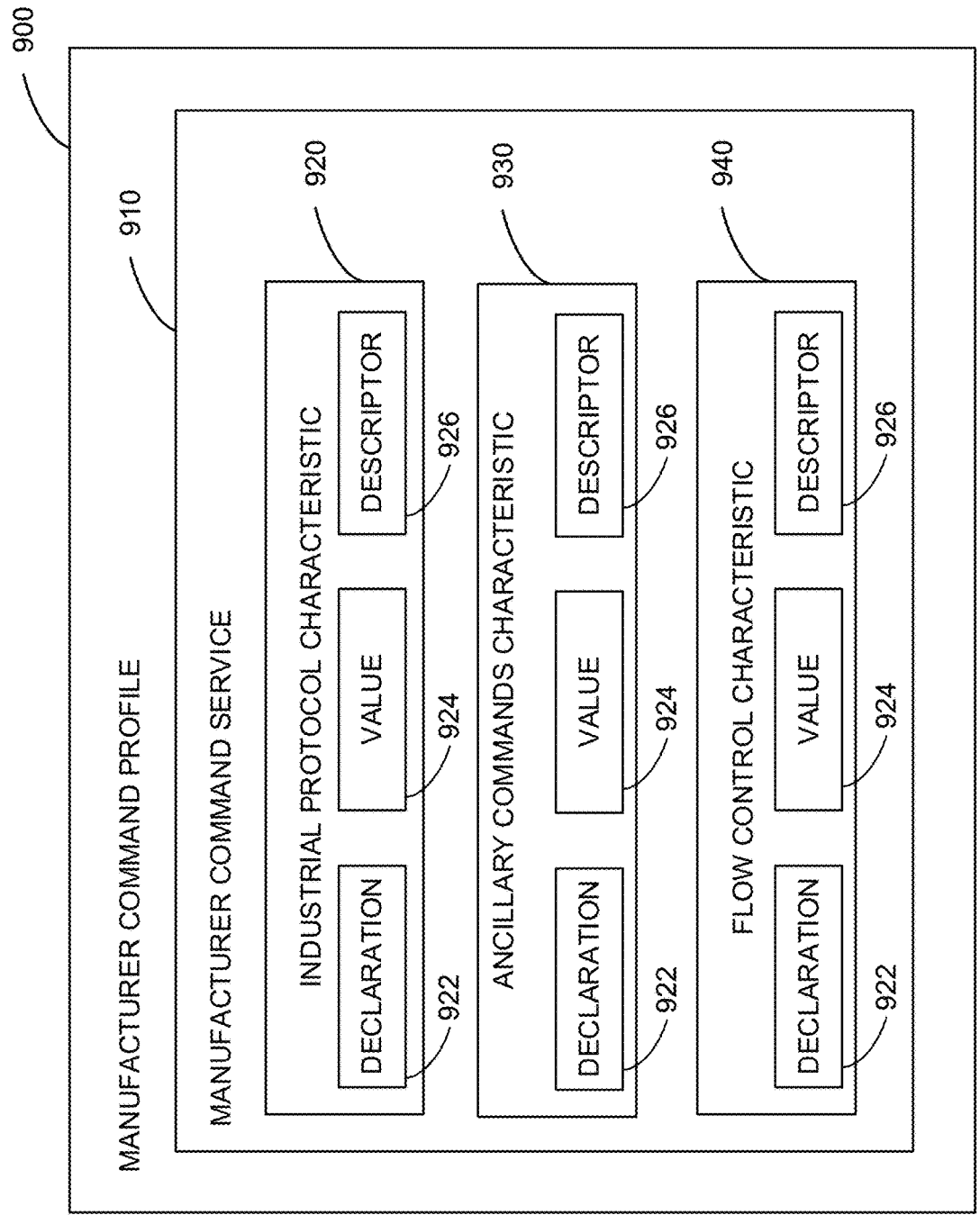
FIG. 9A is a block diagram of an example implementation of an example manufacturer command profile and an example manufacturer command service.

FIG. 9A is a block diagram of an example implementation of an example manufacturer command profile 900 and an example manufacturer command service 910. The manufacturer command profile 900 represents a base functionality including modes and access procedures used by protocol layers such as the GATT layer 420 and the ATT layer 425 of FIG. 4. For example, the manufacturer command profile 900 may process a service, a command, etc., described below in connection with FIGS. 13A-13B. For example, the manufacturer command profile 900 may include a pre-defined or pre-determined collection of services such as the manufacturer command service 910. The manufacturer command service 910 represents functionality to perform commands using the BLE protocol. BLE is organized around reading and writing parameters or characteristics. For example, the manufacturer command profile 900 and the manufacturer command service 910 includes groupings of parameters. In some examples, the manufacturer command service 910 limits access to information or external changes (e.g., write requests to the field device 102 from the remote device 106 of FIG. 1) by declaring values read-only or read-write. For example, the field device 102 may implement a security feature which limits read-write capabilities while the field device 102 is in a secure mode of operation.

The manufacturer command service 910 of the illustrated example of FIG. 9A includes an example industrial protocol characteristic 920 (e.g., an industrial protocol TX characteristic, an industrial protocol RX characteristic, etc.). The industrial protocol characteristic 920 uses an opcode and a payload to support industrial communication protocols such as HART, FOUNDATION Fieldbus, etc., OTA via a BLE connection. In FIG. 9A, the industrial protocol characteristic 920 includes an example declaration structure 922, an example value structure 924, and an example descriptor structure 926. The declaration structure 922 of the illustrated example includes data about the characteristic (e.g., a universally unique identifier (UUID)). The value structure 924 of the illustrated example is a value of the characteristic including data of interest to be transmitted between devices (e.g., firmware data, a pressure value associated with the field device 102, a calibration version value of the field device 102, etc.). The descriptor structure 926 of the illustrated example is used to control behavior of and/or to provide additional information corresponding to the industrial protocol characteristic 920. For example, the descriptor structure 926 may be used when disabling or enabling notifications.

In some examples, a command from the remote device 106 to the field device 102 is sent to the industrial protocol characteristic 920 using a write with a response or a write without a response. In such examples, the field device 102 can respond to the remote device 106 using a notification. For example, writing to the field device 102 with a response is slower and consumes more of an available power budget than writing without a response. In some examples, writing to the field device 102 with a response can be used to assess, determine, etc., whether a BLE connection (e.g., the BLE connection 108 of FIG. 1) is still active (e.g., a user operating the remote device 106 of FIG. 1 did not walk out of range of the BLE bridge 104 of FIG. 1).

In some examples, the remote device 106 of FIG. 1 determines if the BLE connection is still active. For example, to conserve power in the field device 102 of FIG. 1, the remote device 106 may determine when to query the field device 102 with a write with a response command In such examples, the remote device 106 can generate a BLE packet and set an ATT payload to 0 bytes (e.g., the ATT payload 522 of FIG. 5) and transmit the BLE packet to the field device 102. The remote device 106 may determine that the BLE connection 108 is active based on receiving a response BLE packet from the field device 102. In some examples, writes with responses and writes without responses are intermixed to conserve energy of the field device 102. For example, for a large data transfer such as a firmware download to the field device 102, the remote device 106 may transmit first commands including writes with responses and intermix the first commands with second commands including writes without responses. For example, the remote device 106 may transmit one of the first commands for every ten of the second commands to increase a data rate of the firmware download and to reduce an amount of energy used in executing the firmware download.

The manufacturer command service 910 of FIG. 9A includes an example ancillary commands characteristic 930. The ancillary commands characteristic 930 uses an opcode and a payload to support ancillary commands over the BLE connection. For example, an ancillary command may be a password challenge for security authentication, device information queries, etc. In other examples, an ancillary command can be a BLE operation such as ping, reboot, restore to factory default, set device name, kill radio, upload firmware, etc., as described below in connection with FIGS. 13A-13B. In FIG. 9A, the ancillary commands characteristic 930 includes the declaration structure 922, the value structure 924, and the descriptor structure 926. In FIG. 9A, a separation of the industrial protocol characteristic 920 and the ancillary commands characteristic 930 improves a facilitation of BLE communication by enabling a fully encrypted message to be sent directly to the field device MCU 350 of FIG. 3. For example, by combining the industrial protocol characteristic 920 and the ancillary commands characteristic 930, the security manager 332 of FIG. 3 must decrypt the message, sort through a plurality of op codes (e.g., to determine whether the message is an industrial protocol related message or an ancillary command), re-encrypt the message, and transmit the re-encrypted message to the field device MCU 350. By separating the industrial protocol characteristic 920 and the ancillary commands characteristic 930, the BLE bridge 104 can transmit a received encrypted message directly to the field device MCU 350.

In the illustrated example of FIG. 9A, the manufacturer command service 910 includes an example flow control characteristic 940 (e.g., an RX flow control characteristic, a TX flow control characteristic, etc.). In some examples, the flow control characteristic 940 is used to emulate a UART connection. In FIG. 9A, the flow control characteristic 940 includes the declaration structure 922, the value structure 924, and the descriptor structure 926. Although the descriptor structure 926 is shown in the industrial protocol characteristic 920, the ancillary commands characteristic 930, and the flow control characteristic 940, alternatively, the descriptor structure 926 may be removed from one or more of the industrial protocol characteristic 920, the ancillary commands characteristic 930, or the flow control characteristic 940.

In some examples, the flow control characteristic 940 is used to facilitate communication of large data exchanges (e.g., 100 kilobytes, 400 kilobytes, etc.) between devices. For example, a RX flow control characteristic included in the flow control characteristic 940 may be used to process a receipt of a large data exchange. In other examples, a TX flow control characteristic included in the flow control characteristic 940 can be used to process a transmission of a large data exchange. An example instance of a large data exchange is for downloading firmware information from the remote device 106 of FIG. 1 to the field device 102 of FIG. 1. For example, the flow control characteristic 940 can include notification commands to start or stop data transfers (e.g., transmission data transfers, receiving data transfers, etc.). For example, the field device 102 of FIG. 1 may use the RX flow control characteristic included in the flow control characteristic 940 to generate a data packet and transmit the data packet to the remote device 106 of FIG. 1 to start receiving a data transfer from the remote device 106 at the field device 102.

FIG. 9B is an example table 950 of an example implementation of the manufacturer command service 910 of FIG. 9A. The table 950 of FIG. 9B includes the industrial protocol characteristic 920, the ancillary commands characteristic 930, and the flow control characteristic 940 of FIG. 9A, where the TX and RX data flows are combined and/or otherwise integrated. Each of the industrial protocol characteristic 920, the ancillary commands characteristic 930, and the flow control characteristic 940 of FIG. 9B has a data flow corresponding to either from a client device (e.g., the remote device 106 of FIG. 1) to a field device (e.g., the field device 102) or from the field device to the client device. Each of the characteristics 920, 930, 940 has a characteristic property of a write without response/notify. For example, the remote device 106 may transmit a message (e.g., one or more BLE data packets) including a write command to the field device 102, where the field device 102 does not respond to the remote device 106 but generates a notification to the remote device 106 that the field device 102 has received the message.

FIG. 9C is an example table 960 of another example implementation of the manufacturer command service 910 of FIG. 9A, where TX and RX data flows are separate. The table 960 of FIG. 9C includes an example industrial protocol RX characteristic 962, an example industrial protocol TX characteristic 964, an example ancillary commands RX characteristic 966, an example ancillary commands TX characteristic 968, an example flow control RX characteristic 970, and an example flow control TX characteristic 972. For example, the industrial protocol characteristic 920 of FIGS. 9A-9B can be divided into the industrial protocol RX characteristic 962 and the industrial protocol TX characteristic 964 of FIG. 9C. In other examples, the ancillary commands characteristic 930 of FIGS. 9A-9B can be divided into the ancillary commands RX characteristic 966 and the ancillary commands TX characteristic 968 of FIG. 9C. In yet other examples, the flow control characteristic 940 of FIGS. 9A-9B can be divided into the flow control RX characteristic 970 and the flow control TX characteristic 972 of FIG. 9C.

In the illustrated example of FIG. 9C, the data flow is unidirectional. For example, the characteristics 962, 964, 966, 968, 970, 972 of FIG. 9C can have either a client to field device data flow or a field device to client data flow. In FIG. 9C, the characteristics 962, 964, 966, 968, 970, 972 can have characteristic properties of either a write with response, write without response or a read/notify. For example, the industrial protocol RX characteristic 962 has a data flow of client to field device and a characteristic property of write with response, write without response. In such examples, the industrial protocol RX characteristic 962 facilitates the remote device 106 of FIG. 1 transmitting a message to the field device 102, where the message includes either a write with a response command or a write without a response command. The write with the response command can correspond to the field device 102 generating and transmitting a response message to the remote device 106 when the field device 102 receives the message. The write without the response command can correspond to the field device 102 not generating a response message when the field device 102 receives the message. In FIG. 9C, the read/notify characteristic property can correspond to the field device 102 transmitting a message including a read command to the remote device 106 of FIG. 1, where the remote device 106 generates and transmits a notification message to the field device 102 when the remote device 106 receives the message.

FIG. 10 is an example table 1000 depicting example attributes (e.g., data attributes) 1010, 1020, 1030 corresponding to a characteristic of a manufacturer command service, where the characteristic includes both TX and RX characteristics. In FIG. 10, the attributes 1010, 1020, 1030 are in a standard GATT format defined by the Bluetooth Special Interest Group. In FIG. 10, the table 1000 includes the declaration structure 922, the value structure 924, and the descriptor structure 926 of FIG. 9A. In some examples, the declaration structure 922 and the value structure 924 are mandatory while the descriptor structure 926 is optional.

In the table 1000 of FIG. 10, the declaration structure 922 defines the properties for the value structure 924. The declaration structure 922 includes example declaration attributes 1010 including an example handle field 1012, an example type field 1014, an example permissions field 1016, and an example properties field 1018. For example, the declaration structure 922 of the industrial protocol characteristic 920 of FIG. 9A may define the value structure 924 to be a read-only permission with no response action based on the information included in the bytes corresponding to the permission field 1016 and the properties field 1018. In the illustrated example of FIG. 10, the value of the type field 1014 for the declaration structure 922 is 0x2803 (e.g., the first index [0] value of 0x03 and the second index [1] value of 0x28 are combined to form 0x2803). In such examples, the value of 0x2803 is in little endian format and corresponds to a Characteristic Declaration with a defined format. Alternatively, the example value may be 0x2802 corresponding to an Include Declaration, a 0x2800 corresponding to a Primary Service Declaration, or a 0x2801 corresponding to a Secondary Service Declaration.

In the illustrated example of FIG. 10, the value structure 924 includes the handle field 1012, the type field 1014, the permissions field 1016, and an example data field 1019. For example, the remote device 106 may generate a data packet to be written to the field device 102 by including the GATT_PERMIT_WRITE_NO_RSP permission in the value structure 924 of the data packet. In such examples, the remote device 106 can write data included in the data field 1019 to the field device 102. In the illustrated example of FIG. 10, the descriptor structure 926 includes the handle field 1012, the type field 1014, the permissions field 1016, and the data field 1019. For example, the remote device 106 may disable notifications on the field device 102 by including the GATT PERMIT READ permission and including a value of 0x0000 (e.g., a value corresponding to disabling notifications) in a data packet and transmitting the data packet to the field device 102.

FIG. 11 is an example table 1100 depicting the declaration attributes 1010 and the value attributes 1020 corresponding to a characteristic of a manufacturer command service, where the characteristic separates TX and RX characteristics. The table 1100 of FIG. 11 can correspond to the declaration structure 922 and the value structure 924 of FIG. 9A of an industrial protocol TX characteristic included in the industrial protocol characteristic 920 of FIG. 9A, an ancillary commands TX characteristic included in the ancillary commands characteristic 930 of FIG. 9A, and/or a flow control TX characteristic included in the flow control characteristic 940 of FIG. 9A. For example, the table 1100 may correspond to the declaration structure 922 and the value structure 924 of the industrial protocol characteristic 920 of FIG. 9A.

FIG. 12 is an example table 1200 depicting the declaration attributes 1010, the value attributes 1020, and the descriptor attributes 1030 of FIG. 10 corresponding to a characteristic of a manufacturer command service, where the characteristic separates TX and RX characteristics. The table 1200 of FIG. 12 can correspond to an industrial protocol RX characteristic included in the industrial protocol characteristic 920 of FIG. 9A, an ancillary commands RX characteristic included in the ancillary commands characteristic 930 of FIG. 9A, and/or a flow control RX characteristic included in the flow control characteristic 940 of FIG. 9A. In FIG. 12, the table 1200 includes the declaration structure 922, the value structure 924, and the descriptor structure 926 of FIG. 9A. For example, the table 1200 may correspond to the declaration structure 922, the value structure 924, and the descriptor structure 926 of the industrial protocol characteristic 920 of FIG. 9A.

FIG. 13A is an example table 1300 depicting example services 1310 corresponding to Application Program Interface (API) commands. The table 1300 includes the services 1310 arranged by category such as System, GAP, hardware (HW) Authentication, Login, Diffie-Hellman (DH) Key Exchange, and over-the-air request (OTAR). Each of the services 1310 has corresponding example permission levels 1320, 1330, 1340, such as an example user permission level 1320, an example cryptographic (crypto) officer permission level 1330, and an example unauthenticated permission level 1340. For example, the ping service in the system category (e.g., SYSTEM PING) requires a user permission level to be invoked and/or otherwise accessed.

In some examples, the manufacturer command profile 900 of FIG. 9A can utilize the services 1310 listed in the table 1300 of FIG. 13A. For example, the BLE bridge 104 of FIGS. 1-3 operating using the manufacturer command profile 900 may map a value of an opcode included in a data packet to permission settings such as the user permission level 1320, the crypto officer permission level 1330, and/or the unauthenticated permission level 1340. In some examples, by mapping the available services 1310 to permission settings, security checks and protocols can be implemented to ensure safe and reliable operation of the field device 102 of FIG. 1. Additionally or alternatively, there may be fewer or more than the number of services 1310 depicted in the table 1300 of FIG. 13A.

FIG. 13B is an example table 1350 depicting an example format of an example API command 1360 and an example API response 1370. The API command 1360 and the API response 1370 can correspond to the ping service included in the services 1310 of FIG. 13A. The table 1350 includes a type field, a length field, and a payload field. The type field includes a command (CMD) action and a response (RSP) action. For example, a command action has a byte length of 0x00 and a response action has a byte length of 0x06. In the table 1350 of FIG. 13B, the payload field includes an opcode field, a byte index field, and a value field. For example, the API command 1360 corresponding to the SYSTEM_PING API includes an opcode value of 0x00, where byte indices [0-3] correspond to a unit32 value corresponding to seconds since last reboot and byte indices [4-5] correspond to a unit16 value corresponding to fractions of a second (e.g., 1/32768 of a second fraction) since last reboot. For example, the remote device 106 may send an RSP type SYSTEM_PING command to the field device 102. In such examples, the field device 102 can transmit a data packet response to the remote device 106 including a time value corresponding to the seconds and the fractions of a second since the last reboot of the field device 102. In FIG. 13B, the payload is represented in plaintext. Alternatively, the payload may be represented in an encrypted form such as ciphertext.

Figure 14:
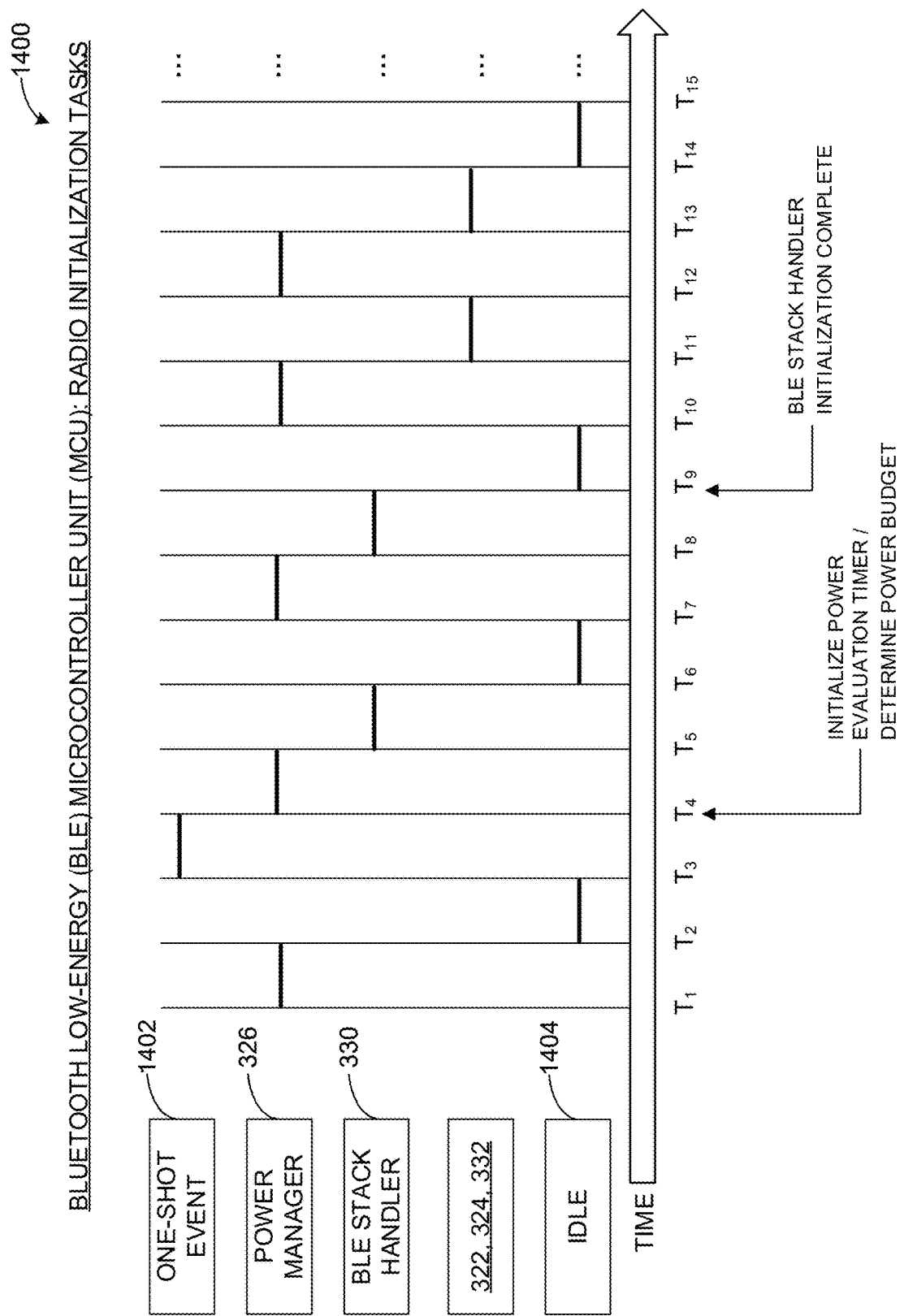
FIG. 14 depicts a first example timing diagram corresponding to example radio initialization tasks executed by the example network bridge of FIGS. 1-3.

FIG. 14 depicts a first example timing diagram 1400 corresponding to radio initialization tasks executed by the BLE MCU 104 of FIGS. 1-3. For example, the first timing diagram 1400 may correspond to the BLE MCU 104 initializing the BLE interface 340 of FIG. 3. The first timing diagram 1400 depicts when an example one-shot event 1402 is executed with respect to time. The first timing diagram 1400 depicts when the power manager 326 of FIG. 3, the BLE stack handler 330 of FIG. 3, and/or at least one of the command processor 322, the protocol handler 324, or the security manager 332 of FIG. 3 are executing one or more computation tasks. In FIG. 14, the one-shot event 1402 has a first highest priority (e.g., having a priority value of 5), the power manager 326 has a second highest priority (e.g., having a priority value of 4), the BLE stack handler 330 has a third highest priority (e.g., having a priority value of 3), and the command processor 322, the protocol handler 324, and/or the security manager 332 have a fourth highest priority (e.g., having a priority value of 2, less than 2, etc.).

In the illustrated example of FIG. 14, the BLE MCU 104 powers on and/or otherwise begins to initialize at a first example time ($T_1$). At the first time, the power manager 326 has the second highest priority level (e.g., the priority value of 5). At the first time, the power manager 326 sets all other modules of the BLE MCU 104 to idle (e.g., having a priority level of −1). For example, the power manager 326 may set the priority level of the command processor 322, the BLE stack handler 330, etc., to the lowest priority level. After the power manager 326 sets the priorities of the BLE MCU 104 modules, the power manager 326 puts the BLE MCU 104 in an example sleep or idle mode 1404 from a second example time ($T_2$) until a third example time ($T_3$).

At the third time, the one-shot event 1402 triggers an interrupt that invokes the power manager 326 to become active. For example, an assertion of one or both comparators 358a-b may generate hardware interrupt(s) to invoke the BLE MCU 104 to exit the idle mode 1404. In some examples, the one-shot event 1402 is a clock event (e.g., a rising edge of a clock signal generated by a clock of the BLE MCU 104). In some examples, the one-shot event 1402 is a power evaluation event, such as a change in a state of one or both of the comparators 358a-b of FIG. 3. For example, the first comparator 358a may transition from generating a logic Low signal to asserting a logic High signal. The input/output interface 310 of FIG. 3 may generate an interrupt to invoke the power manager 326 to transition from a sleep mode to an active mode in response to an output of the first comparator 358a transitioning from the logic Low signal to the logic High signal.

In response to the invoking by the one-shot event 1402 at the third time, the power manager 326 operates from a fourth example time ($T_4$) until a fifth example time ($T_5$). During the time period from the fourth time to the fifth time, the power manager 326 performs one or more operations. For example, the power manager 326 may initialize a power evaluation timer. The power manager 326 can obtain a task queue from the database 335, where the task queue includes one or more computation tasks to be executed by the BLE stack handler 330, the security manager 332, etc. The task queue may include one or more initialization tasks to be executed by the BLE stack handler 330, the security manager 332, etc. In other examples, the power manager 326 can determine a power budget of the BLE MCU 104 by performing a power evaluation at the fourth time. For example, the power manager 326 may measure the voltage associated with the power supply 355 by obtaining the digital input signals from the comparators 358a-b to determine available energy that can be consumed by the one or more tasks in the task queue.

At a fifth example time ($T_5$), the power manager 326 invokes the BLE stack handler 330 to initialize. For example, the BLE stack handler 330 may consume energy from the power budget to obtain parameters from the database 335, configure the BLE interface 340, etc. In the first timing diagram 1400, due to the limited power budget made available to the BLE MCU 104 by the field device 102, the BLE stack handler 330 initializes after two or more control cycles, including the BLE MCU 104 entering the idle mode 1404 from the sixth example time ($T_6$) until a seventh example time ($T_7$), and completes initialization at the end of an eighth example time ($T_8$). After the BLE stack handler 330 completes initialization, the power manager 326 proceeds with initialization of at least one of the command processor 322, the protocol handler 324, or the security manager 332 from the ninth time onward.

Figure 15:
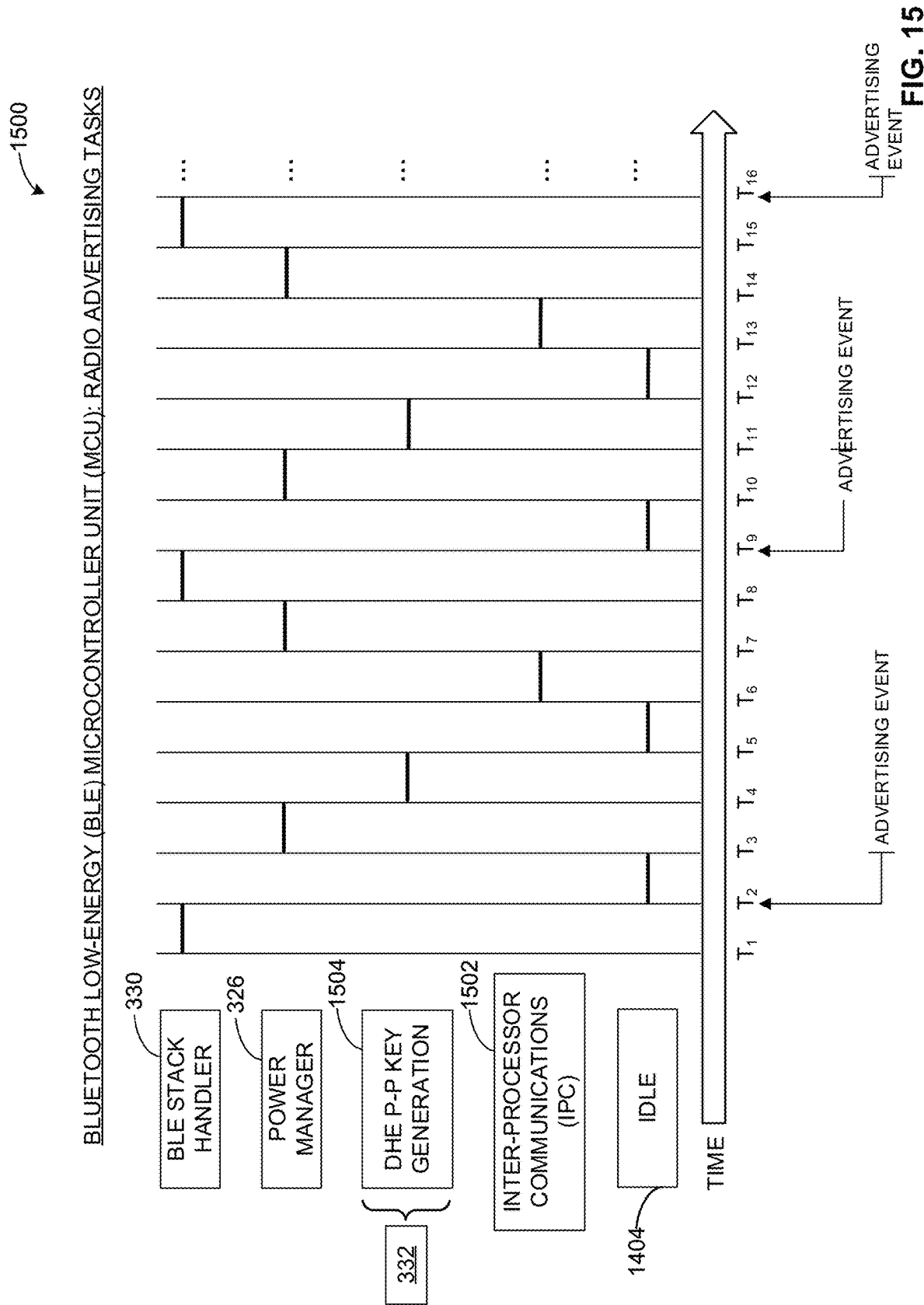
FIG. 15 depicts a second example timing diagram corresponding to example radio advertising tasks executed by the example network bridge of FIGS. 1-3.

FIG. 15 depicts a second example timing diagram 1500 corresponding to radio advertising tasks executed by the BLE MCU 104 of FIGS. 1-3. The second timing diagram 1500 can correspond to the BLE stack handler 330 of FIG. 3 invoking the BLE interface 340 of FIG. 3 to broadcast one or more data packets based on the BLE advertising data format 610 of FIG. 6B, the BLE extended advertising data format 670 of FIG. 6C, etc. The second timing diagram 1500 depicts time intervals during which at least one of the BLE stack handler 330, the power manager 326 of FIG. 3, example inter-processor communications (IPC) 1502, or the security manager 332 of FIG. 3 utilizes energy allocated to the power budget of the BLE MCU 104 to execute one or more computation tasks. In FIG. 15, the IPC 1502 can correspond to communications between the field device MCU 350 and the BLE MCU 104. For example, the IPC 1502 can correspond to serial communications facilitated by an SPI bus, UART, or an I2C bus. Additionally or alternatively, the IPC 1502 can correspond to any other type of processor communications.

Further depicted in FIG. 15 is a first example security task 1504 executed by the security manager 332 corresponding to a DHE peer-to-peer (P-P) key generation task to update and/or otherwise modify security keys used by the BLE MCU 104. In FIG. 15, the first security task 1504 is based on Elliptic Curve Diffie-Hellman (ECDH) key exchange using ephemeral (ECDHE) or temporary keys. As ECDHE is an asymmetric key agreement security scheme, the public-private keys used in ECDHE are periodically updated to increase security. In some examples, ECDHE is an expensive energy operation. In such examples, the security manager 332 can split up the calculations to update the public-private key of the BLE MCU 104 into two or more smaller energy consuming transactions. For example, the security manager 332 may consume 3,000 uJ to perform calculations to update an ECDHE public-private key. In such examples, the security manager 332 can split up the 3,000 uJ transaction into 100 30 uJ transactions and execute each of the 100 transactions when the power manager 326 determines that there is enough energy available for the security manager 332 to execute such a transaction. For example, the security manager 332 may execute one or more of the 100 transactions once a day, once a week, etc. Accordingly, the security manager 332 can execute the first security task 1504 as a background process or task during advertising operations or when the BLE interface 340 is disabled.

At a first example time ($T_1$), the BLE stack handler 330 directs the BLE interface 340 to perform one or more computation tasks. For example, the power manager 326 may identify a radiofrequency task (e.g., a radio advertising task) in a task queue and defer different tasks in the task queue until after the radiofrequency task has been completed. In the second timing diagram 1500, radio advertising events corresponding to an advertisement of data from the field device 102 to the remote device 106 of FIG. 1, the remote devices 200, 202, 204, of FIG. 2, etc., occur after the BLE stack handler 330 executes the one or more computation tasks. In FIG. 15, the BLE stack handler 330 completes an advertising event at a second example ($T_2$), a ninth example time ($T_9$), and a sixteenth example time ($T_{16}$). The power manager 326 invokes the BLE MCU 104 to enter the idle mode 1404 after the advertising events. At a third example time ($T_3$), the power manager 326 executes one or more computation tasks, such as determining a power budget. For example, the power manager 326 may determine the power budget by (1) deducting the consumed energy by the BLE stack handler 330 for the advertising event from the first to the second time and (2) adding the makeup energy from the field device MCU 350 from the second to the third time.

At a fourth example time ($T_4$), the power manager 326 invokes the security manager 332 to execute the first security task 1504. For example, the power manager 326 may determine an energy consumption value associated with the first security task 1504 (e.g., by obtaining the corresponding energy consumption value from the database 335). The power manager 326 can determine that the power budget has sufficient energy from which the security manager 332 can consume to execute the first security task 1504 without causing the voltage associated with the power supply 355 of FIG. 3 to fall below the low-voltage threshold. When the power manager 326 directs the security manager 332 to perform the first security task 1504, the power manager 326 commits the energy corresponding to the energy consumption value from the power budget to the execution of the first security task 1504. Accordingly, the power manager 326 can deduct the energy consumption value associated with the first security task 1504 from the power budget.

Figure 16:
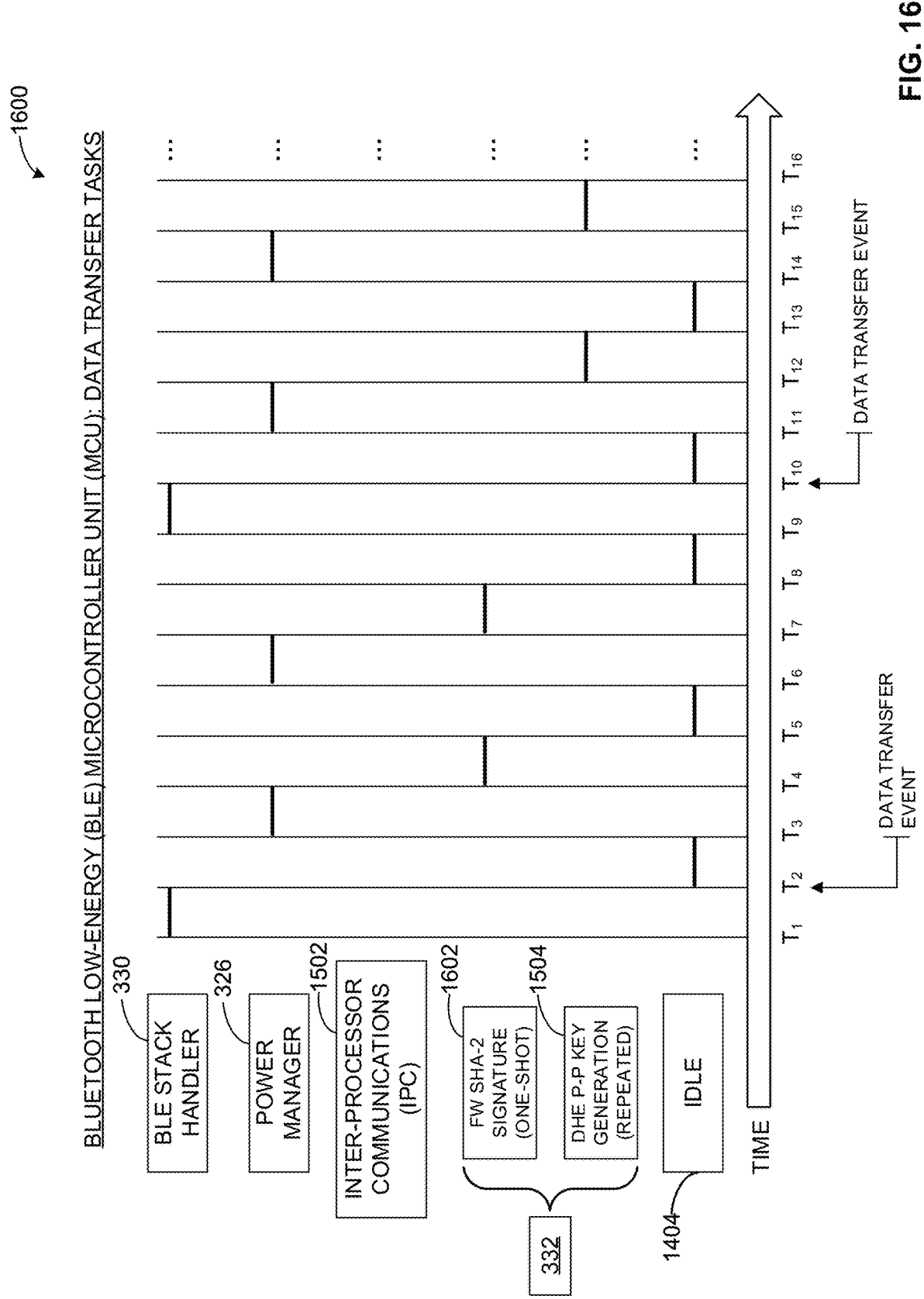
FIG. 16 depicts a third example timing diagram corresponding to example data transfer tasks executed by the example network bridge of FIGS. 1-3.

FIG. 16 depicts a third example timing diagram 1600 corresponding to data transfer tasks executed by the BLE MCU 104 of FIGS. 1-3. The third timing diagram 1600 can correspond to the BLE stack handler 330 of FIG. 3 invoking the BLE interface 340 of FIG. 3 to transmit data (e.g., process control data, a configuration parameter, etc.) to or receive data (e.g., a portion of a firmware executable) from the remote device 106 of FIG. 1 via the BLE connection 108 of FIG. 1. The third timing diagram 1600 depicts time intervals during which at least one of the BLE stack handler 330, the power manager 326 of FIG. 3, the IPC 1502 of FIG. 15, or the security manager 332 of FIG. 3 utilizes energy allocated to the power budget of the BLE MCU 104 to execute one or more computation tasks.

Further depicted in FIG. 16 are the idle mode 1404 of FIG. 14, the first security task 1504 of FIG. 15 and a second example security task 1602 executed by the security manager 332. In FIG. 15, the first security task 1504 corresponds to a DHE P-P key generation task and the second security task 1602 corresponds to a firmware (FW) SHA-2 signature task. The second security task 1602 can correspond to one or more operations by the security manager 332 of FIG. 3 to update and/or otherwise modify firmware of a portion or module of, and/or, more generally, the BLE MCU 104. For example, the second security task 1602 can include at least a first operation and a second operation. In such examples, the first operation can be executed at a fourth example time ($T_4$) that includes downloading a firmware image (e.g., a firmware executable) and verifying that the firmware image is valid, has not been modified, and is from a known source (e.g., from the remote device 106 of FIG. 1). The security manager 332 can verify the firmware image by using an Elliptic Curve Digital Signature Algorithm to calculate a SHA-2 signature of the firmware image and verifying the SHA-2 signature using public key cryptography. If the downloaded firmware image is determined to be valid, the security manager 332 can flash the firmware image to memory (e.g., the database 335 of FIG. 3).

In some examples, the second operation of the second security task 1602 includes validating the flashed firmware image upon boot up of the BLE MCU 104 to verify that the firmware image has not been changed. As the validation upon boot up is a relatively low-risk security event (e.g., unlikely that the firmware image has changed in between boot ups), the security manager 332 can execute the second operation of the second security task 1602 as a background task while the BLE MCU 104 is operating. For example, the security manager 332 can calculate the SHA-2 signature of the firmware image flashed to the memory and compare the SHA-2 signature to a known SHA-2 signature (e.g., a SHA-2 signature stored in the database 335). In some examples, the security manager 332 can execute the second operation of the second security task 1602 when the BLE MCU 104 is in an advertising mode as described above in connection with the second timing diagram 1500 of FIG. 15 or when the BLE MCU 104 is in a radiofrequency disabled mode as described below in connection with the fourth timing diagram 1700 of FIG. 17.

In the illustrated example of FIG. 16, the second security task 1602 is a one-shot event and the first security task 1504 is a repeated operation. In the third timing diagram 1600 of FIG. 16, the BLE stack handler 330 has a first highest priority (e.g., having a priority value of 5), the power manager 326 has a second highest priority, the IPC 1502 has a third highest priority, the second security task 1602 has a fourth highest priority, and the first security task 1504 has a fifth highest priority.

At a first example time ($T_1$), the BLE stack handler 330 directs the BLE interface 340 to perform one or more computation tasks. For example, the power manager 326 may identify a radiofrequency operation, such as generating and transmitting the data packet 671 of FIG. 6C (e.g., an extended advertising packet) in a task queue. In such examples, the power manager 326 can defer one or more different computation tasks in the task queue until after the BLE interface 340 executes the radiofrequency operation. In the third timing diagram 1600, data transfer events occur after the BLE stack handler 330 completes the one or more computation tasks. In FIG. 16, the BLE stack handler 330 completes data transfer events at a second example ($T_2$) and a tenth example time ($T_{10}$). At a third example time ($T_3$), the power manager 326 executes one or more computation tasks, such as determining a power budget. For example, the power manager 326 may (1) deduct the consumed energy by the BLE stack handler 330 and the BLE interface 340 used to generate and transmit, receive, etc., one or more data packets and (2) add makeup energy supplied to the power supply 355 during the idle mode 1404 from the second time to the third time.

At a fourth example time ($T_4$), the power manager 326 invokes the security manager 332 to execute the second security task 1602. For example, the power manager 326 may determine an energy consumption value associated with the second security task 1602 (e.g., by obtaining the energy consumption value from the database 335). The power manager 326 can determine that the power budget has sufficient energy from which the security manager 332 can consume to execute the second security task 1602 without browning out the BLE MCU 104. When the power manager 326 directs the security manager 332 to perform the second security task 1602, the power manager 326 commits the energy corresponding to the energy consumption value from the power budget to the execution of the second security task 1602. Accordingly, the power manager 326 can deduct the energy consumption value associated with the second security task 1602 from the power budget.

Figure 17:
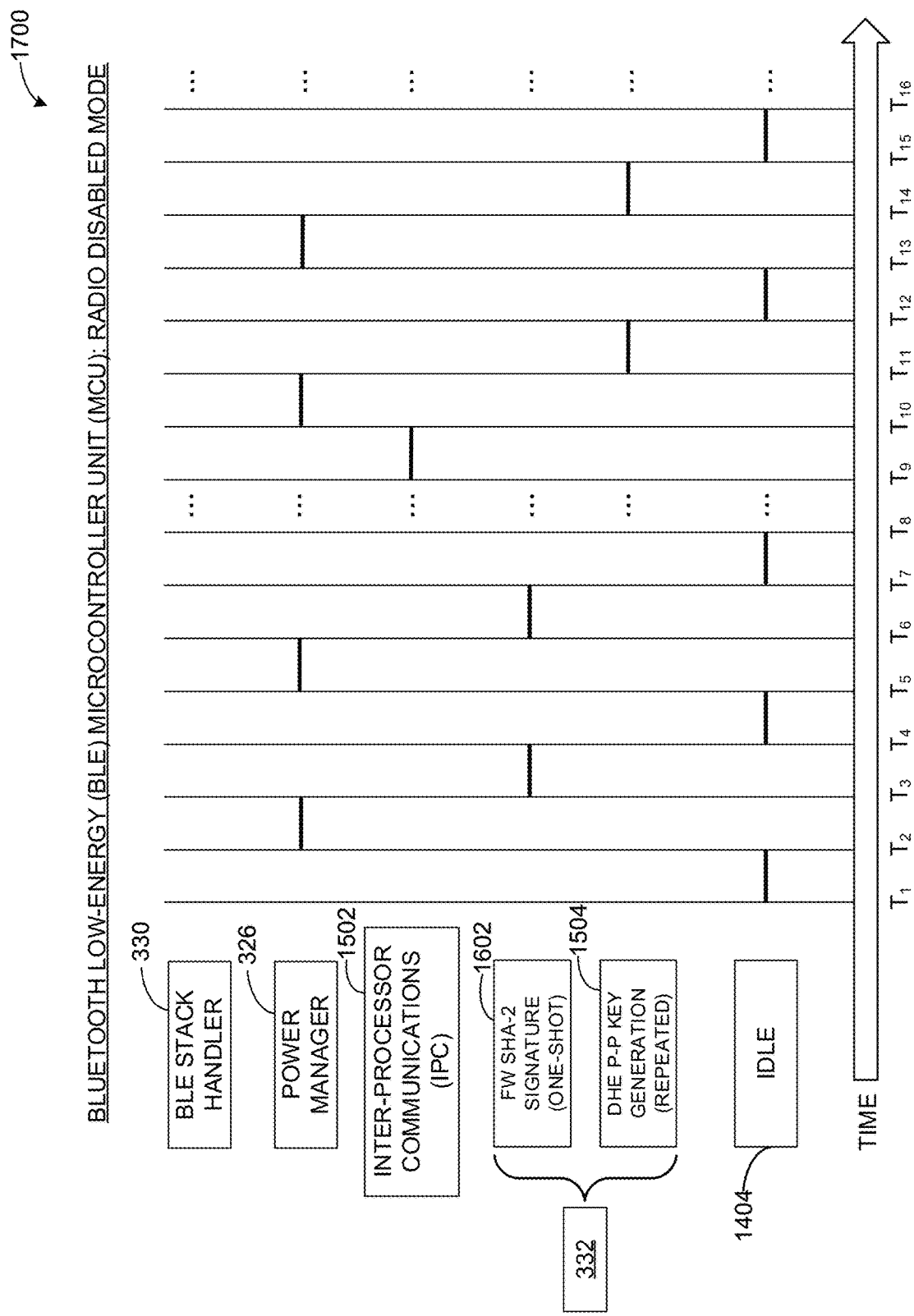
FIG. 17 depicts a fourth example timing diagram corresponding to the example network bridge of FIGS. 1-3 in an example radio disabled mode.

FIG. 17 depicts a fourth example timing diagram 1700 corresponding to the BLE interface 340 of FIG. 3 of the BLE MCU 104 of FIGS. 1-3 in a radio disabled mode, a radiofrequency disabled mode, etc., where the BLE interface 340 is inactive. The fourth timing diagram 1700 can correspond to the security manager 332 executing the first security task 1504 or the second security task 1602 when the BLE interface 340 is inactive. The fourth timing diagram 1700 depicts time intervals during which at least one of the power manager 326 of FIG. 3 or the security manager 332 of FIG. 3 utilizes energy allocated to the power budget of the BLE MCU 104 to execute one or more computation tasks. In the fourth timing diagram 1700 of FIG. 17, the BLE stack handler 330 has a first highest priority (e.g., having a priority value of 5), the power manager 326 has a second highest priority, the IPC 1502 has a third highest priority, the second security task 1602 has a fourth highest priority, and the first security task 1504 has a fifth highest priority.

At a second example time ($T_2$), the power manager 326 executes one or more computation tasks, such as determining a power budget. For example, the power manager 326 may determine that the task queue includes the first security task 1504 and the second security task 1602 to be executed. The power manager 326 can retrieve the associated energy consumption values from the database 335 and determine whether there is sufficient energy in the power budget to execute one or both of the security tasks 1504, 1602.

At a third example time ($T_3$), the power manager 326 invokes the security manager 332 to execute the second security task 1602. For example, the power manager 326 can determine that the power budget has sufficient energy from which the security manager 332 can use to execute the second security task 1602 without browning out the BLE MCU 104. When the power manager 326 directs the security manager 332 to perform the second security task 1602, the power manager 326 commits the energy corresponding to the energy consumption value from the power budget to the execution of the second security task 1602. Accordingly, the power manager 326 can deduct the energy consumption value associated with the second security task 1602 from the power budget.

From a fourth example time ($T_4$) until a fifth example time ($T_5$), the BLE MCU 104 is in the idle mode 1404 and, thus, no substantive tasks are being executed by the BLE MCU 104. Accordingly, the makeup energy provided by the field device MCU 350 to the power supply 355 during this time can replenish energy consumed by the BLE interface 340 (e.g., energy consumed from the third time until the fourth time) more quickly because there are no substantive tasks being executed by the BLE MCU 104. Although, the field device MCU 350 may supply (e.g., constantly supply) power to the power supply 355 using a 0.25 mA, a 0.5 mA, etc., constant current source from the first time until at least a sixteenth example time ($T_{16}$), the field device MCU 350 may re-charge the power supply 355 quicker when in the idle mode 1404 because there are no substantive tasks consuming power.

At a tenth example time ($T_{10}$), the power manager 326 executes one or more computation tasks. For example, the power manage 326 can determine a power budget based on at least one of the assertions by the comparators 358*a*-*b* or the charging rate of the power supply 355. At an eleventh example time ($T_{11}$), the power manager 326 invokes the security manager 332 to execute the first security task 1504. For example, the power manager 326 can determine that the power budget has sufficient energy from which the security manager 332 can use to execute the first security task 1504 without causing the voltage associated with the power supply 355 of FIG. 3 to go below the low-voltage threshold associated with the second comparator 358*b* of FIG. 3. When the power manager 326 directs the security manager 332 to perform the first security task 1504, the power manager 326 commits the energy corresponding to the energy consumption value from the power budget to the execution of the first security task 1504. Accordingly, the power manager 326 can deduct the energy consumption value associated with the first security task 1504 from the power budget.

Figures 18, 19:
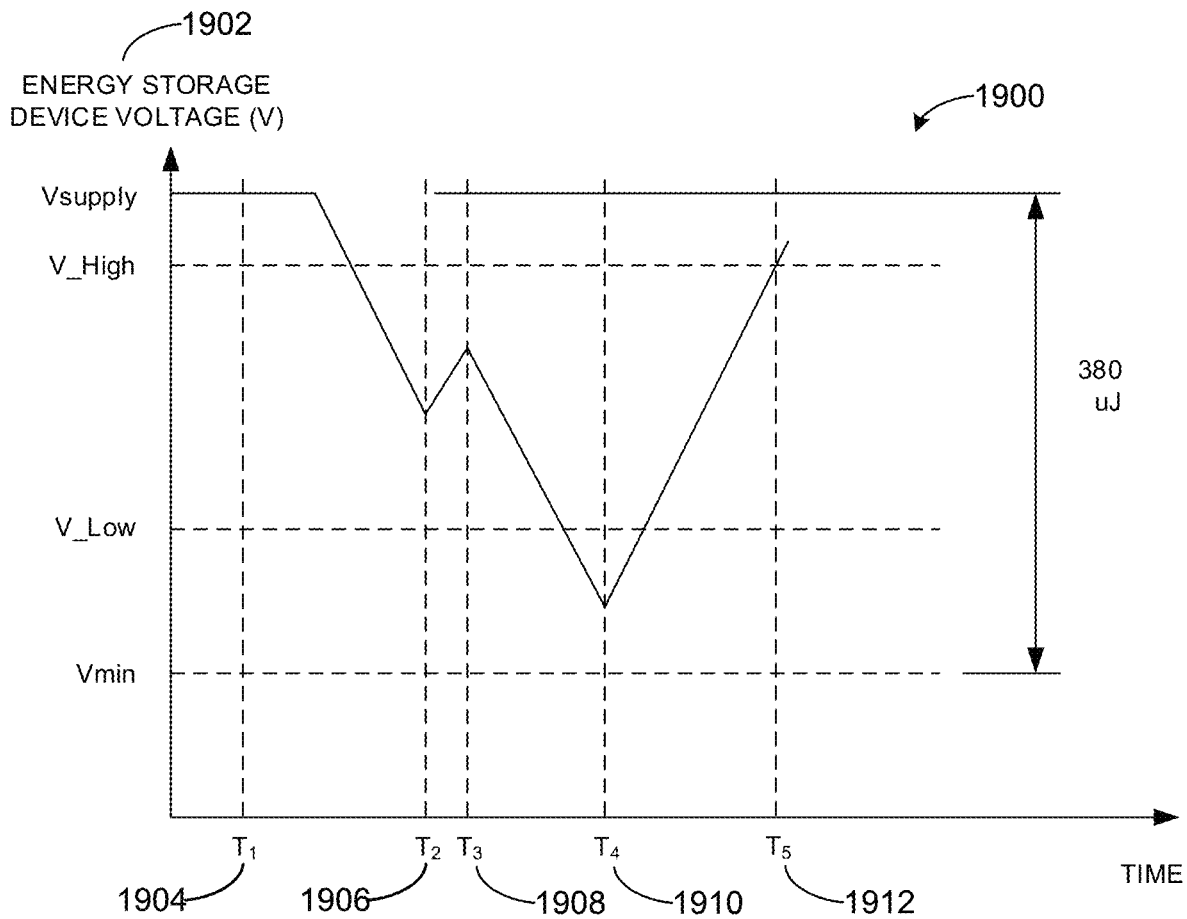
FIG. 18 is an example table depicting example power supply states of the example power supply of FIG. 3.
FIG. 19 is an example graph depicting an example voltage of the power supply of FIG. 3 as a function of time.

FIG. 18 is an example table 1800 depicting example power supply states (e.g., power supply conditions, power supply statuses, etc.) of the power supply 355 of FIG. 3. The table 1800 of FIG. 18 includes a first example column 1810, a second example column 1820, and a third example column 1830. In FIG. 18, the first column 1810 corresponds to first example values of a first input/output (I/O) measurement for the energy storage device 356. For example, the input/output interface 310 of FIG. 3 may determine the values in the first column 1810 by obtaining a voltage associated with the energy storage device 356 from the first comparator 358*a* of FIG. 3. In such examples, the input/output interface 310 can determine a logic value (e.g., a logic Low value, a logic High value, etc.) of an integrated circuit (IC) pin of the power supply 355. For example, the power supply 355 may be an IC with one or more electrical pins from which the input/output interface 310 can measure an electrical characteristic such as a current, a voltage, etc. In such examples, a first output of the first comparator 358*a* may be coupled to a first IC pin and a second output of the second comparator 358*b* may be coupled to a second IC pin different from the first IC pin. In FIG. 18, the second column 1820 corresponds to second example values of a second I/O measurement for the energy storage device 356. For example, the input/output interface 310 may determine the values in the second column 1820 by obtaining the voltage associated with the energy storage device 356 from the second comparator 358*b* of FIG. 3.

In the illustrated example of FIG. 18, the values of the first and second columns 1810, 1820 can be either PIN_HIGH or PIN_LOW. For example, (1) the energy storage device 356 may have a first voltage, (2) the first comparator 358*a* may output a second voltage to the first IC pin based on the comparison of the first voltage to a high-voltage threshold, and (3) the second comparator 358*b* may output a third voltage to the second IC pin based on the comparison of the first voltage to a low-voltage threshold. The input/output interface 310 may determine a first I/O measurement of PIN_HIGH for the first IC pin when the second voltage corresponds to a logic High. The second voltage of the first IC pin can be a logic High when the first voltage of the energy storage device 356 is greater than or equal to the high-voltage threshold and, thus, satisfies the high-voltage threshold. In other examples, the input/output interface 310 can determine the first I/O measurement to be PIN_LOW when the first voltage of the energy storage device 356 is less than the high-voltage threshold and, thus, does not satisfy the high-voltage threshold.

In some examples, the input/output interface 310 determines a second I/O measurement of PIN_HIGH for the second IC pin when the third voltage corresponds to a logic High. The third voltage of the second IC pin can be a logic High when the first voltage of the energy storage device 356 is greater than or equal to the low-voltage threshold and, thus, satisfies the low-voltage threshold. In other examples, input/output interface 310 can determine the second I/O measurement to be PIN LOW when the first voltage of the energy storage device 356 is less than the low-voltage threshold and, thus, does not satisfy the low-voltage threshold. Alternatively, other values may be used (e.g., a current value, a voltage value, etc.) and/or other representations of I/O measurements may be used (e.g., 0, 1, high, low, etc.) for the values of the first column 1810 and/or the second column 1820.

In the illustrated example of FIG. 18, the third column 1830 corresponds to a state of the power supply 355 based on at least one of the first or second I/O measurement for the energy storage device 356. Additionally or alternatively, the states in the third column 1830 can be applicable to the energy storage device 356. In FIG. 18, the power manager 326 can determine that the power supply 355 is in a first state of ENERGY_STATE_HIGH, a second state of ENERGY_STATE_INVALID, a third state of ENERGY_STATE_MEDIUM, or a fourth state of ENERGY_STATE_LOW. For example, the power manager 326 of FIG. 3 can determine a power supply state based on the measurements from the input/output interface 310 associated with the energy storage device 356. For example, the power manager 326 can determine the power supply state based on values generated and/or otherwise outputted by at least one of the first comparator 358a or the second comparator 358b of FIG. 3. Alternatively, the third column 1830 and/or the power supply 355 may have fewer or more states than depicted in FIG. 18.

In the illustrated example of FIG. 18, the power manager 326 can determine the power supply state to be ENERGY_STATE_HIGH when the first I/O measurement for the energy storage device 356 is PIN_HIGH and the second I/O measurement for the energy storage device 356 is PIN_HIGH. For example, the power manager 326 can determine that the energy storage device 356 is fully and/or otherwise sufficiently charged. In such examples, the power manager 326 can determine that the energy storage device 356 is fully charged when the first comparator 358a determines that the voltage of the energy storage device 356 satisfies the high-voltage threshold (e.g., the I/O measurement based on the output of the first comparator 358a is PIN_HIGH) and the voltage of the energy storage device 356 satisfies the low-voltage threshold (e.g., the I/O measurement based on the output of the second comparator 358b is PIN_HIGH).

In the illustrated example of FIG. 18, the power manager 326 can determine the power supply state to be ENERGY_STATE_INVALID when the first I/O measurement for the energy storage device 356 is PIN_HIGH and the second I/O measurement for the energy storage device 356 is PIN_LOW. For example, the power manager 326 can determine that there may be a broken or damaged component associated with the power supply 355 (e.g., one or both of the comparators 358a-b may be damaged) causing one or both of the comparators 358a-b to generate incorrect outputs. In such examples, the power manager 326 can determine that the power supply 355 has an invalid state when the first comparator 358a determines that the voltage of the energy storage device 356 satisfies the high-voltage threshold (e.g., the I/O measurement based on the output of the first comparator 358a is PIN_HIGH) and the voltage of the energy storage device 356 does not satisfy the low-voltage threshold (e.g., the I/O measurement based on the output of the second comparator 358b is PIN_LOW). Accordingly, the voltage of the energy storage device 356 cannot be greater than or equal to the high-voltage threshold while being less than the low-voltage threshold and, thus, invokes the power manager 326 to determine an invalid energy state, or invalid power supply state of the power supply 355.

In the illustrated example of FIG. 18, the power manager 326 can determine the power supply state to be ENERGY_STATE_MEDIUM when the first I/O measurement for the energy storage device 356 is PIN_LOW and the second I/O measurement for the energy storage device 356 is PIN_HIGH. For example, the power manager 326 can determine that the energy storage device 356 is not fully charged but may be sufficiently charged to execute one or more computation tasks. In such examples, the power manager 326 can determine that the energy storage device 356 is not fully charged but may be operative to provide enough power for one or more computation tasks when the first comparator 358a determines that the voltage of the energy storage device 356 does not satisfy the high-voltage threshold (e.g., the I/O measurement based on the output of the first comparator 358a is PIN_LOW) and the voltage of the energy storage device 356 satisfies the low-voltage threshold (e.g., the I/O measurement based on the output of the second comparator 358b is PIN_HIGH).

In the illustrated example of FIG. 18, the power manager 326 can determine the power supply state to be ENERGY_STATE_LOW when the first I/O measurement for the energy storage device 356 is PIN_LOW and the second I/O measurement for the energy storage device 356 is PIN_LOW. For example, the power manager 326 can determine that the energy storage device 356 is not fully charged and may not have enough power to execute at least one computation task. In such examples, the power manager 326 can determine that the energy storage device 356 is not fully charged and may not be operative to provide enough power for at least one computation task when the first comparator 358a determines that the voltage of the energy storage device 356 does not satisfy the high-voltage threshold (e.g., the I/O measurement based on the output of the first comparator 358a is PIN_LOW) and the voltage of the energy storage device 356 does not satisfy the low-voltage threshold (e.g., the I/O measurement based on the output of the second comparator 358b is PIN_LOW).

FIG. 19 is an example graph 1900 depicting an example voltage 1902 of the power supply 355 of FIG. 3 as a function of time. For example, the voltage 1902 can correspond to a voltage of the energy storage device 356 of FIG. 3. Alternatively, the voltage 1902 may correspond to an output voltage of the power supply 355 to the BLE bridge 104. For the discussion that follows in connection with FIG. 19, the voltage 1902 is described in connection with the voltage of the energy storage device 356. Alternatively, the discussion that follows in connection with FIG. 19 may also be applicable to the voltage of the output voltage of the power supply 355. In some examples, the voltage of the energy storage device 356 and the output voltage of the power supply 355 are the same.

In the illustrated example of FIG. 19, at a first example time ($T_1$) 1904, the energy storage device 356 has a first voltage corresponding to Vsupply, where Vsupply is a voltage associated with a power supply of the field device 102. For example, the first voltage may correspond to a highest voltage value that the energy storage device 356 can have based on the power supply of the field device 102, a capacitance of the energy storage device 356, etc. Also depicted in FIG. 19 is Vmin that corresponds to a voltage below which the energy storage device 356 may not provide enough power to the BLE bridge 104 to execute at least one computation task. At the first time 1904, the first voltage satisfies a high-voltage threshold (V_High) based on the first voltage being greater than the high-voltage threshold. At the first time 1904, the first voltage satisfies a low-voltage threshold (V_Low) based on the first voltage being greater than V_Low. For example, at the first time 1904, the power manager 326 can determine that the state of the power supply 355 is ENERGY_STATE_HIGH based on the first comparator 358a outputting PIN_HIGH and the second comparator 358b outputting PIN_HIGH.

In the illustrated example of FIG. 19, at a second example time ($T_2$) 1906, the energy storage device 356 has a second voltage less than the first voltage at the first time 1904. For example, the BLE bridge 104 may have executed one or more computation tasks that consumed a quantity of energy corresponding to a difference between the first voltage and the second voltage. At the second time 1906, the second voltage does not satisfy V_High based on the second voltage being less than V_High. At the second time 1906, the second voltage satisfies V_Low based on the second voltage being greater than V_Low. For example, at the second time 1906, the power manager 326 can determine that the state of the power supply 355 is ENERGY_STATE_MEDIUM based on the first comparator 358a outputting PIN_LOW and the second comparator 358b outputting PIN_HIGH.

In the illustrated example of FIG. 19, at a third example time ($T_3$) 1908, the energy storage device 356 has a third voltage less than the first voltage at the first time 1904 and greater than the second voltage at the second time 1906. For example, the power manager 326 may have commanded the BLE bridge 104 to enter a sleep mode, idle one or more processor threads, etc., to reduce energy consumed by the BLE bridge 104 to substantially zero and/or otherwise approximately zero. By consuming substantially zero energy while the BLE bridge 104 is idle and/or otherwise not substantively active, the field device MCU 350 of FIG. 3 can increase the voltage of the energy storage device 356 by providing power from the field device MCU 350 to the energy storage device 356. The quantity of provided power by the field device MCU 350 is depicted as a difference between the second voltage at the second time 1906 and the third voltage at the third time 1908. At the third time 1908, the power manager 326 can determine that the state of the power supply 355 is ENERGY_STATE_MEDIUM based on the first comparator 358a outputting PIN_LOW and the second comparator 358b outputting PIN_HIGH.

In the illustrated example of FIG. 19, at a fourth example time ($T_4$) 1910, the energy storage device 356 has a fourth voltage less than the third voltage at the third time 1908. For example, the BLE bridge 104 may have executed one or more computation tasks that consumed a quantity of energy corresponding to a difference between the third voltage and the fourth voltage. At the fourth time 1910, the fourth voltage does not satisfy V_High based on the fourth voltage being less than V_High. At the fourth time 1910, the fourth voltage does not satisfy V_Low based on the fourth voltage being greater than V_Low. For example, at the fourth time 1910, the power manager 326 can determine that the state of the power supply 355 is ENERGY_STATE_LOW based on the first comparator 358a outputting the signal PIN_LOW and the second comparator 358b outputting the signal PIN_LOW. At the fourth time 1910, the power manager 326 can instruct the BLE bridge 104 to transition to the sleep mode to facilitate re-charging the energy storage device 356 by the field device MCU 350.

In the illustrated example of FIG. 19, at a fifth example time ($T_5$) 1912, the energy storage device 356 has a fifth voltage greater than the fourth voltage at the fourth time 1910. For example, the power manager 326 may have put the BLE bridge 104 in a sleep mode, idled one or more processing threads, etc., to reduce energy consumed by the BLE bridge 104 to substantially zero and/or otherwise approximately zero. In such examples, the field device MCU 350 can increase the voltage of the energy storage device 356 from the fourth voltage to the fifth voltage. The quantity of provided power by the field device MCU 350 is depicted as a difference between the fourth voltage at the fourth time 1910 and the fifth voltage at the fifth time 1912. At the fifth time 1912, the power manager 326 can determine that the state of the power supply 355 is ENERGY_STATE_HIGH based on the first comparator 358a outputting PIN_HIGH and the second comparator 358b outputting PIN_HIGH.

In some examples, at the fifth time 1912, an event, an interrupt, etc., can be generated by one or more processors associated with the BLE bridge 104 that can invoke the power manager 326 to wake up, become active, resume executing machine readable instructions, etc. When the power manager 326 wakes up at the fifth time 1912, the power manager 326 can measure the fifth voltage associated with the energy storage device 356, determine that the fifth voltage satisfies V_High and V_Low, and reset an energy parameter (e.g., an energy accumulator, an energy counter, an energy tracker, etc.) to a pre-defined energy value associated with the power supply 355 being in the ENERGY_STATE_HIGH state. In FIG. 19, the pre-defined energy value is depicted as 380 uJ, which corresponds to an energy difference between a first stored energy by the energy storage device 356 having a voltage of Vmin and a second stored energy by the energy storage device 356 having a voltage of Vsupply.

Figure 20:
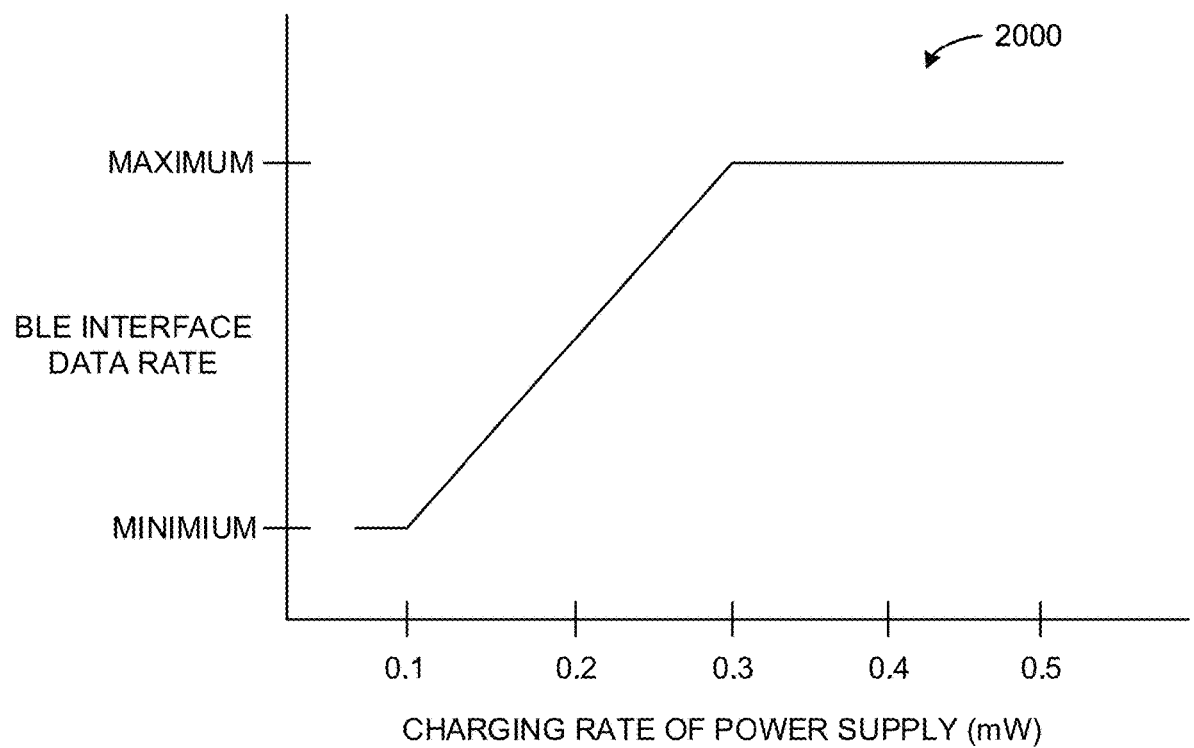
FIG. 20 is an example graph depicting an example data rate of the example network bridge of FIGS. 1-3 as a function of a charging rate of the power supply of FIG. 3.

FIG. 20 is an example graph 2000 depicting a data rate of the BLE interface 340 of FIG. 3 of the BLE bridge 104 of FIGS. 1-3 as a function of a charging rate of the power supply 355 of FIG. 3. In the illustrated example of FIG. 20, the BLE bridge 104 assigns and/or otherwise sets a data rate (e.g., a data transmission rate, a data reception rate, etc.) of the BLE interface 340 at a minimum data rate (e.g., a fixed minimum data rate) when the field device MCU 350 is charging the power supply 355 at a rate 0.1 mW or less. For example, the power manager 326 may direct the BLE stack handler 330 of FIG. 3 to decrease a data rate of the BLE interface 340 to a data rate of 1-2 messages per second (e.g., 1-2 data packets per second), where each message can correspond to 256 bytes when the charging rate is 0.1 mW or less. In such examples, the power manager 326 can invoke the BLE stack handler 330 to decrease the data rate of the BLE interface 340 from a first data rate to a second data rate by adjusting at least one of a data interval or a quantity of data packets to be transmitted or received. For example, the BLE stack handler 330 can reduce a data interval from a first data interval to a second data interval to allow more time for the field device MCU 350 to charge the power supply 355 in between radiofrequency operations, where the second data interval is longer than the first data interval. In other examples, the BLE stack handler 330 can split up a first radiofrequency operation (e.g., a first energy transaction) to transmit a first data packet into two or more radiofrequency operations (e.g., at least a second and a third energy transaction) to transmit at least a second data packet in a second radiofrequency operation and a third data packet in a third radiofrequency operation. For example, the first data packet may be 10 bytes in size and the second and third data packets are each 5 bytes. In such examples, the BLE stack handler 330 can reduce the data rate by splitting up the first energy transaction into two or more smaller energy transactions based on the available power budget, which is based on the charging rate of the power supply 355. Alternatively, the power manager 326 may use any other charging rate to invoke the BLE stack handler 330 to set the minimum data rate of the BLE interface 340.

In the illustrated example of FIG. 20, the BLE bridge 104 sets a data rate of the BLE interface 340 at a maximum data rate (e.g., a fixed maximum data rate) when the charging rate of the power supply 355 is 0.3 mW or greater. For example, the power manager 326 may direct the BLE stack handler 330 to increase a data rate of the BLE interface 340 to a data rate of 55-63 messages per second (e.g., a data rate in a range of 14-16 kilobytes per second) by adjusting at least one of the data interval or the quantity of data packets to be transmitted or received. For example, the BLE stack handler 330 can increase a data interval from a first data interval to a second data interval to allow more time for the field device MCU 350 to charge the power supply 355 in between radiofrequency operations, where the second data interval is shorter than the first data interval. In other examples, the BLE stack handler 330 can combine (1) at least a first and second radiofrequency operation (e.g., at least a first and second energy transaction) to transmit two or more data packets into (2) a third radiofrequency operation (e.g., a third energy transaction) to transmit one data packet. For example, the two or more data packets may be each 5 bytes in size and the combined data packet may be 10 bytes in size. In such examples, the BLE stack handler 330 can increase the data rate by combining the first and second energy transactions into fewer energy transactions based on the available power budget, which is based on the charging rate of the power supply 355. Alternatively, the power manager 326 may use any other charging rate to invoke the BLE stack handler 330 to set the maximum data rate of the BLE interface 340.

In the illustrated example of FIG. 20, the BLE bridge 104 adjusts a data rate of the BLE interface 340 when the charging rate of the power supply 355 is in a range between 0.1 mW and 0.3 mW. For example, the power manager 326 may invoke the BLE stack handler 330 to modify and/or otherwise adjust a data rate of the BLE interface 340 based on the charging rate of the power supply 355. In FIG. 20, the BLE bridge 104 does not increase the data rate of the BLE interface 340 when the charging rate of the power supply 355 is greater than 0.3 mW to prevent the BLE bridge 104 from using power that the field device MCU 350 of FIG. 3 may need to perform one or more process control functions of the field device 102. In other examples, the BLE bridge 104 does not increase the data rate to avoid or prevent depleting an entirety of the stored energy associated with the power supply 355 and, thus, browning out the BLE bridge 104, and/or, more generally, the field device 102.

Flowcharts, data diagrams, and/or state diagrams representative of example hardware logic, machine readable instructions, hardware implemented state machines, and/or any combination thereof for implementing the BLE bridge 104 of FIGS. 1-3, and/or, more generally, the field device 102 of FIGS. 1-3 are shown in FIGS. 21-29. The machine readable instructions may be an executable program or portion of an executable program for execution by a computer processor such as the processor 3112 shown in the example processor platform 3100 discussed below in connection with FIG. 31. The program may be embodied in software stored on a non-transitory computer readable storage medium such as a CD-ROM, a floppy disk, a hard drive, a DVD, a Blu-ray disk, or a memory associated with the processor 3112, but the entire program and/or parts thereof could alternatively be executed by a device other than the processor 3112 and/or embodied in firmware or dedicated hardware. Further, although the example program is described with reference to the flowcharts, data diagrams, and/or state diagrams illustrated in FIGS. 21-29, many other methods of implementing the example BLE bridge 104, and/or, more generally, the field device 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 21-29 may be implemented using executable instructions (e.g., computer and/or machine readable instructions) stored on a non-transitory computer and/or machine readable medium such as a hard disk drive, a flash memory, a read-only memory, a CD, a DVD, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 21:
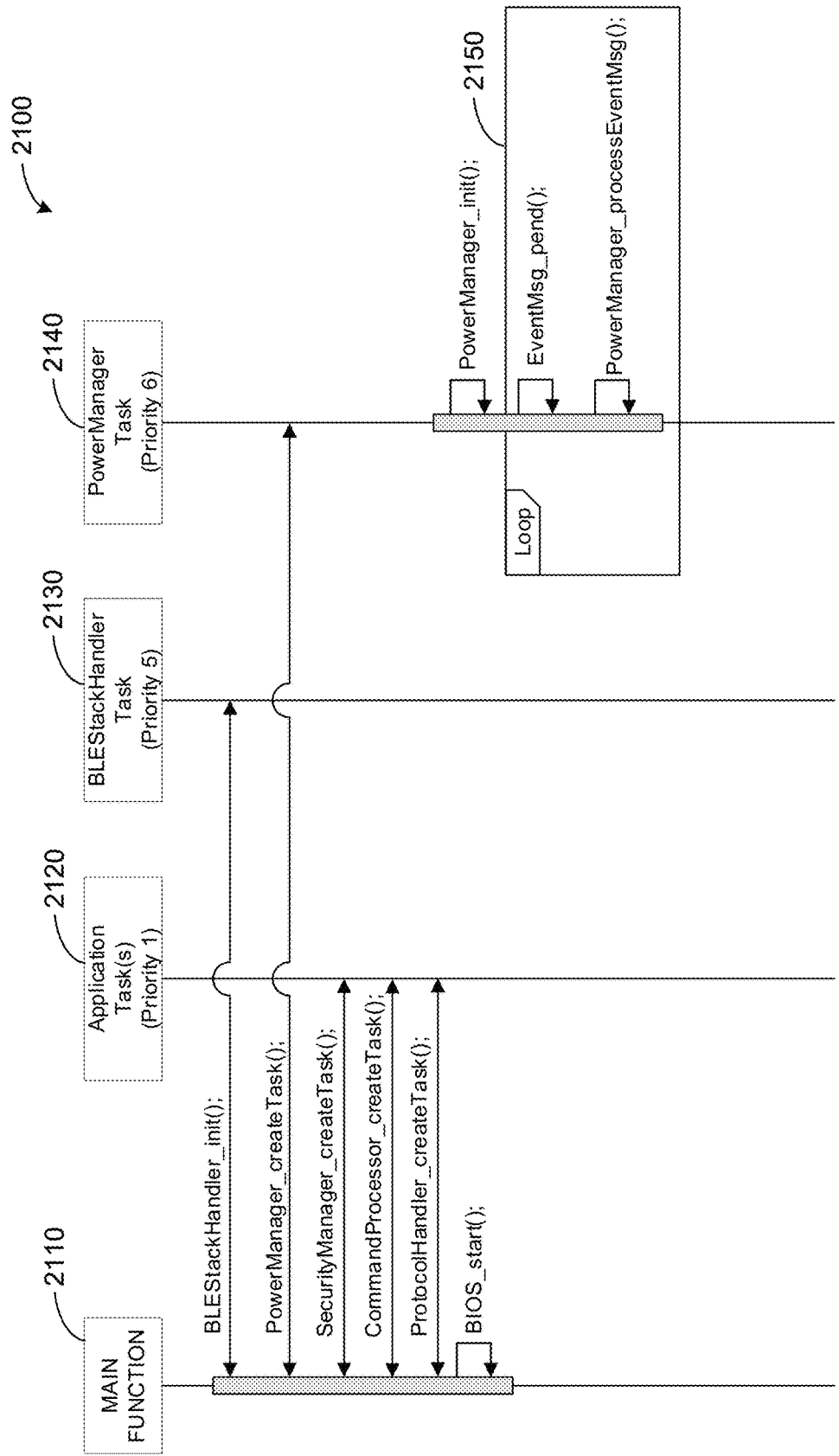
FIG. 21 is an example data flow diagram representative of example machine readable instructions that may be performed by the example network bridge of FIGS. 1-3, and/or, more generally, the field device of FIGS. 1-3 to execute one or more power management tasks.

FIG. 21 is an example data flow diagram representative of example machine readable instructions 2100 that may be performed by the BLE bridge 104 of FIGS. 1-3, and/or, more generally, the field device 102 of FIGS. 1-3 to execute one or more power management tasks. The machine readable instructions 2100 of FIG. 21 include an example main function 2110, one or more example application tasks 2120, an example BLEStackHandler task 2130, and an example PowerManager task 2140. In FIG. 21, the main function 2110 includes one or more machine readable functions, tasks, etc., that, when executed, can cause one or more processors to at least perform one or more computation tasks.

In the illustrated example of FIG. 21, when the main function 2110 is executed, one or more tasks can be executed in sequence. For example, the main function 2110 may execute a function "BLEStackHandler_into;" that, when executed, causes one or more processors to create and/or otherwise initiate the BLEStackHandler task 2130. For example, the BLEStackHandler task 2130 can correspond to machine readable instructions that, when executed, cause the one or more processors to execute the BLE stack handler 330 of FIG. 3. In FIG. 21, the BLEStackHandler task 2130 is executed first and has a priority value of 5.

In the illustrated example of FIG. 21, the main function 2110 can execute a function "PowerManager_createTask( )" that, when executed, cause one or more processors to create and/or otherwise initiate the PowerManager task 2140. For example, the PowerManager task 2140 can correspond to machine readable instructions that, when executed, cause the one or more processors to execute the power manager 326 of FIG. 3. In FIG. 21, the PowerManager task 2140 is executed second and has a priority value of 6.

In the illustrated example of FIG. 21, the main function 2110 can execute one or more functions including "SecurityManager_createTask( )", "CommandProcessor_createTask( )", and "ProtocolHandler_createTask( )" that, when executed, cause one or more processors to initiate the application task(s) 2120. In some examples, initiating a software component, task, etc., can include loading variables (e.g., configurations, parameters, etc.) from the database 335 that can be used by the software component, task, etc. In some examples, the "SecurityManager_createTask( )" can correspond to machine readable instructions that, when executed, cause the one or more processors to initiate and/or otherwise create the security manager 332 of FIG. 3. In other examples, the "CommandProcessor_createTask( )" can correspond to machine readable instructions that, when executed, cause the one or more processors to initiate and/or otherwise create the command processor 322 of FIG. 3. In yet other examples, the "ProtocolHandler_createTask( )" can correspond to machine readable instructions that, when executed, cause the one or more processors to initiate and/or otherwise create the protocol handler 324 of FIG. 3. Further depicted in FIG. 21 is a function "BIOS_start( )" that, when executed, cause the one or more processors to start, trigger, and/or otherwise initiate a real-time operating system (RTOS). For example, the main function 2110 may execute the "BIOS_start( )" function to instantiate the RTOS of the BLE bridge 104.

In operation, the field device 102 powers on and invokes the BLE bridge 104 to begin operating. When the BLE bridge 104 turns on, the main function 2110 can execute the "BLEStackHandler_init( )" function to initialize the BLE stack handler 330 to begin executing the BLEStackHandler task 2130, where the BLEStackHandler task 2130 can include one or more algorithms, functions, routines, etc. In response to initializing the BLEStackHandler task 2130, the main function 2110 can execute the "PowerManager_createTask( )" function to initialize the power manager 326 to begin executing the PowerManager task 2140, where the PowerManager task 2140 can include one or more algorithms, functions, routines, etc. In response to initializing the PowerManager task 2140, the main function 2110 can execute the "SecurityManager_createTask( )" function to initialize the security manager 332 to begin executing one or more of the application tasks 2120, where the Application task(s) 2120 can include one or more algorithms, functions, routines, etc. In response to initializing the security manager 332, the main function 2110 can execute the "CommandProcessor_createTask( )" function to initialize the command processor 322 to begin executing one or more of the application tasks 2120. In response to initializing the command processor 322, the main function 2110 can execute the "ProtocolHandler_createTask( )" function to initialize the protocol handler 324 to begin executing one or more of the application tasks 2120. In response to initializing the protocol handler 324, the main function 2110 can execute the "BIOS_start( )" function to initialize the RTOS.

In the illustrated example of FIG. 21, the PowerManager task 2140 includes one or more example functions including an example "PowerManager_init( );" function, an example "EventMsg_pend( )" function, and an example "PowerManager_processEventMsg( )" function. Alternatively, the PowerManager task 2140 may include fewer or more functions. In FIG. 21, the "PowerManager_init( );" function can correspond to initiating the PowerManager task 2140. In some examples, initiating the PowerManager task 2140 can include loading variables (e.g., configurations, parameters, etc.) from the database 335 that can be used by the power manager 326 to execute one or more algorithms, functions, routines, etc.

In the illustrated example of FIG. 21, the "EventMsg_pend( )" function and the "PowerManager_processEventMsg( )" can be executed by the PowerManager task 2140 in an example software loop 2150. In FIG. 21, the "EventMsg_pend( )" function can correspond to a GPIO interrupt, a UART message, a SPI message, etc., to invoke the power manager 326 to execute one or more computation tasks. In some examples, the "EventMsg_pend( )" can be invoked when a power evaluation event occurs. In FIG. 21, the "PowerManager_processEventMsg( )" function can correspond to the power manager 326 performing a power evaluation in response to the power evaluation event. For example, the power manager 326 can execute the "PowerManager_processEventMsg( )" to process the power evaluation event. In response to processing the power evaluation event, the power manager 326 can wait until another invocation of the "EventMsg_pend( )" function, or another power evaluation event occurs.

Figure 22:
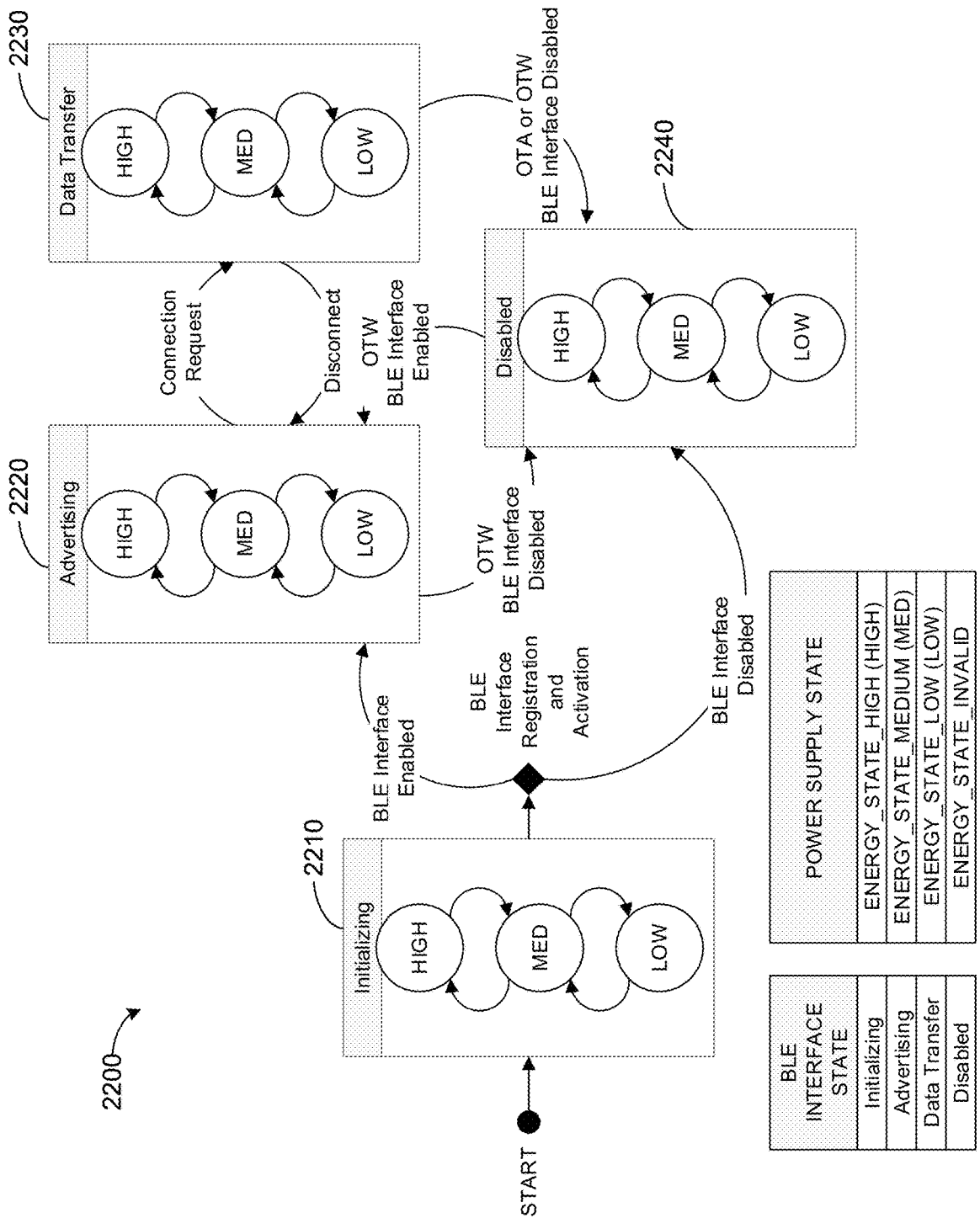
FIG. 22 depicts an example state diagram of the example network bridge of FIGS. 1-3.

FIG. 22 depicts an example state diagram 2200 of the BLE interface 340 of FIG. 3, and/or, more generally the BLE bridge 104 of FIGS. 1-3. The state diagram 2200 is representative of example machine readable instructions that may be performed by the BLE interface 340, and/or, more generally the BLE bridge 104. In the illustrated example of FIG. 22, the state diagram 2200 includes example states 2210, 2220, 2230, 2240 of the BLE interface 340 including an example initializing state 2210, an example advertising state 2220, an example data transfer state 2230, and an example disabled state 2240. Each of the states 2210, 2220, 2230, 2240 includes the states of the power supply 355 of FIG. 3 including ENERGY_STATE_HIGH, ENERGY_STATE_MEDIUM, and ENERGY_STATE_LOW.

In the illustrated example of FIG. 22, the BLE interface 340 begins at the initializing state 2210. For example, the initializing state 2210 can correspond to implementing the first timing diagram 1400 of FIG. 14. In other examples, the initializing state 2210 can correspond to the main function 2110 of the machine readable instructions 2100 of FIG. 21 executing the "BLEStackHandler_init( );" function to trigger the BLEStackHandler task 2130 of FIG. 21 to implement the BLE stack handler 330 of FIG. 3 to instantiate and/or otherwise initialize the BLE interface 340. In some examples, the BLE stack handler 330 registers and activates the BLE interface 340 when in the initializing state 2210.

In some examples, the BLE interface 340 operates based on the state of the power supply 355. For example, the BLE stack handler 330 may set a configuration, parameter, etc., of the BLE interface 340 based on the state. For example, the BLE stack handler 330 may set a first data rate of the BLE interface 340 to a maximum data rate when the state of the power supply 355 is ENERGY_STATE_HIGH, or High.

In the illustrated example of FIG. 22, the BLE interface 340 moves from the initializing state 2210 to the advertising state 2220 when the BLE interface 340 is enabled. For example, the BLE stack handler 330 may enable the BLE interface 340 when the state of the power supply is ENERGY_STATE_HIGH. In some examples, the advertising state 2220 corresponds to implementing the second timing diagram 1500 of FIG. 15. In FIG. 22, the BLE interface 340 moves from the initializing state 2210 to the disabled state 2240 when the BLE interface 340 is disabled. For example, the BLE stack handler 330 may disable the BLE interface 340 when the state of the power supply is ENERGY_STATE_LOW.

In the illustrated example of FIG. 22, the BLE interface 340 moves from the advertising state 2220 to the data transfer state 2230 when a connection request is received by the BLE interface 340. For example, the data transfer state 2230 can correspond to implementing the third timing diagram 1600 of FIG. 16. In FIG. 22, the BLE interface 340 moves from the data transfer state 2230 to the advertising state 2220 when the BLE interface 340 disconnects from a device, such as the remote device 106 of FIG. 1. In FIG. 22, the BLE interface 340 moves from the data transfer state 2230 to the disabled state 2240 when OTA or OTW capabilities, operations, etc., of the BLE interface 340 are disabled.

In some examples, the BLE interface 340, and/or, more generally the BLE MCU 104, defers execution of one or more types of computation tasks (e.g., radiofrequency operations, the first security task 1504 of FIG. 15, the second security task 1602 of FIG. 16, etc.) when the BLE interface 340 is in a first state until the BLE interface 340 moves from the first state to a second state, where the second state is different from the first state. For example, the BLE stack handler 330, and/or, more generally, the BLE MCU 104, can invoke and/or otherwise cause the BLE interface 340 to defer execution of the first security task 1504 of FIG. 15 when in the data transfer state 2230 until the BLE interface 340 transitions from the data transfer state 2230 to the advertising state 2220. In some examples, the BLE interface 340, and/or, more generally the BLE MCU 104, defers execution of one or more types of computation tasks when the power supply 355 is in a first power supply state until the power supply 355 transitions from the first power supply state to a second power supply state, where the second power supply state is different from first power supply state. For example, the BLE stack handler 330, and/or, more generally, the BLE MCU 104, can invoke and/or otherwise cause the BLE interface 340 to defer execution of a radiofrequency operation when the power supply 355 is in the ENERGY_STATE_LOW state until the power supply 355 moves from the ENERGY_STATE_LOW state to the ENERGY_STATE_HIGH state. In some examples, the BLE interface 340, and/or, more generally the BLE MCU 104, defers execution of one or more computation tasks and/or one or more types of the one or more computation tasks when in the first state and the first power supply state until the BLE interface 340 transitions from the first state to the second state and/or transitions from the first power supply state to the second power supply state.

In the illustrated example of FIG. 22, the BLE interface 340 transitions from the disabled state 2240 to the advertising state 2240 when OTW capabilities, operations, etc., of the BLE interface 340 are enabled. For example, when the state of the power supply 355 moves from the ENERGY_STATE_LOW state to the ENERGY_STATE_HIGH state, a GPIO interrupt may invoke the power manager 326 to become active and determine that the state of the power supply 355 is ENERGY_STATE_HIGH. In such examples, the BLE stack handler 330 can invoke the BLE interface 340 to transmit one or more BLE data packets.

In FIG. 22, the BLE interface 340 transitions from the advertising state 2240 to the disabled state 2240 when OTW capabilities, operations, etc., of the BLE interface 340 are disabled. For example, when the state of the power supply 355 moves from the ENERGY_STATE_HIGH state to the ENERGY_STATE_LOW state, a GPIO interrupt may invoke the power manager 326 to determine that the state of the power supply 355 is ENERGY_STATE_LOW. In such examples, the BLE stack handler 330 can turn off the BLE interface 340 and stop the transmission of BLE data packets.

Figure 23:
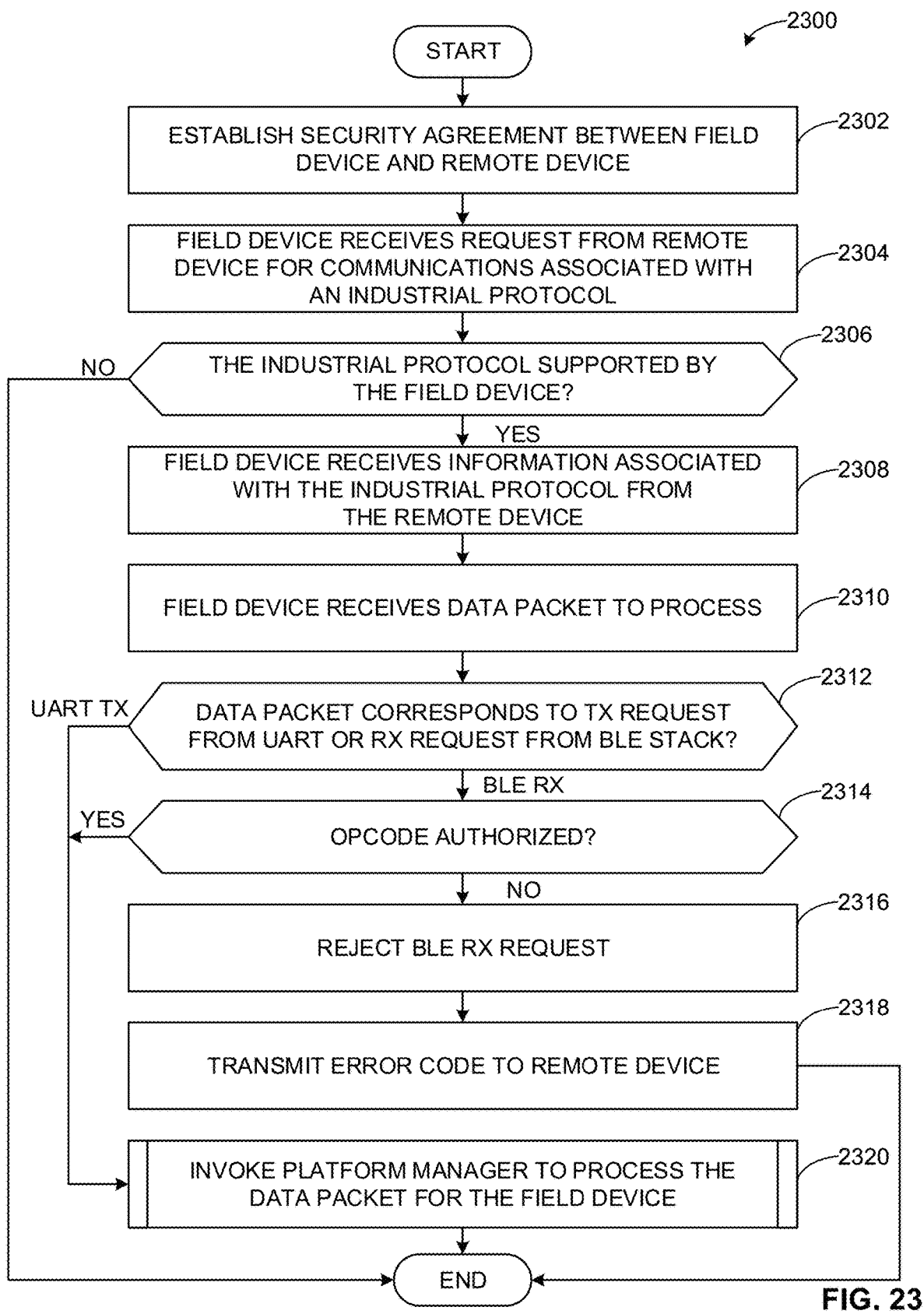
FIG. 23 is a flowchart representative of example machine readable instructions that may be performed by the example network bridge of FIGS. 1-3 to execute communication operation(s) between the field device of FIGS. 1-3 and the remote device of FIGS. 1-3.

FIG. 23 is a flowchart representative of example machine readable instructions 2300 that may be performed by the BLE bridge 104 of FIGS. 1-3 to execute communication operation(s) between the field device MCU 350 of FIG. 3 and the remote device 360 of FIG. 3. The machine readable instructions 2300 begin at block 2302 when the BLE bridge 104 establishes a security agreement between a field device and a remote device. For example, the security manager 332 (FIG. 3) may authorize the remote device 360 (FIG. 3) to communicate with the field device MCU 350 (FIG. 3) of the field device 102 (FIG. 1).

At block 2304, the field device receives a request from the remote device for communications associated with an industrial protocol. For example, the BLE bridge 104 may receive data packet(s) from the remote device 360 associated with a request by the remote device 360 to obtain data formatted for HART industrial communication protocol.

At block 2306, the BLE bridge 104 determines whether the industrial protocol is supported by the field device. For example, the command processor 322 (FIG. 3), may determine that the field device 102 does not support HART industrial communication protocol. In other examples, the command processor 322 can determine that the field device 102 does support HART industrial communication protocol.

If, at block 2306, the BLE bridge 104 determines that the industrial protocol is not supported by the field device, the machine readable instructions 2300 of FIG. 23 conclude. If, at block 2306, the BLE bridge 104 determines that the industrial protocol is supported by the field device, then, at block 2308, the field device receives information associated with the industrial protocol from the remote device. For example, the BLE interface 340 (FIG. 3) may receive data packet(s) from the remote device 360 corresponding to ancillary command(s) In such examples, the ancillary command(s) can correspond to storing HART protocol information such as a HART protocol address, HART protocol header information, etc., in the database 335 (FIG. 3).

At block 2310, the field device receives a data packet to process. For example, the BLE interface 340 may receive a data packet from the remote device 360, where the data packet does not include the HART protocol address, the HART protocol header information, etc.

At block 2312, the BLE bridge 104 determines whether the data packet corresponds to a transmit (TX) request from a UART or a receive (RX) request from a BLE stack. For example, the command processor 322 may receive a data packet from the field device MCU 350 for transmission to the remote device 360. In such examples, the command processor 322 can determine that the data packet corresponds to a data packet received on the receiver transmitter interface 300 (FIG. 3) from the field device MCU 350 to be transmitted to the remote device 360 via the BLE interface 340. In such examples, the command processor 322 can determine that the data packet corresponds to a TX request from a UART. In other examples, the command processor 322 can determine that the data packet corresponds to a RX request from the BLE stack (e.g., the BLE stack handler 330 (FIG. 3)) when the data packet corresponds to a data packet received by the BLE interface 340.

If, at block 2312, the BLE bridge 104 determines that the data packet corresponds to a TX request from a UART, control proceeds to block 2320 to invoke a protocol handler to process the data packet for the field device. If, at block 2312, the BLE bridge 104 determines that the data packet corresponds to a RX request from the BLE stack (e.g., a data packet received at the BLE stack handler 330 via the BLE interface 340), then, at block 2314, the BLE bridge 104 determines whether the opcode is authorized. For example, the command processor 322 may determine that an opcode of 0x00 for a data packet is mapped to a permission level of USER as illustrated in FIGS. 13A and 13B. In such examples, the command processor 322 can compare the permission level of the opcode to a permission level of a user connected to the field device 102 (e.g., a user of the remote device 106, the remote device 360, etc.). For example, the command processor 322 may determine that an opcode is not authorized based on a permission level of UNAUTHENTICATED of a user of the remote device 106 does not match the permission level of USER needed to execute action corresponding to the opcode of the data packet.

If, at block 2314, the BLE bridge 104 determines that an opcode is not authorized, then, at block 2316, the BLE bridge 104 rejects the BLE RX reject. For example, the command processor 322 may discard the received data packet from the remote device 360 via the BLE interface 340. In response to rejecting the BLE RX request at block 2316, the BLE bridge 104 transmits an error code to the remote device at block 2318. For example, the protocol handler 324 may generate and transmit an error code to the remote device 360 via the BLE interface 340. In such examples, the error code can indicate to the remote device 360 that the opcode is not authorized, that the permission level to process the data packet is not satisfied, etc. In response to transmitting the error code to the remote device at block 2318, the machine readable instructions 2300 of FIG. 23 conclude.

If, at block 2314, the BLE bridge 104 determines that an opcode is authorized, control proceeds to block 2320 to invoke a platform manager to process the data packet for the field device. An example process that may be used to implement block 2320 is described below in connection with FIG. 24. For example, the command processor 322 may invoke the protocol handler 324 (FIG. 3) of the platform manager 320 (FIG. 3) to generate and transmit a HART protocol packet based on the received BLE packet to the field device MCU 350 using the HART protocol address, the HART protocol header information, etc., stored in the database 335. In other examples, the command processor 322 can invoke the protocol handler 324 to remove the HART protocol address, the HART protocol header information, etc., from a data packet received from the field device MCU 350 to generate a shortened industrial protocol data frame. The BLE stack handler 330 may generate a BLE data packet based on the shortened industrial protocol data frame. The BLE stack handler 330 may transmit the BLE data packet to the remote device 360 via the BLE interface 340. Advantageously, the BLE bridge 104 may facilitate increased process control related data throughput compared to previous BLE systems by replacing the HART protocol information with process control related data (e.g., pressure values, temperature values, status indicators, etc.). In response to invoking the platform manager to process the data packet for the field device at block 2320, the machine readable instructions 2300 of FIG. 23 conclude.

Figure 24:
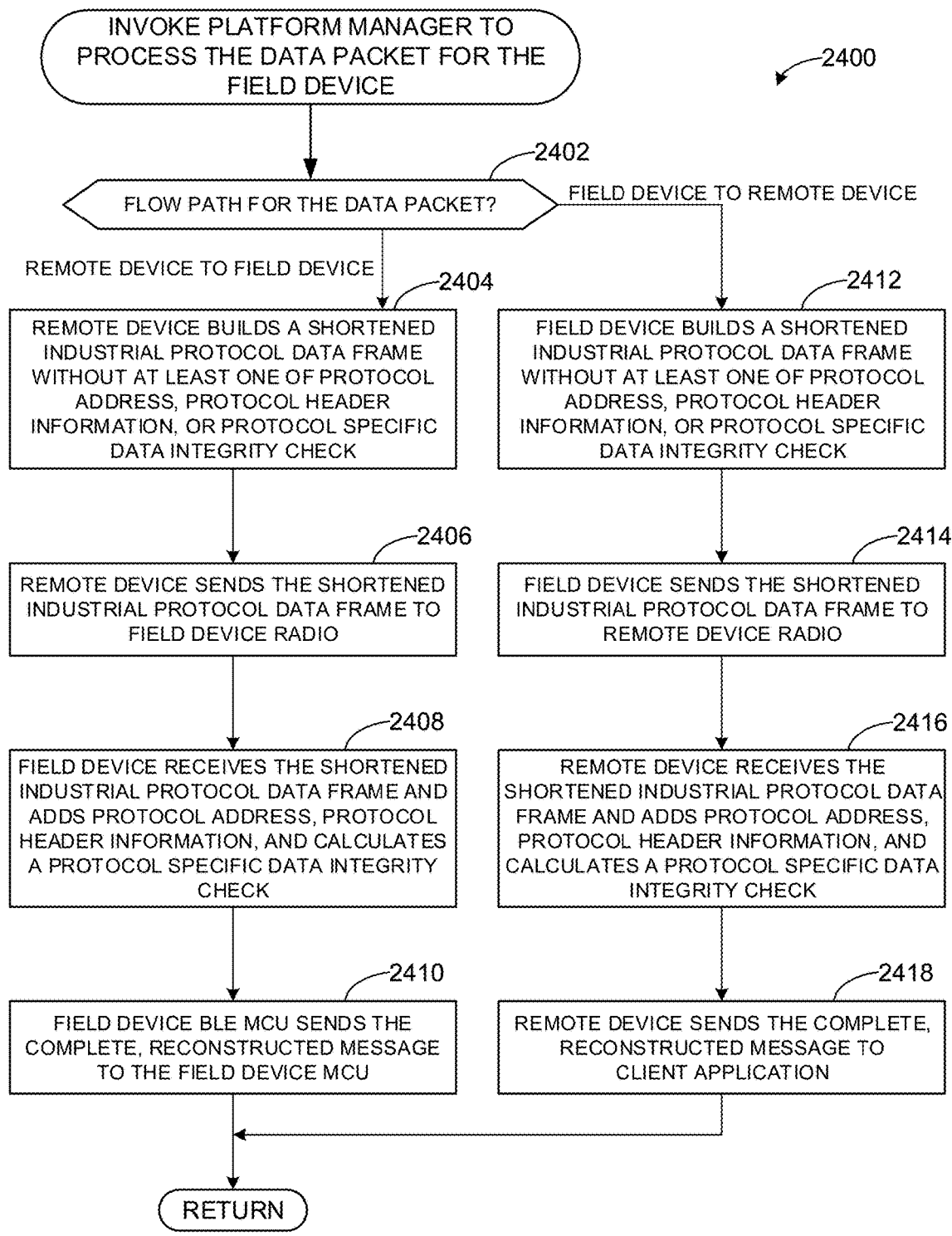
FIG. 24 is a flowchart representative of example machine readable instructions that may be performed by the example network bridge of FIGS. 1-3 to invoke a platform manager to process a data packet for the field device of FIGS. 1-3.

FIG. 24 is a flowchart representative of example machine readable instructions 2400 that may be performed by the BLE bridge 104 of FIGS. 1-3 to invoke a platform manager to process the data packet for the field device. The example process of FIG. 24 may be used to implement the operation of block 2320 of FIG. 23. The machine readable instructions 2400 begin at block 2402 when the BLE bridge 104 determines a flow path for the data packet. For example, the command processor 322 (FIG. 3) may determine whether a data packet corresponds to a TX request from a UART (FIELD DEVICE TO REMOTE DEVICE) or a RX from a BLE stack (REMOTE DEVICE TO FIELD DEVICE). For example, the command processor 322 may determine that a data packet corresponds to a data packet received on the receiver transmitter interface 300 (FIG. 3) from the field device MCU 350 (FIG. 3) to be transmitted to the remote device 360 (FIG. 3) via the BLE interface 340 (FIG. 3). In such examples, the command processor 322 can determine that the data packet corresponds to a UART TX request. In other examples, the command processor 322 can determine that a data packet corresponds to a data packet received at the BLE interface 340 from the remote device 360 to be transmitted to the field device MCU 350. In such examples, the command processor 322 can determine that the data packet corresponds to a BLE RX request.

If, at block 2402, the BLE bridge 104 determines that the flow path for the data packet corresponds to a RX request from the BLE stack (e.g., REMOTE DEVICE TO FIELD DEVICE), control proceeds to block 2404. At block 2404, the remote device builds a shortened industrial protocol data frame without at least one of a protocol address, protocol header information, or protocol specific data integrity check.

For example, the remote device 360 may generate the data packet 801 of FIG. 8A based on the BLE data channel packet format 800 of FIG. 8A.

At block 2406, the remote device sends the shortened industrial protocol data frame to a field device radio. For example, the remote device 360 may transmit the shortened industrial protocol data frame to the field device 102 via the BLE interface 340.

At block 2408, the field device receives the shortened industrial protocol data frame and adds a protocol address, protocol header information, and calculates a protocol specific data integrity check. For example, the protocol handler 324 may generate a HART protocol data packet using the payload from the received shortened industrial protocol data frame and the protocol address, the protocol header information, etc., stored in the database 335 (FIG. 3).

At block 2410, the field device BLE MCU sends the complete, reconstructed message to the field device MCU. For example, the command processor 322 may send the HART protocol data packet to the field device MCU 350. Alternatively, the BLE bridge 104 may not perform the function of block 1508 and pass the BLE data packet (e.g., an opcode, a data payload, etc., and/or a combination thereof) to the field device MCU 350. In response to sending the complete, reconstructed message to the field device MCU at block 2410, the machine readable instructions 2400 of FIG. 24 conclude. For example, the machine readable instructions 2400 of FIG. 24 may return to the machine readable instructions 2300 of FIG. 23, which, in turn, may conclude.

If, at block 2402, the BLE bridge 104 determines that the flow path for the data packet corresponds to a TX request from a UART (e.g., FIELD DEVICE TO REMOTE DEVICE), control proceeds to block 2412. At block 2412, the field device builds a shortened industrial protocol data frame without at least one of a protocol address, protocol header information, or protocol specific data integrity check. For example, the protocol handler 324 may generate the data packet 801 of FIG. 8A based on the BLE data channel packet format 800 of FIG. 8A.

At block 2414, the field device sends the shortened industrial protocol data frame to a remote device radio. For example, the BLE bridge 104 may transmit the shortened industrial protocol data frame to the remote device 360 via the BLE interface 340.

At block 2416, the remote device receives the shortened protocol data frame and adds a protocol address, protocol header information, and calculates a protocol specific data integrity check. For example, the remote device 360 may generate a HART protocol data packet using the payload from the received shortened industrial protocol data frame and the protocol address, the protocol header information, etc., stored in a database and/or memory included in the remote device 360.

At block 2418, the remote device sends the complete, reconstructed message to a client application operating on and/or otherwise executed by the remote device 360. For example, the remote device 360 may send the HART protocol data packet to an application running on the remote device 360. In response to sending the complete, reconstructed message to the client application at block 2418, the machine readable instructions 2400 of FIG. 24 conclude. For example, the machine readable instructions 2400 of FIG. 24 may return to the machine readable instructions 2400 of FIG. 24, which, in turn, may conclude.

Figure 25:
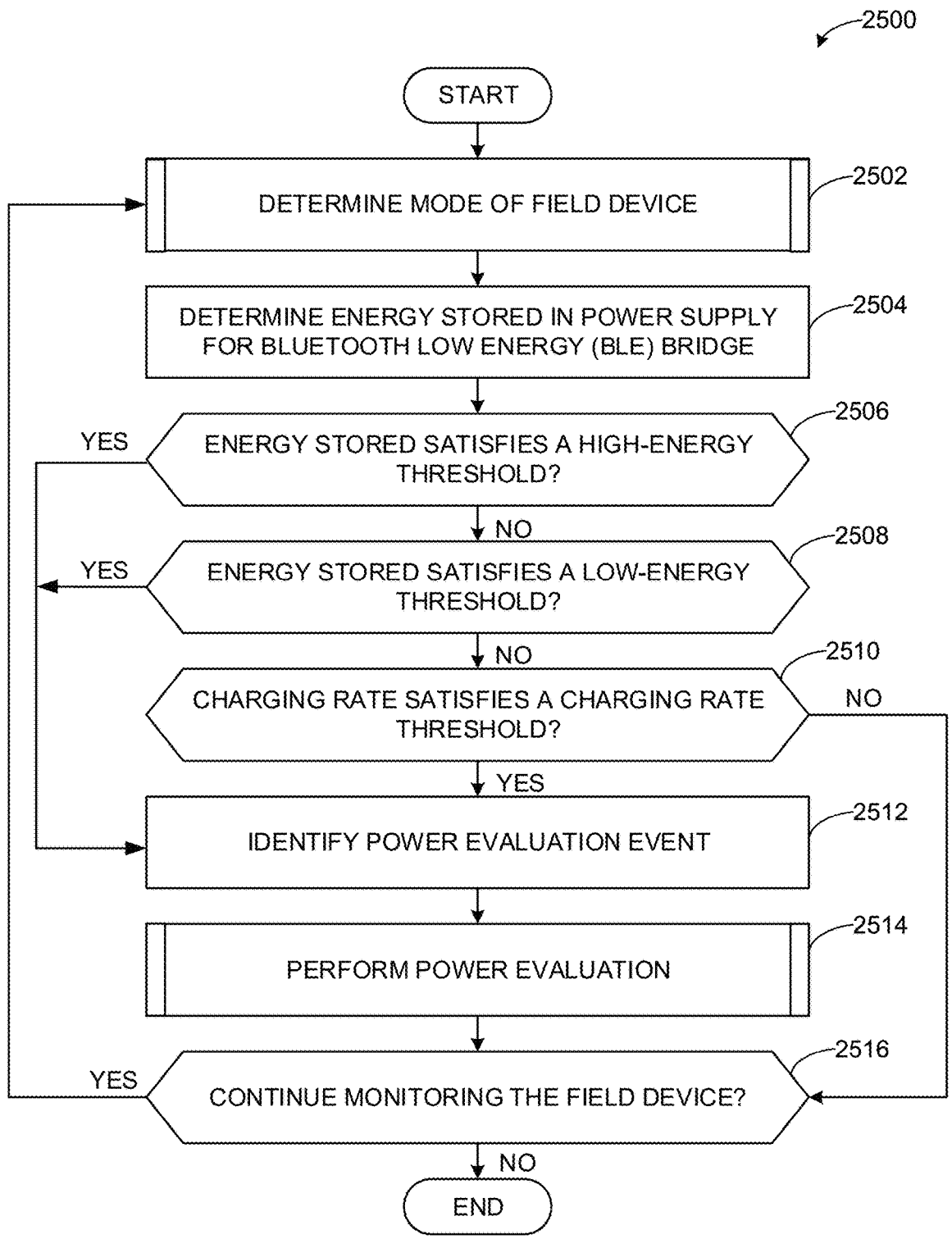
FIG. 25 is a flowchart representative of example machine readable instructions that may be performed by the example network bridge of FIGS. 1-3 to identify a power evaluation event.

FIG. 25 is a flowchart representative of example machine readable instructions 2500 that may be performed by the BLE bridge 104 of FIGS. 1-3 to identify a power evaluation event. The machine readable instructions 2500 begin at block 2502 when the BLE bridge 104 determines a mode of a field device. For example, the power manager 326 (FIG. 3) may determine that the field device 102 of FIGS. 1-2 is in a maintenance mode. In such examples, the field device MCU 350 can disable one or more control functions of the BLE bridge 104. An example process that may be used to implement block 2502 is described below in connection with FIG. 26.

At block 2504, the BLE bridge 104 determines energy stored in a power supply for the BLE bridge. For example, the power manager 326 may obtain the outputs from the comparators 358a-b of FIG. 3 to determine a voltage associated with the power supply 355 (FIG. 3) powering the BLE bridge 104 or a component of the BLE bridge 104 such as the BLE interface 340 (FIG. 3).

At block 2506, the BLE bridge 104 determines whether the energy stored satisfies a high-energy threshold. For example, the first comparator 358a may compare the voltage of the energy storage device 356 to the high-voltage threshold, which corresponds to the high-energy threshold, and determine that the voltage satisfies the high-voltage threshold based on the voltage being greater than the high-voltage threshold. In such examples, the first comparator 358a can generate a logic High signal and the power manager 326 can determine that the state of the power supply 355 is ENERGY_STATE_HIGH based on the logic High signal. In other examples, the first comparator 358a can compare the voltage to the high-voltage threshold and determine that the voltage does not satisfy the high-voltage threshold based on the voltage being less than the high-voltage threshold.

If, at block 2506, the BLE bridge 104 determines that the energy stored satisfies the high-energy threshold, control proceeds to block 2512 to identify a power evaluation event. If, at block 2506, the BLE bridge 104 determines that the energy stored does not satisfy the high-energy threshold, then, at block 2508, the BLE bridge 104 determines whether the energy stored satisfies a low-energy threshold. For example, the second comparator 358b may compare the voltage of the energy storage device 356 to the low-voltage threshold, which corresponds to the low-energy threshold, and determine that the voltage satisfies the low-voltage threshold based on the voltage being greater than the low-voltage threshold. In such examples, the second comparator 358b can assert a logic High signal and the power manager 326 can determine that the state of the power supply 355 is ENERGY_STATE_LOW based on the logic High signal. In other examples, the second comparator 358b may compare the voltage to the low-voltage threshold and determine that the voltage does not satisfy the low-voltage threshold based on the voltage being less than the low-voltage threshold. In such examples, the second comparator 358b can generate a logic Low signal and the power manager 326 can determine that the state of the power supply 355 is ENERGY_STATE_LOW based on the logic Low signal.

If, at block 2508, the BLE bridge 104 determines that the energy stored satisfies the low-energy threshold, control proceeds to block 2512 to identify a power evaluation event. If, at block 2508, the BLE bridge 104 determines that the energy stored does not satisfy the low-energy threshold, then, at block 2510, the BLE bridge 104 determines whether a charging rate satisfies a charging rate threshold. For example, the power manager 326 may determine a charging rate of the power supply 355 by the field device MCU 350 of 0.2 mW based on a SPI message from the field device MCU 350. In such examples, the power manager 326 can compare the charging rate of 0.4 mW to a 0.3 mW charging rate threshold and determine that the charging rate satisfies the charging rate threshold based on the charging rate being greater than the charging rate threshold.

If, at block 2510, the BLE bridge 104 determines that the charging rate does not satisfy the charging rate threshold, control proceeds to block 2516 to determine whether to continue monitoring the field device. If, at block 2510, the BLE bridge 104 determines that the charging rate satisfies the charging rate threshold, then, at block 2512, the BLE bridge 104 identifies a power evaluation event. For example, the power manager 326 can determine that a state of the power supply 355 has changed.

At block 2514, the BLE bridge 104 performs a power evaluation. For example, the power manager 326 may calculate an available power budget of the BLE bridge 104 and adjust a parameter of the BLE interface 340 based on the available power budget. An example process that may be used to implement block 2514 is described below in connection with FIG. 27.

At block 2516, the BLE bridge 104 determines whether to continue monitoring the field device. For example, the power manager 326 may determine to continue monitoring the voltage of the power supply 355 of the field device 102. If, at block 2516, the BLE bridge 104 determines to continue monitoring the field device, control returns to block 2502 to determine the mode of the field device, otherwise the machine readable instructions 2500 of FIG. 25 conclude.

Figure 26:
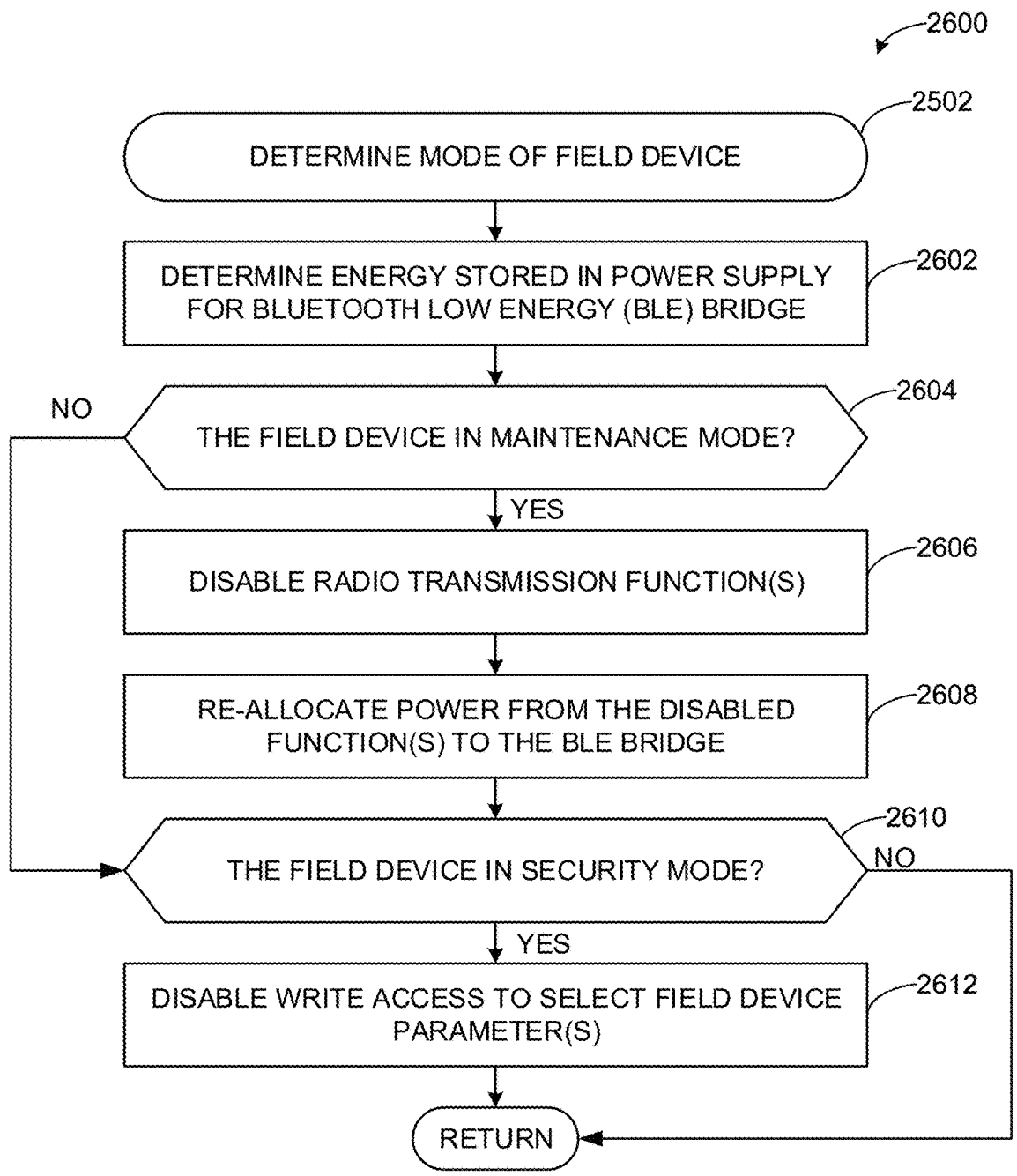
FIG. 26 is a flowchart representative of example machine readable instructions that may be performed by the example network bridge of FIGS. 1-3 to determine a mode of the field device of FIGS. 1-3.

FIG. 26 is a flowchart representative of example machine readable instructions 2600 that may be performed by the BLE bridge 104 of FIGS. 1-3 to determine a mode of a field device. The example process of FIG. 26 may be used to implement the operation of block 2502 of FIG. 25. The machine readable instructions 2600 of FIG. 26 begin at block 2602 when the BLE bridge 104 determines energy stored in a power supply for the BLE bridge. For example, the power manager 326 may obtain the outputs from the comparators 358*a-b* of FIG. 3 to determine a voltage associated with the power supply 355 (FIG. 3) powering the BLE bridge 104 or a component of the BLE bridge 104 such as the BLE interface 340 (FIG. 3).

At block 2604, the BLE bridge 104 determines whether the field device is in a maintenance mode. For example, the power manager 326 may determine that the field device 102 is in a maintenance mode by querying the database 335 (FIG. 3). If, at block 2604, the BLE bridge 104 determines that the field device is not in the maintenance mode, control proceeds to block 2610 to determine whether the field device is in a security mode. If, at block 2604, the BLE bridge 104 determines that the field device is in the maintenance mode, then, at block 2606, the BLE bridge 104 disables radio transmission function(s). For example, the power manager 326 may direct the BLE stack handler 330 (FIG. 3) to disable one or more functions of the BLE interface 340.

At block 2608, the BLE bridge 104 re-allocates power from the disabled function(s) to the BLE bridge. For example, the power manager 326 may re-allocate the power corresponding to the one or more disabled functions of the BLE interface 340 to the platform manager 320 (FIG. 3). For example, the BLE stack handler 330 may disable the data transmission capabilities of the BLE interface 340 and re-allocate the power associated with the disabled capabilities to the command processor 322, protocol handler 324, the security manager 332, etc.

At block 2610, the BLE bridge 104 determines whether the field device is in the security mode. For example, the power manager 326 may determine that the field device 102 is in the security mode based on querying the database 335 (FIG. 3). If, at block 2610, the BLE bridge 104 determines that the field device is not in the security mode, the machine readable instructions 2600 of FIG. 26 conclude. For example, control may return to block 2504 of FIG. 25 to determine the voltage of the power supply to the BLE bridge. If, at block 2610, the BLE bridge 104 determines that the field device is in the security mode, then, at block 2612, the BLE bridge 104 disables writes access to select field device parameter(s). For example, the power manager 326 may disable write access to one or more parameters of the BLE bridge 104, the field device 102, etc., such as a firmware version, a calibration version, an error log, a BLE interface transmission power, etc., and/or a combination thereof. In response to disabling write access to the select field device parameter(s), the machine readable instructions 2600 of FIG. 26 conclude. For example, control may return to block 2504 of FIG. 25 to determine the voltage of the power supply to the BLE bridge.

Figure 27:
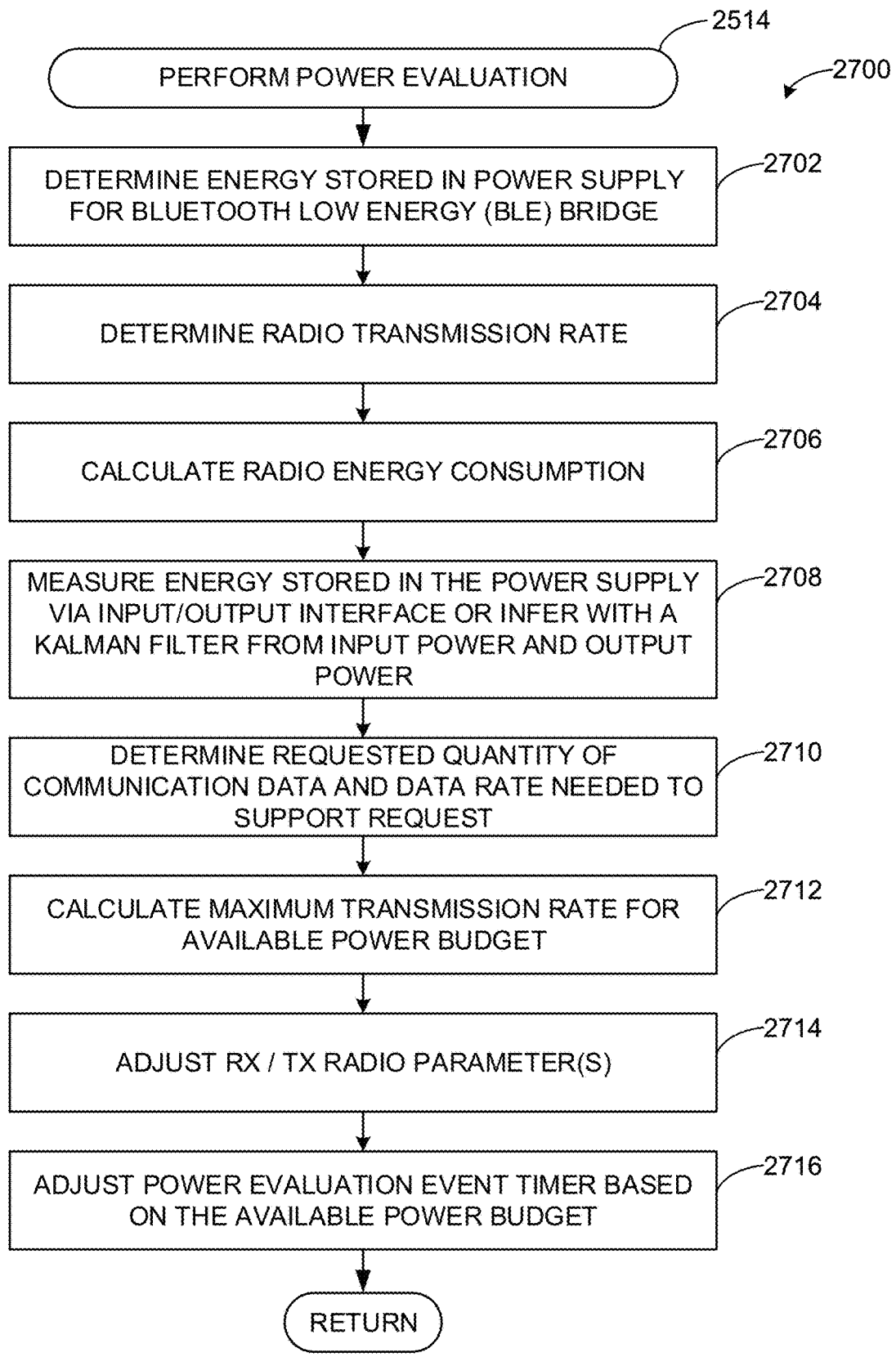
FIG. 27 is a flowchart representative of example machine readable instructions that may be performed by the example network bridge of FIGS. 1-3 to perform a power evaluation and adjust a parameter of a BLE radio associated with the network bridge.

FIG. 27 is a flowchart representative of example machine readable instructions 2700 that may be performed by the BLE bridge 104 of FIGS. 1-3 to perform a power evaluation event and adjust a parameter of a BLE radio (e.g., the BLE interface 340 (FIG. 3)). The example process of FIG. 27 may be used to implement the operation of block 2514 of FIG. 25. The machine readable instructions 2700 begin at block 2702 when the BLE bridge 104 determines energy stored in a power supply for the BLE bridge. For example, the power manager 326 may obtain the outputs from the comparators 358*a-b* of FIG. 3 to determine a voltage associated with the power supply 355 (FIG. 3) powering the BLE bridge 104 or a component of the BLE bridge 104 such as the BLE interface 340 (FIG. 3).

At block 2704, the BLE bridge 104 determines a radio transmission rate. For example, the power manager 326 may measure a radio transmission rate of the BLE interface 340 in bytes/second, kilobytes/second, etc. At block 2706, the BLE bridge 104 calculates a radio energy consumption. For example, the power manager 326 may calculate a radio energy consumption of the BLE interface 340 as described above in accordance with Equation (1) and/or Equation (2).

At block 2708, the BLE bridge 104 measures energy stored in the power supply via an input/output interface or infer with a Kalman filter from input power and output power. For example, the power manager 326 may determine an amount of energy stored in the power supply 355 via the input/output interface 310 (FIG. 3) and/or infer with a Kalman filter based on the input power and the output power of the field device 102 of FIGS. 1-2.

At block 2710, the BLE bridge 104 determines a requested quantity of communication data requested and a data rate needed to support the request. For example, the power manager 326 may determine an amount of data to be transferred from the remote device 106 of FIGS. 1-2 to the field device 102 and a corresponding data rate to support the transfer.

At block 2712, the BLE bridge 104 calculates a maximum transmission rate for an existent power budget. For example, the power manager 326 may calculate a maximum data transmission rate for an available power budget allocated to the BLE interface 340. In such examples, the power manager 326 can determine a state of the power supply 355 based on the voltage of the power supply 355, and map the state to a date rate of the BLE interface 340, such as a minimum data rate, a maximum data rate, a data rate in a range from the minimum data rate to the maximum data rate, etc.

At block 2714, the BLE bridge 104 adjusts RX/TX radio parameters. For example, the power manager 326 may increase an antenna power of the BLE interface 340 based on the maximum transmission rate, the available power budget, the amount of data to be transferred, etc., and/or a combination thereof. In other examples, the power manager 326 can decrease an antenna power of the BLE interface 340 based on the minimum transmission rate, the available power budget, the amount of data to be transferred, etc., and/or a combination thereof.

At block 2716, the BLE bridge 104 adjusts a power evaluation event timer based on the existent power budget. For example, the power manager 326 may adjust the time between power evaluation events as described above in accordance with Equation (5). In response to adjusting the power evaluation event timer, the machine readable instructions 2700 of FIG. 27 conclude. For example, control may return to block 2516 of FIG. 25 to determine whether to continue monitoring the field device.

Figure 28A:
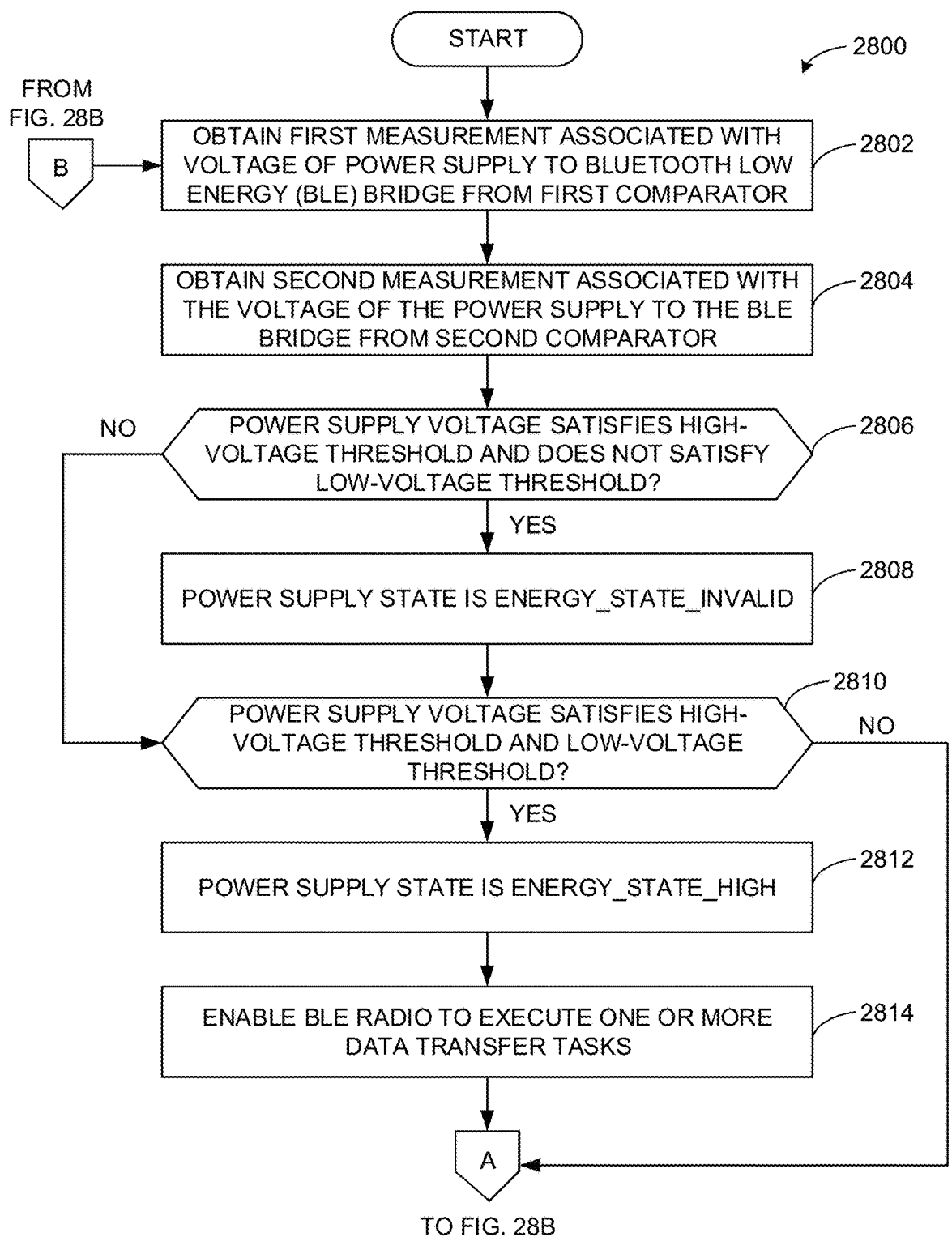
FIGS. 28A-28B depict a flowchart representative of example machine readable instructions that may be performed by the example network bridge 104 of FIGS. 1-3 to determine a state of the example power supply of FIG. 3 and adjust a parameter of the network bridge.
Figure 28B:
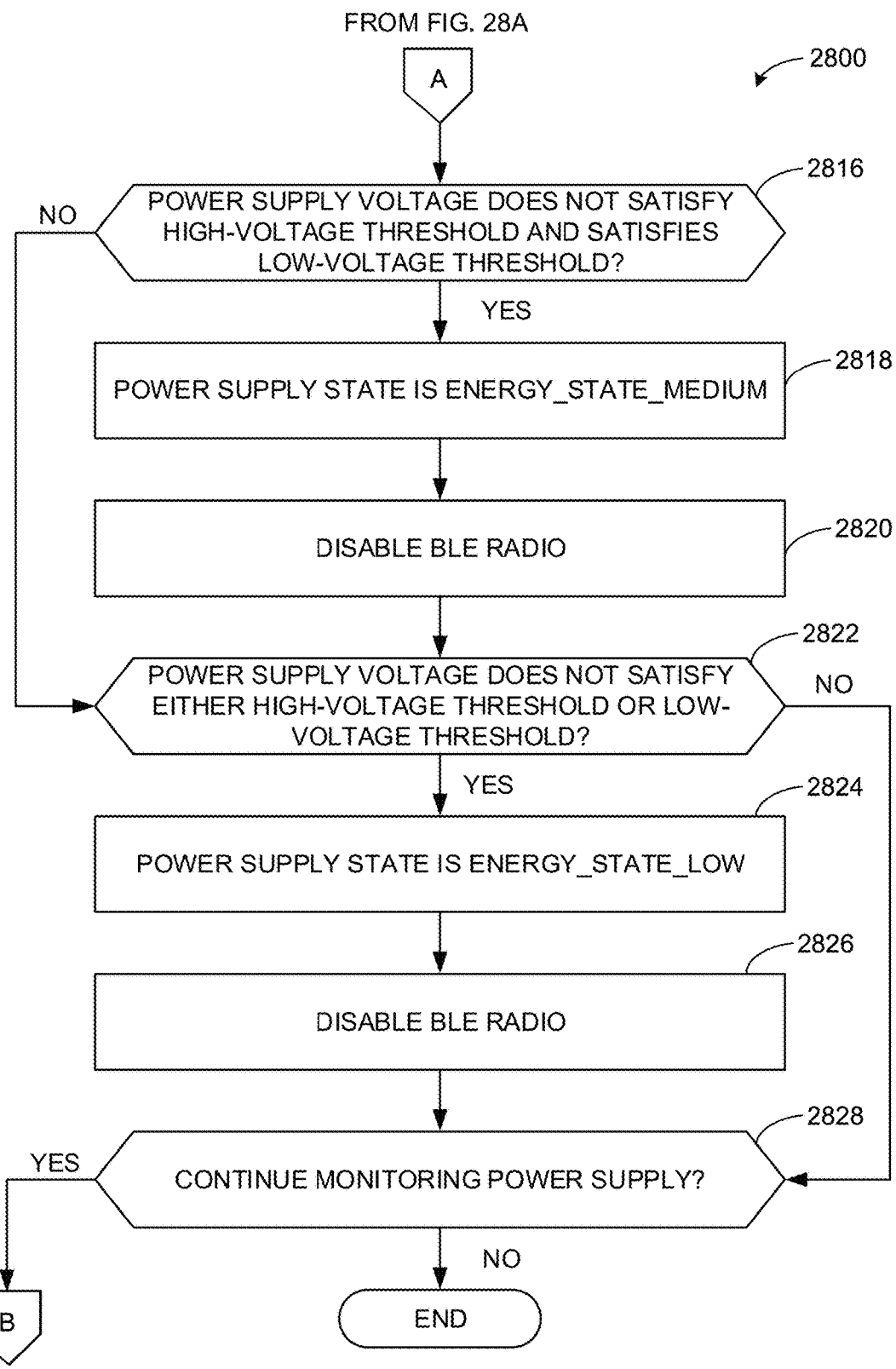

FIGS. 28A-28B depict a flowchart representative of example machine readable instructions 2800 that may be performed by the BLE bridge 104 of FIGS. 1-3 to determine a state of the power supply 355 of FIG. 3 and adjust a parameter of a BLE radio (e.g., the BLE interface 340 (FIG. 3)) based on the state. The machine readable instructions 2800 of FIGS. 28A-28B begin at block 2802 when the BLE bridge 104 obtains a first measurement associated with a voltage of the power supply 355 to the BLE bridge 104 from the first comparator 358a. For example, the power manager 326 can invoke the input/output interface 310 to measure a first voltage at a first IC pin of the power supply 355. In such examples, the power manager 326 can determine that the first voltage at the first IC pin corresponds to a logic High signal, a logic Low signal, etc., where the first voltage is indicative of the voltage of the energy storage device 356.

At block 2804, the BLE bridge 104 obtains a second measurement associated with the voltage of the power supply 355 to the BLE bridge 104 from the second comparator 358b. For example, the power manager 326 can invoke the input/output interface 310 to measure a second voltage at a second IC pin of the power supply 355. In such examples, the power manager 326 can determine that the second voltage at the second IC pin corresponds to a logic High signal, a logic Low signal, etc., where the second voltage is indicative of the voltage of the energy storage device 356.

At block 2806, the BLE bridge 104 determines whether the power supply voltage satisfies a high-voltage threshold and does not satisfy a low-voltage threshold. For example, the power manager 326 can determine that the first voltage corresponds to a logic High and, thus, satisfies the high-voltage threshold (e.g., the first comparator 358a is asserting a logic High signal when the voltage of the energy storage device 356 is greater than the high-voltage threshold). In such examples, the power manager 326 can determine that the second voltage corresponds to a logic Low and, thus, does not satisfy the low-voltage threshold (e.g., the second comparator 358b is generating a logic Low signal when the voltage of the energy storage device 356 is less than the low-voltage threshold). When the power manager 326 determines that the voltage of the energy storage device 356 satisfies the high-voltage threshold but does not satisfy the low-voltage threshold, the power manager 326 determines that the power supply 355 has an invalid state.

If, at block 2806, the BLE bridge 104 determines that the power supply voltage satisfies the high-voltage threshold and does not satisfy the low-voltage threshold, then, at block 2808, the BLE bridge 104 determines that the power supply state is ENERGY_STATE_INVALID. For example, the power manager 326 can determine that the state of the power supply 355 is invalid. In response to determining that the power supply state is ENERGY_STATE_INVALID at block 2808, then, at block 2810, the BLE bridge 104 determines whether the power supply voltage satisfies the high-voltage threshold and the low-voltage threshold.

If, at block 2806, the BLE bridge 104 determines that the power supply voltage either does not satisfy the high-voltage threshold or satisfies the low-voltage threshold, control proceeds to block 2810 to determine whether the power supply voltage satisfies the high-voltage threshold and the low-voltage threshold. For example, the power manager 326 can determine that the state of the power supply 355 is ENERGY_STATE_HIGH when the voltage of the energy storage device 356 satisfies the high-voltage threshold and the low-voltage threshold.

If, at block 2810, the BLE bridge 104 determines that the power supply voltage either does not satisfy the high-voltage threshold or the low-voltage threshold, control proceeds to block 2816 to determine whether the power supply voltage does not satisfy the high-voltage threshold and satisfies the low-voltage threshold. If, at block 2810, the BLE bridge 104 determines that the power supply voltage satisfies the high-voltage threshold and the low-voltage threshold, then, at block 2812, the BLE bridge 104 determines that the power supply state is ENERGY_STATE_HIGH. For example, the power manager 326 can determine that the state of the power supply 355 is ENERGY_STATE_HIGH when the voltage of the energy storage device 356 satisfies the high-voltage threshold and the low-voltage threshold.

In response to determining that the power supply state is ENERGY_STATE_HIGH at block 2812, the BLE bridge 104 enables a BLE radio to execute one or more data transfer tasks at block 2814. For example, the power manager 326 may allocate a portion of the power budget to the BLE stack handler 330 to invoke the BLE interface 340 to transmit one or more BLE data packets, receive one or more BLE data packets, etc. In such examples, the power manager 326 can determine a quantity of energy associated with each of the data transfer tasks. The power manager 326 can deduct a total quantity of energy associated with the one or more data transfer tasks from the power budget. In some examples, the power manager 326 can idle the BLE bridge 104 by transitioning the BLE bridge 104 to a sleep mode, an idle mode, etc., to re-charge the power supply 355 and/or otherwise replenish the consumed energy. In other examples, the power manager 326 can determine that one or more computation tasks, data transfer tasks, etc., can be executed based on the remaining power budget.

In response to enabling the BLE radio to execute the one or more data transfer tasks at block 2814, the BLE bridge 104 determines whether the power supply voltage does not satisfy the high-voltage threshold and satisfies the low-voltage threshold at block 2816. For example, the power manager 326 can determine that the state of the power supply 355 is ENERGY_STATE_MEDIUM when the voltage of the energy storage device 356 does not satisfy the high-voltage threshold but satisfies the low-voltage threshold.

If, at block 2816, the BLE bridge 104 determines that the power supply voltage either satisfies the high-voltage threshold or does not satisfy the low-voltage threshold, control proceeds to block 2822 to determine whether the power supply voltage does not satisfy either the high-voltage threshold or the low-voltage threshold. If, at block 2816, the BLE bridge 104 determines that the power supply voltage does not satisfy the high-voltage threshold and satisfies the low-voltage threshold, then, at block 2818, the BLE bridge 104 determines that the power supply state is ENERGY_STATE_MEDIUM. For example, the power manager 326 can determine that the state of the power supply 355 is ENERGY_STATE_MEDIUM when the voltage of the energy storage device 356 does not satisfy the high-voltage threshold but satisfies the low-voltage threshold. In response to determining that the power supply state is ENERGY_STATE_MEDIUM at block 2818, the BLE bridge 104 disables the BLE radio at block 2820. For example, the power manager 326 can idle the BLE bridge 104 by disabling the BLE interface 340 to re-charge the power supply 355 to cause the voltage of the power supply 355 to satisfy the high-voltage threshold.

At block 2822, the BLE bridge 104 determines whether the power supply voltage does not satisfy either the high-voltage threshold or the low-voltage threshold. For example, the power manager 326 can determine that the state of the power supply 355 is ENERGY_STATE_LOW when the voltage of the energy storage device 356 does not satisfy either the high-voltage threshold or the low-voltage threshold. If, at block 2822, the BLE bridge 104 determines that the power supply voltage satisfies at least one of the high-voltage threshold or the low-voltage threshold, control proceeds to block 2828 to continue monitoring the power supply. If, at block 2822, the BLE bridge 104 determines that the power supply voltage does not satisfy either the high-voltage threshold or the low-voltage threshold, then, at block 2824, the BLE bridge 104 determines that the state of the power supply 355 is ENERGY_STATE_LOW. For example, the power manager 326 can determine that the state of the power supply 355 is ENERGY_STATE_LOW when the voltage of the energy storage device 356 does not satisfy the high-voltage threshold or the low-voltage threshold. In response to determining that the power supply state is ENERGY_STATE_LOW at block 2824, the BLE bridge 104 disables the BLE radio at block 2826. For example, the power manager 326 can idle the BLE bridge 104 by disabling the BLE interface 340 to re-charge the power supply 355 to cause the voltage of the power supply 355 to satisfy the high-voltage threshold.

In response to disabling the BLE radio at block 2826, the BLE bridge 104 determines whether to continue monitoring the power supply at block 2828. For example, the power manager 326 may determine not to continue monitoring the power supply 355 by entering a sleep mode, an idle mode, etc., and resume monitoring the power supply when a power evaluation event occurs. In other examples, the power manager 326 can determine to continue monitoring the power supply 355 until entering the sleep mode, the idle mode, etc.

If, at block 2828, the BLE bridge 104 determines to continue monitoring the power supply, control returns to block 2802 to obtain another measurement associated with the voltage of the power supply to the BLE bridge from the first comparator. If, at block 2828, the BLE bridge 104 determines not to continue monitoring the power supply, the machine readable instructions 2800 of FIGS. 28A-28B conclude. For example, the power manager 326 may instruct the BLE bridge 104 to enter the sleep mode, the idle mode, etc., until a power evaluation event occurs.

Figure 29:
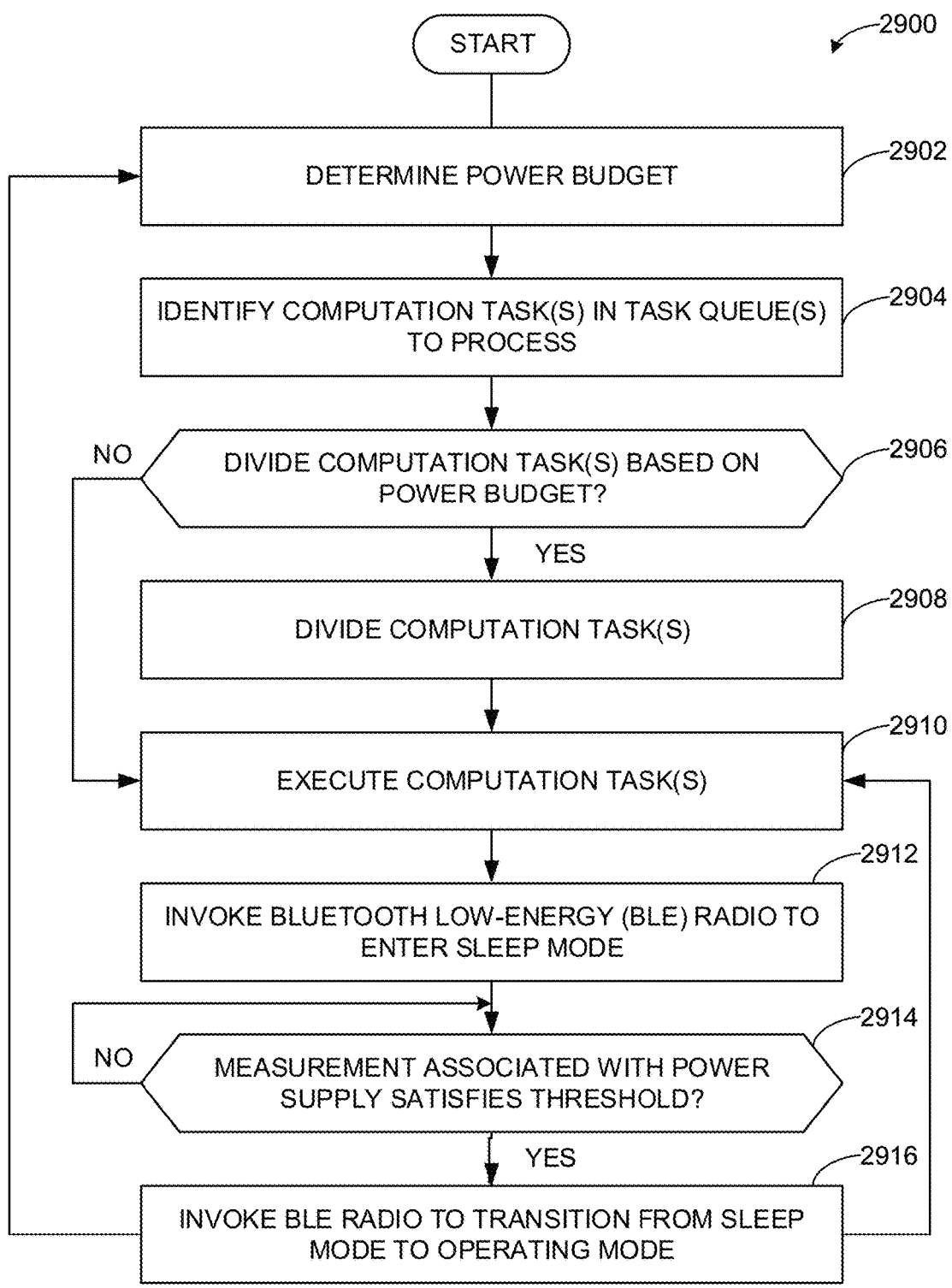
FIG. 29 is a flowchart representative of example machine readable instructions that may be performed by the example network bridge 104 of FIGS. 1-3 to process one or more computation tasks based on a power budget.

FIG. 29 depict a flowchart representative of example machine readable instructions 2900 that may be performed by the BLE bridge 104 of FIGS. 1-3 to process one or more computation tasks based on a power budget. The machine readable instructions 2900 of FIG. 29 begin at block 2902 when the BLE bridge 104 determines a power budget. For example, the power manager 326 (FIG. 3) may determine a power budget based on at least one of energy stored in the power supply 355 (FIG. 3) associated with the BLE interface 340 or a charging rate of the power supply 355.

At block 2904, the BLE bridge 104 identifies computation task(s) in task queue(s) to process. For example, the power manager 326 may identify a first set of one or more computation tasks in a first task queue associated with a first priority and/or a second set of one or more computation tasks in a second task queue associated with a second priority, where the second priority is lower than the first priority.

At block 2906, the BLE bridge 104 determines whether to divide computation task(s). For example, the power manager 326 can determine whether to divide a first computation task in the first set into at least a second computation task and a third computation task based on the power budget. In other examples, the power manager 326 can determine (1) not to divide the first computation task in the first set based on the first priority and/or (2) divide a fourth computation task in the second set into at least a fifth computation task and a sixth computation task based on the second priority. In such examples, the power manager 326 can determine not to divide the first computation task because the first computation task has a higher priority than the fourth computation task.

If, at block 2906, the BLE bridge 104 determines not to divide the computation task(s) based on the power budget, control proceeds to block 2910 to execute one or more computation task(s). If, at block 2906, the BLE bridge 104 determines to divide the computation task(s) based on the power budget, then, at block 2908, the BLE bridge 104 divides the computation task(s). For example, the power manager 326 can divide the fourth computation task in the second set into at least the fifth computation task and the sixth computation task based on the second priority.

At block 2910, the BLE bridge 104 executes computation task(s). For example, the BLE stack handler 330 (FIG. 3) can invoke the BLE interface 340 (FIG. 3) to execute a radiofrequency operation (e.g., transmit a BLE packet, receive a BLE packet, etc.). In other examples, the power manager 326 can generate a thread (e.g., a security task processor thread) to invoke the security manager 332 (FIG. 3) to execute the fifth computation task. For example, the fifth computation task may correspond to the first security task 1504 of FIG. 15.

At block 2912, the BLE bridge 104 invokes the BLE radio to enter a sleep mode. For example, the power manager 326 can invoke the BLE MCU 104 of FIGS. 1-3 to transition from an operating mode to a sleep mode (e.g., the idle mode 1404 of FIG. 14). In such examples, the energy storage device 356 (FIG. 3) can charge to satisfy the high-energy threshold while in the sleep mode.

At block 2914, the BLE bridge 104 determines whether a measurement associated with a power supply satisfies a threshold. For example, the input/output interface 310 (FIG. 3) can generate a hardware interrupt that invokes the power manager 326 when the first comparator 358a asserts a logic High in response to the high-energy threshold being satisfied. In such examples, the power manager 326 can determine to invoke the BLE bridge 104 to transition from the sleep mode to the operating mode.

At block 2916, the BLE bridge 104 invokes the BLE radio to transition from the sleep mode to the operating mode. For example, the BLE stack handler 330 can invoke the BLE interface 340 to execute a radiofrequency operation (e.g., transmit a BLE packet, receive a BLE packet, etc.). In other examples, the power manager 326 can invoke the security manager 332 to execute the sixth computation task. For example, the sixth computation task may correspond to the second security task 1602 of FIG. 16. In response to invoking the BLE radio to transition from the sleep mode to the operating mode, the machine readable instructions 2900 of FIG. 29 return to block 2902 to determine the power budget. For example, the power manager 326 can determine the power budget by deducting a first energy quantity associated with one or more of the executed computation tasks and by adding a second energy quantity associated with the field device MCU 350 (FIG. 3) charging the power supply 355 based on the charging rate.

Figure 30:
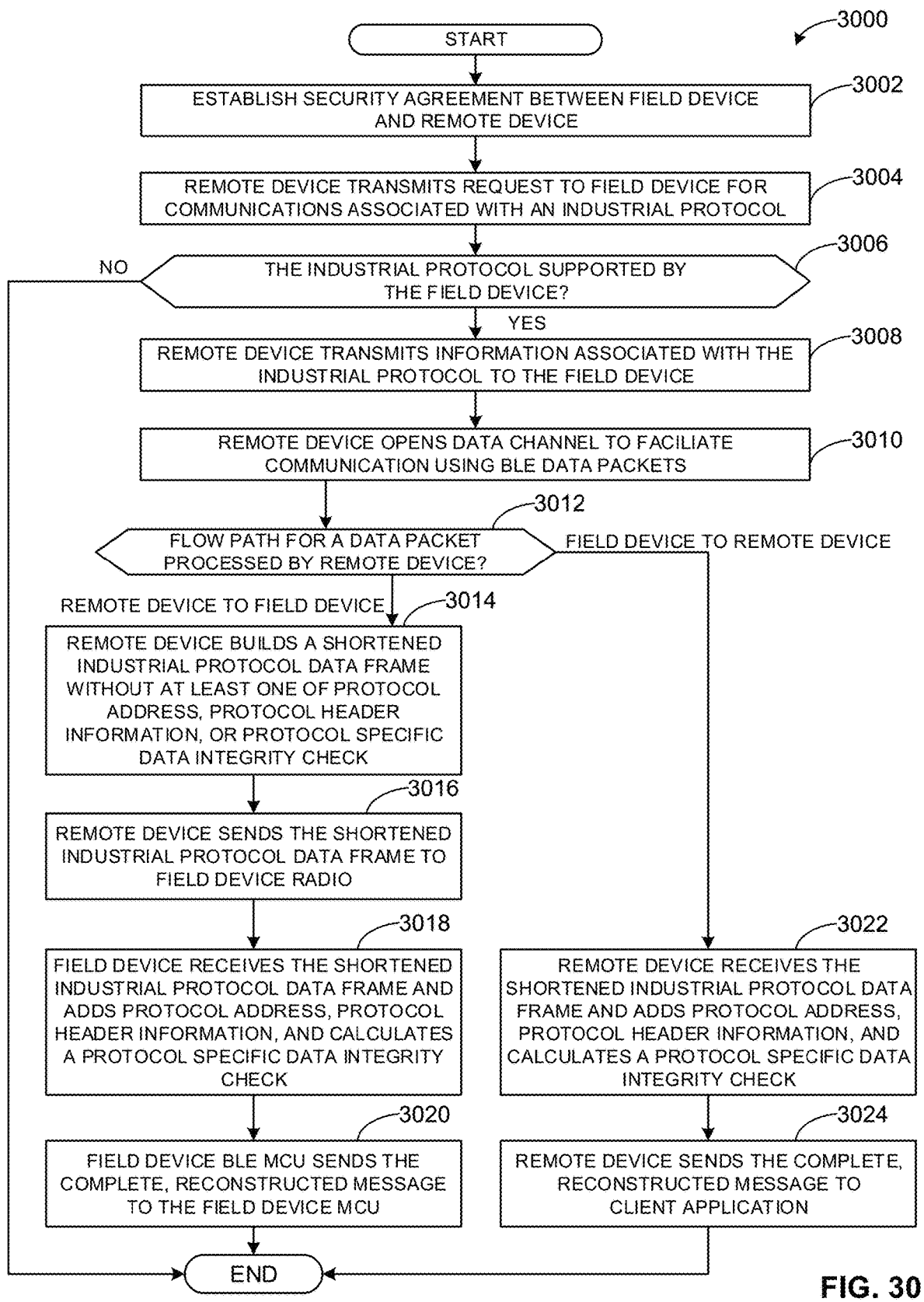
FIG. 30 is a flowchart representative of example machine readable instructions that may be performed by the example remote devices of FIGS. 1, 2, and/or 3 to execute communication operation(s) between the example field device of FIGS. 1, 2, and/or 3 and the remote devices using BLE.

A flowchart representative of example hardware logic, machine readable instructions, hardware implemented state machines, and/or any combination thereof for implementing the remote device 106 of FIG. 1, the remote devices 200, 202, 204 of FIG. 2, and/or the remote device 360 of FIG. 3 is shown in FIG. 30. The machine readable instructions may be an executable program or portion of an executable program for execution by a computer processor such as the processor 3212 shown in the example processor platform 3200 discussed below in connection with FIG. 32. The program may be embodied in software stored on a non-transitory computer readable storage medium such as a CD-ROM, a floppy disk, a hard drive, a DVD, a Blu-ray disk, or a memory associated with the processor 3212, but the entire program and/or parts thereof could alternatively be executed by a device other than the processor 3212 and/or embodied in firmware or dedicated hardware. Further, although the example program is described with reference to the flowchart illustrated in FIG. 30, many other methods of implementing the remote device 106 of FIG. 1, the remote devices 200, 202, 204 of FIG. 2, and/or the remote device 360 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. As mentioned above, the example process of FIG. 30 may be implemented using executable instructions (e.g., computer and/or machine readable instructions) stored on a non-transitory computer and/or machine readable medium such as a hard disk drive, a flash memory, a read-only memory, a CD, a DVD, a cache, a random-access memory, and/or any other storage device or storage disk in which information is stored for any duration (e.g., for extended time periods, permanently, for brief instances, for temporarily buffering, and/or for caching of the information).

FIG. 30 is a flowchart representative of example machine readable instructions 3000 that may be performed by the remote device 106 of FIG. 1, the Remote Devices 1-3 200, 202, 204 of FIG. 2, and/or the remote device 360 of FIG. 3 to execute communication operation(s) between the field device 102 and at least one of the remote devices 106, 200, 202, 204, 360 of FIGS. 1, 2, and/or 3 using BLE. The machine readable instructions 3000 of FIG. 30 begin at block 3002 when a remote device establishes a security agreement between a field device and the remote device. For example, the security manager 332 (FIG. 3) may authorize the remote device 360 (FIG. 3) to communicate with the field device MCU 350 (FIG. 3) of the field device 102 (FIG. 1).

At block 3004, the remote device transmits a request to the field device for communications associated with an industrial protocol. For example, the remote device 360 may transmit data packet(s) to the field device 102, where the data packet(s) correspond to a request by the remote device 360 to obtain data formatted for HART industrial communication protocol.

At block 3006, the remote device determines whether the industrial protocol is supported by the field device. For example, the remote device 360 may obtain a data packet (e.g., an error message) from the field device 102 indicating that the field device 102 does not support HART industrial communication protocol. In other examples, the remote device 360 can obtain a data packet (e.g., an acknowledgment message) from the field device 102 indicating that the field device 102 supports HART industrial communication protocol.

If, at block 3006, the remote device determines that the industrial protocol is not supported by the field device, the machine readable instructions 3000 of FIG. 30 conclude. If, at block 3006, the remote device determines that the industrial protocol is supported by the field device, then, at block 3008, the remote device transmits information associated with the industrial protocol to the field device. For example, the remote device 360 may transmit data packet(s) to the BLE interface 340 (FIG. 3) corresponding to ancillary command(s) In such examples, the ancillary command(s) can correspond to instructing the BLE bridge 104 to store HART protocol information such as a HART protocol address, HART protocol header information, etc., in the database 335 (FIG. 3).

At block 3010, the remote device opens a data channel (e.g., an encrypted and authenticated data channel) to facilitate communication using BLE data packets. For example, the remote device 360 may generate a BLE data packet to transmit to the field device 102. In other examples, the remote device 360 can receive a BLE data packet from the field device 102.

At block 3012, the remote device determines a flow path for a BLE data packet processed by the remote device. For example, the remote device 360 may determine whether a data packet corresponds to a RX request from the field device 102 (FIELD DEVICE TO REMOTE DEVICE) or a TX request from the remote device 360 to the field device 102 (REMOTE DEVICE TO FIELD DEVICE).

If, at block 3012, the remote device determines that the flow path for the data packet corresponds to a TX request (e.g., REMOTE DEVICE TO FIELD DEVICE), control proceeds to block 3014. At block 3014, the remote device builds a shortened industrial protocol data frame without at least one of a protocol address, protocol header information, or protocol specific data integrity check. For example, the remote device 360 may generate the data packet 801 of FIG. 8A based on the BLE data channel packet format 800 of FIG. 8A.

At block 3016, the remote device sends the shortened industrial protocol data frame to a field device radio. For example, the remote device 360 may transmit the shortened industrial protocol data frame to the field device 102 via the BLE interface 340.

At block 3018, the field device receives the shortened industrial protocol data frame and adds a protocol address, protocol header information, and calculates a protocol specific data integrity check. For example, the protocol handler 324 (FIG. 3) may generate a HART protocol data packet using the payload from the received shortened industrial protocol data frame and the protocol address, the protocol header information, etc., stored in the database 335 (FIG. 3).

At block 3020, the field device BLE MCU sends the complete, reconstructed message to the field device MCU. For example, the command processor 322 may send the HART protocol data packet to the field device MCU 350. Alternatively, the BLE bridge 104 may not perform the function of block 3018 and pass the BLE data packet (e.g., an opcode, a data payload, etc., and/or a combination thereof) to the field device MCU 350. In response to sending the complete, reconstructed message to the field device MCU at block 3020, the machine readable instructions 3000 of FIG. 30 conclude. Alternatively, in response to sending the shortened industrial protocol data frame to the field device MCU 350, the machine readable instructions 3000 of FIG. 30 may conclude.

If, at block 3012, the remote device determines that the flow path for the data packet processed by the remote device corresponds to a RX request (e.g., FIELD DEVICE TO REMOTE DEVICE), control proceeds to block 3022. At block 3022, the remote device receives the shortened protocol data frame and adds a protocol address, protocol header information, and calculates a protocol specific data integrity check. For example, the remote device 360 may generate a HART protocol data packet using the payload from the received shortened industrial protocol data frame and the protocol address, the protocol header information, etc., stored in a database and/or memory included in the remote device 360.

At block 3024, the remote device sends the complete, reconstructed message to a client application operating on and/or otherwise executed by the remote device. For example, the remote device 360 may send the HART protocol data packet to an application running on the remote device 360. In response to sending the complete, reconstructed message to the client application at block 3028, the machine readable instructions 3000 of FIG. 30 conclude.

Figure 31:
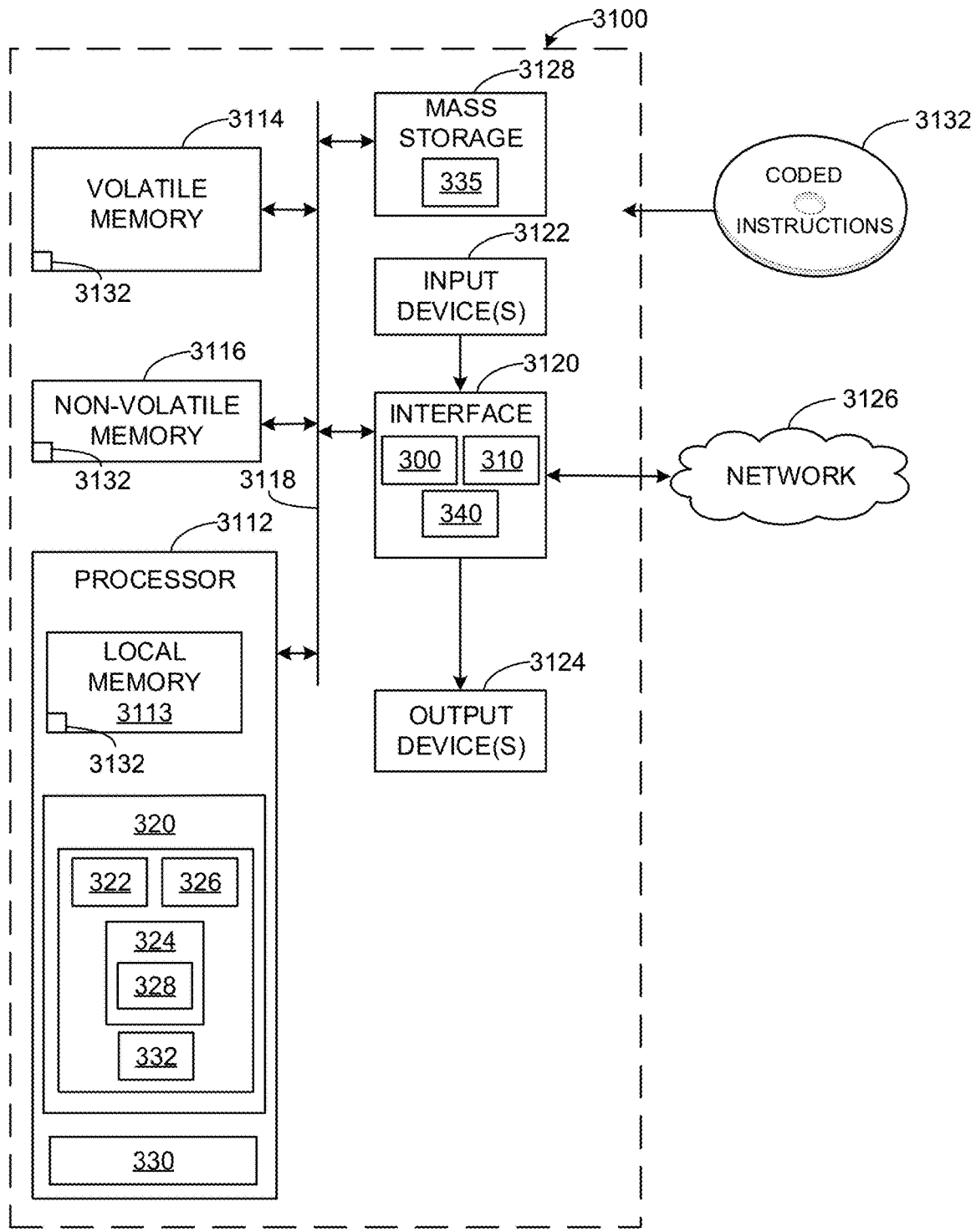
FIG. 31 is a block diagram of an example processor platform structured to execute the instructions of FIGS. 21-29 to implement the example network bridge of FIGS. 1-3.

FIG. 31 is a block diagram of an example processor platform 3100 structured to execute the instructions of FIGS. 21-29 to implement the BLE bridge 104 of FIGS. 1-3. The processor platform 3100 can be, for example, a field device controller, a controller, a valve positioner, or any other type of computing device and/or process control device.

The processor platform 3100 of the illustrated example includes a processor 3112. The processor 3112 of the illustrated example is hardware. For example, the processor 3112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 3112 implements the platform manager 320, the command processor 322, the protocol handler 324, the power manager 326, the RX/TX interface handler 328, the BLE stack handler 330, and the security manager 332 of FIG. 3.

The processor 3112 of the illustrated example includes a local memory 3113 (e.g., a cache). The processor 3112 of the illustrated example is in communication with a main memory including a volatile memory 3114 and a non-volatile memory 3116 via a bus 3118. The volatile memory 3114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 3116 may be implemented by flash memory and/or any other desired type of memory device. Access to the main memory 3114, 3116 is controlled by a memory controller.

The processor platform 3100 of the illustrated example also includes an interface circuit 3120. The interface circuit 3120 may be implemented by any type of interface standard, such as an Ethernet interface, a universal serial bus (USB), a Bluetooth® interface, a BLE radio interface, a near field communication (NFC) interface, a UART interface, a GPIO interface, and/or a peripheral component interconnect (PCI) express interface. In this example, the interface circuit 3120 implements the receiver transmitter interface 300, the input/output interface 310, and the BLE interface 340 of FIG. 3.

In the illustrated example, one or more input devices 3122 are connected to the interface circuit 3120. The input device(s) 3122 permit(s) a user to enter data and/or commands into the processor 3112. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 3124 are also connected to the interface circuit 3120 of the illustrated example. The output devices 3124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or a speaker. The interface circuit 3120 of the illustrated example, thus, typically includes a graphics driver card, a graphics driver chip, and/or a graphics driver processor.

The interface circuit 3120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3126. The communication can be via, for example, an Ethernet connection, a digital subscriber line (DSL) connection, a telephone line connection, a coaxial cable system, a satellite system, a line-of-site wireless system, a cellular telephone system, a Bluetooth network connection, a BLE network connection, etc.

The processor platform 3100 of the illustrated example also includes one or more mass storage devices 3128 for storing software and/or data. Examples of such mass storage devices 3128 include floppy disk drives, hard drive disks, CD drives, Blu-ray disk drives, redundant array of independent disks (RAID) systems, and DVD drives. In this example, the mass storage device 3128 implements the database 335 of FIG. 3.

The machine executable instructions 3132 of FIGS. 21-29 may be stored in the mass storage device 3128, in the volatile memory 3114, in the non-volatile memory 3116, and/or on a removable non-transitory computer readable storage medium such as a CD or DVD.

Figure 32:
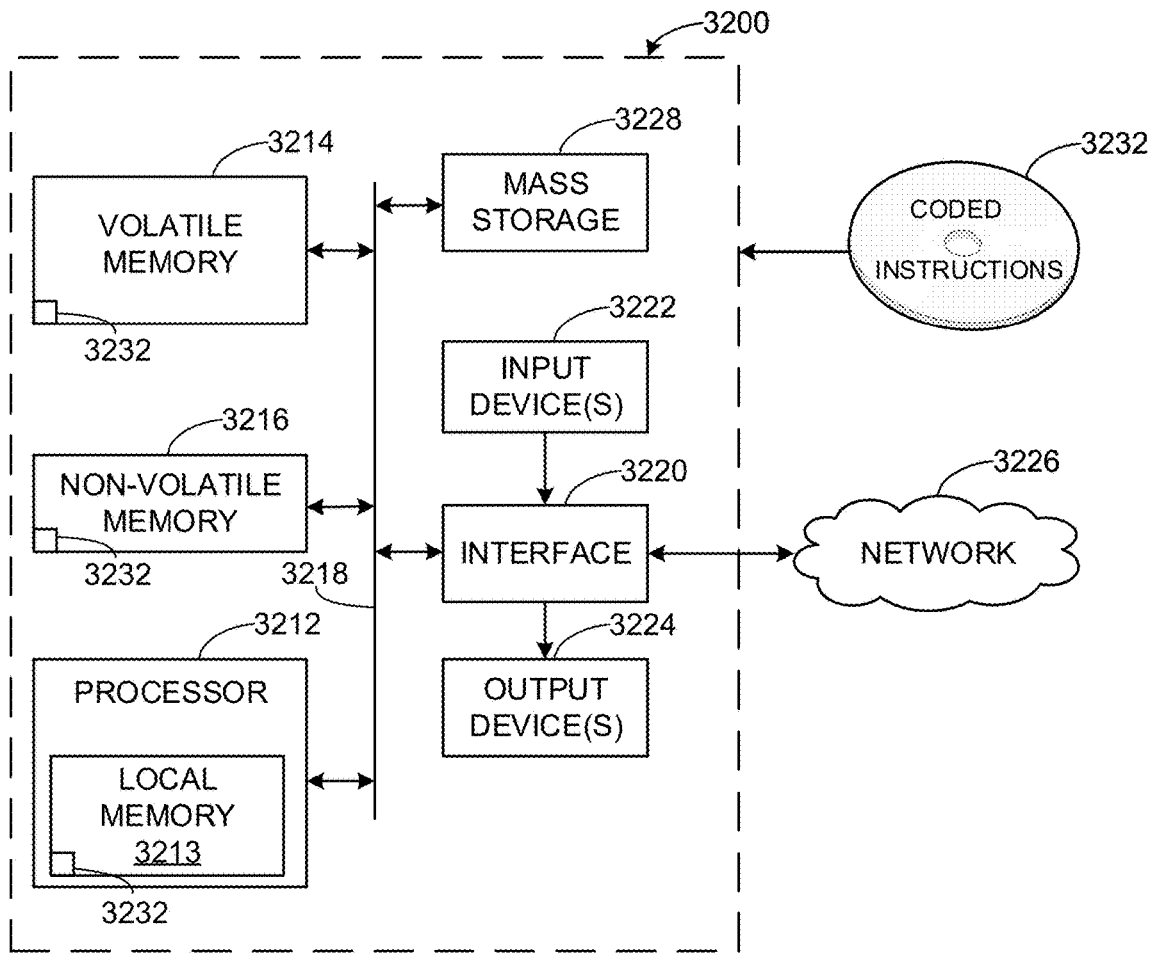
FIG. 32 is a block diagram of an example processor platform structured to execute the instructions of FIG. 30 to implement the example remote devices of FIGS. 1, 2, and/or 3.

FIG. 32 is a block diagram of an example processor platform 3200 structured to execute the instructions of FIG. 30 to implement the remote device 106 of FIG. 1, the Remote Devices 1-3 200, 202, 204 of FIG. 2, and/or the remote device 360 of FIG. 3. The processor platform 3200 can be, for example, a personal computer, a mobile device (e.g., a cell phone, a smart phone, a tablet such as an iPad™, a personal digital assistant (PDA), or any other type of computing device.

The processor platform 3200 of the illustrated example includes a processor 3212. The processor 3212 of the illustrated example is hardware. For example, the processor 3212 can be implemented by one or more integrated circuits, logic circuits, microprocessors, GPUs, DSPs, or controllers from any desired family or manufacturer. The hardware processor may be a semiconductor based (e.g., silicon based) device.

The processor 3212 of the illustrated example includes a local memory 3213 (e.g., a cache). The processor 3212 of the illustrated example is in communication with a main memory including a volatile memory 3214 and a non-volatile memory 3216 via a bus 3218. The volatile memory 3214 may be implemented by SDRAM, DRAM, RDRAM, and/or any other type of random access memory device. The non-volatile memory 3216 may be implemented by flash memory and/or any other desired type of memory device. Access to the main memory 3214, 3216 is controlled by a memory controller.

The processor platform 3200 of the illustrated example also includes an interface circuit 3220. The interface circuit 3220 may be implemented by any type of interface standard, such as a Bluetooth® interface, an Ethernet interface, a USB, a BLE radio interface, a UART interface, a GPIO interface, and/or a PCI express interface.

In the illustrated example, one or more input devices 3222 are connected to the interface circuit 3220. The input device(s) 3222 permit(s) a user to enter data and/or commands into the processor 3212. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 3224 are also connected to the interface circuit 3220 of the illustrated example. The output devices 3224 can be implemented, for example, by display devices (e.g., a LED, an OLED, an LCD, a CRT display, an IPS display, a touchscreen, etc.), a tactile output device, a printer, and/or a speaker. The interface circuit 3220 of the illustrated example, thus, typically includes a graphics driver card, a graphics driver chip, and/or a graphics driver processor.

The interface circuit 3220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3226. The communication can be via, for example, an Ethernet connection, a DSL connection, a telephone line connection, a coaxial cable system, a satellite system, a line-of-site wireless system, a cellular telephone system, a Bluetooth network connection, a BLE network connection, etc.

The processor platform 3200 of the illustrated example also includes one or more mass storage devices 3228 for storing software and/or data. Examples of such mass storage devices 3228 include floppy disk drives, hard drive disks, CD drives, Blu-ray disk drives, RAID systems, and DVD drives.

The machine executable instructions 3232 of FIG. 30 may be stored in the mass storage device 3228, in the volatile memory 3214, in the non-volatile memory 3216, and/or on a removable non-transitory computer readable storage medium such as a CD or DVD.

From the foregoing, it will be appreciated that example methods, apparatus, and articles of manufacture have been disclosed that control communication data rates of low-powered devices such as BLE transceivers. Disclosed network bridges enable an example remote device to form a peer-to-peer connection with a field device to calibrate or configure the field device and/or, more generally, to interface with the field device. The example BLE bridge apparatus executes communication operations based on a direction of data flow. In response to obtaining data packets from a field device MCU, the BLE bridge apparatus removes protocol information from the obtained data packets and transmits the processed data packets to a remote device via BLE. In response to obtaining data packets from a remote device, the BLE bridge apparatus generates protocol packets based on a supported protocol of the field device. By removing protocol information from a data packet prior to submission, the field device can transmit and/or receive more data on a reduced power budget. Moreover, examples disclosed herein adjust one or more parameters of a BLE transceiver based on an input power of the field device to transmit and/or receive more data on the reduced power budget. In some examples disclosed herein, an operation of the field device can be disabled and/or otherwise modified to reallocate power corresponding to the disabled and/or modified operation to the BLE transceiver to improve a data throughput and/or an efficiency of the BLE transceiver.

Example methods, apparatus, systems, and articles of manufacture to control communication data rates of low-energy devices are disclosed herein. Further examples and combinations thereof include the following:

Example 1 includes an apparatus to manage a power profile of a network bridge of a field device in a process control environment, the apparatus comprising a Bluetooth Low Energy (BLE) radio, and a power manager to determine whether to divide a first computation task into at least a second computation task and a third computation task based on (1) energy stored in a power supply associated with the BLE radio and (2) a charging rate of the power supply, and when the first computation task is to be executed by the BLE radio and the first computation task is divided based on the determination instruct the BLE radio to enter a sleep mode after the second computation task is executed, and invoke the BLE radio to transition from the sleep mode to an operating mode to execute the third computation task, the invoking in response to a measurement associated with the power supply satisfying an energy threshold.

Example 2 includes the apparatus of example 1, wherein the measurement is a first measurement and the energy threshold is a high-energy threshold, and further including an input/output interface to obtain a first interrupt from a first comparator, the first comparator is to compare the first measurement to the high-energy threshold, and obtain a second interrupt from a second comparator, the second comparator is to compare a second measurement associated with the power supply to a low-energy threshold, and the power manager is to instruct the BLE radio to enter the operating mode when the first interrupt indicates the first measurement satisfies the high-energy threshold, and direct the BLE radio to enter the sleep mode when the second interrupt indicates the second measurement does not satisfy the low-energy threshold.

Example 3 includes the apparatus of example 2, further including a BLE stack handler to assign a first data rate to the BLE radio when the charging rate is a first charging rate, adjust the first data rate to a second data rate for the BLE radio when the first charging rate is changed to a second charging rate, the second charging rate less than the first charging rate, the second data rate less than the first data rate, and when the first computation task is to be executed by the BLE radio, facilitate communication of data between the BLE radio and a device separate from the field device based on the second data rate.

Example 4 includes the apparatus of example 3, wherein the BLE stack handler is to adjust the first data rate to the second data rate by adjusting at least one of (1) a first data quantity to a second data quantity to be communicated during a radiofrequency operation, or (2) a first data interval to a second data interval, the first data interval and the second data interval corresponding to time durations between radiofrequency operations of the BLE radio.

Example 5 includes the apparatus of example 1, wherein the field device is to charge the power supply, and the power manager is to determine a first charging rate of the power supply based on first data in a data buffer, the field device to write the first data to the data buffer, determine a power budget associated with the BLE radio based on the first charging rate, and adjust the power budget when the first charging rate is changed to a second charging rate when the field device writes second data to the data buffer, the second charging rate different from the first charging rate, the second data different from the first data.

Example 6 includes the apparatus of example 1, further including a BLE stack handler to instruct the BLE radio to execute the second computation task by facilitating communication of a first data quantity between the BLE radio and a device separate from the field device at a first data interval when the charging rate is a first charging rate, and instruct the BLE radio to execute the second computation by facilitating communication of a second data quantity between the BLE radio and the device at a second data interval when the charging rate is a second charging rate, the second data quantity less than the first data quantity, the second data interval longer than the first data interval, the second charging rate less than the first charging rate, the first data interval and the second data interval corresponding to time durations between radiofrequency operations of the BLE radio.

Example 7 includes the apparatus of example 1, wherein the energy threshold is a first energy threshold corresponding to a first energy quantity stored by the power supply, the first computation task is not to be executed by the BLE radio, and the power manager is to determine that a first task queue having a first priority includes the first computation task, determine that a second task queue having a second priority includes a fourth computation task, the first priority greater than the second priority, calculate a second energy quantity to execute the first computation task, calculate a third energy quantity to execute the fourth computation task, determine a difference between the first energy quantity and a sum of the second energy quantity and the third energy quantity, and when the difference is greater than a fourth energy quantity associated with a second energy threshold, invoke a platform manager to execute the first computation task and the fourth computation task, the first computation task to be executed at a first time, the fourth computation task to be executed at a second time after the first time, the fourth energy quantity less than the first energy quantity.

Example 8 includes the apparatus of example 7, when the difference is not greater than the fourth energy quantity, the power manager is to divide the fourth computation task into at least a fifth computation task and a sixth computation task, instruct the platform manager to execute the first computation task and the fifth computation task, the first computation task to be executed at the first time, the fifth computation task to be executed at the second time, and instruct the platform manager to execute the sixth computation task, the sixth computation task to be executed at a third time after the second time, the platform manager in the sleep mode from the second time to the third time.

Example 9 includes the apparatus of example 1, wherein the second computation task and the third computation task are radiofrequency operations of the BLE radio, and the power manager is to identify a fourth computation task to be executed, the fourth computation task not to be executed by the BLE radio, invoke a platform manager to execute the fourth computation task when at least one of (i) the BLE radio is in a first BLE state or (ii) the power supply is in a first power supply state when the energy stored satisfies the energy threshold, and invoke the platform manager to defer execution of the fourth computation task when at least one of (iii) the BLE radio is in a second BLE state different from the first BLE state or (iv) the power supply is in a second power supply state when the energy stored does not satisfy the energy threshold, wherein the fourth computation task is to be deferred until at least one of the BLE radio is in the first BLE state or the power supply is in the first power supply state.

Example 10 includes a non-transitory computer readable storage medium comprising instructions that, when executed, cause at least one processor of a network bridge of a field device in a process control environment to at least determine whether to divide a first computation task into at least a second computation task and a third computation task based on (1) energy stored in a power supply associated with a Bluetooth Low Energy (BLE) radio of the network bridge and (2) a charging rate of the power supply, and when the first computation task is to be executed by the BLE radio and the first computation task is divided based on the determination instruct the BLE radio to enter a sleep mode after the second computation task is executed, and invoke the BLE radio to transition from the sleep mode to an operating mode to execute the third computation task, the invoking in response to a measurement associated with the power supply satisfying an energy threshold.

Example 11 includes the non-transitory computer readable storage medium of example 10, wherein the measurement is a first measurement and the energy threshold is a high-energy threshold, and the instructions, when executed, cause the at least one processor to obtain a first interrupt from a first comparator, the first comparator is to compare the first measurement to the high-energy threshold, obtain a second interrupt from a second comparator, the second comparator is to compare a second measurement associated with the power supply to a low-energy threshold, instruct the BLE radio to enter the operating mode when the first interrupt indicates the first measurement satisfies the high-energy threshold, and direct the BLE radio to enter the sleep mode when the second interrupt indicates the second measurement does not satisfy the low-energy threshold.

Example 12 includes the non-transitory computer readable storage medium of example 11, wherein the instructions, when executed, cause the at least one processor to assign a first data rate to the BLE radio when the charging rate is a first charging rate, adjust the first data rate to a second data rate for the BLE radio when the first charging rate is changed to a second charging rate, the second charging rate less than the first charging rate, the second data rate less than the first data rate, and when the first computation task is to be executed by the BLE radio, facilitate communication of data between the BLE radio and a device separate from the field device based on the second data rate.

Example 13 includes the non-transitory computer readable storage medium of example 12, wherein the instructions, when executed, cause the at least one processor to adjust the first data rate to the second data rate by adjusting at least one of (1) a first data quantity to a second data quantity to be communicated during a radiofrequency operation, or (2) a first data interval to a second data interval, the first data interval and the second data interval corresponding to time durations between radiofrequency operations of the BLE radio.

Example 14 includes the non-transitory computer readable storage medium of example 10, wherein the field device is to charge the power supply, and the instructions, when executed, cause the at least one processor to determine a first charging rate of the power supply based on first data in a data buffer, the field device to write the first data to the data buffer, determine a power budget associated with the BLE radio based on the first charging rate, and adjust the power budget when the first charging rate is changed to a second charging rate when the field device writes second data to the data buffer, the second charging rate different from the first charging rate, the second data different from the first data.

Example 15 includes the non-transitory computer readable storage medium of example 10, wherein the instructions, when executed, cause the at least one processor to instruct the BLE radio to execute the second computation task by facilitating communication of a first data quantity between the BLE radio and a device separate from the field device at a first data interval when the charging rate is a first charging rate, and instruct the BLE radio to execute the second computation by facilitating communication of a second data quantity between the BLE radio and the device at a second data interval when the charging rate is a second charging rate, the second data quantity less than the first data quantity, the second data interval longer than the first data interval, the second charging rate less than the first charging rate, the first data interval and the second data interval corresponding to time durations between radiofrequency operations of the BLE radio.

Example 16 includes the non-transitory computer readable storage medium of example 10, wherein the energy threshold is a first energy threshold corresponding to a first energy quantity stored by the power supply, the first computation task is not to be executed by the BLE radio, and the instructions, when executed, cause the at least one processor to determine that a first task queue having a first priority includes the first computation task, determine that a second task queue having a second priority includes a fourth computation task, the first priority greater than the second priority, calculate a second energy quantity to execute the first computation task, calculate a third energy quantity to execute the fourth computation task, determine a difference between the first energy quantity and a sum of the second energy quantity and the third energy quantity, and when the difference is greater than a fourth energy quantity associated with a second energy threshold, execute the first computation task and the fourth computation task, the first computation task to be executed at a first time, the fourth computation task to be executed at a second time after the first time, the fourth energy quantity less than the first energy quantity.

Example 17 includes the non-transitory computer readable storage medium of example 16, when the difference is not greater than the fourth energy quantity, the instructions, when executed, cause the at least one processor to divide the fourth computation task into at least a fifth computation task and a sixth computation task, execute the first computation task and the fifth computation task, the first computation task to be executed at the first time, the fifth computation task to be executed at the second time, and execute the sixth computation task, the sixth computation task to be executed at a third time after the second time, the at least one processor in the sleep mode from the second time to the third time.

Example 18 includes the non-transitory computer readable storage medium of example 10, wherein the second computation task and the third computation task are radiofrequency operations of the BLE radio, and the instructions, when executed, cause the at least one processor to identify a fourth computation task to be executed, the fourth computation task not to be executed by the BLE radio, execute the fourth computation task when at least one of (i) the BLE radio is in a first BLE state or (ii) the power supply is in a first power supply state when the energy stored satisfies the energy threshold, and defer execution of the fourth computation task when at least one of (iii) the BLE radio is in a second BLE state different from the first BLE state or (iv) the power supply is in a second power supply state when the energy stored does not satisfy the energy threshold, wherein the fourth computation task is to be deferred until at least one of the BLE radio is in the first BLE state or the power supply is in the first power supply state.

Example 19 includes a method to manage a power profile of a network bridge of a field device in a process control environment, the method comprising determining whether to divide a first computation task into at least a second computation task and a third computation task based on (1) energy stored in a power supply associated with a Bluetooth Low Energy (BLE) radio of the network bridge and (2) a charging rate of the power supply, and when the first computation task is to be executed by the BLE radio and the first computation task is divided based on the determination instructing the BLE radio to enter a sleep mode after the second computation task is executed, and invoking the BLE radio to transition from the sleep mode to an operating mode to execute the third computation task, the invoking in response to a measurement associated with the power supply satisfying an energy threshold.

Example 20 includes the method of example 19, wherein the measurement is a first measurement and the energy threshold is a high-energy threshold, and further including obtaining a first interrupt from a first comparator, the first comparator to compare the first measurement to the high-energy threshold, obtaining a second interrupt from a second comparator, the second comparator to compare a second measurement associated with the power supply to a low-energy threshold, instructing the BLE radio to enter the operating mode when the first interrupt indicates the first measurement satisfies the high-energy threshold, and directing the BLE radio to enter the sleep mode when the second interrupt indicates the second measurement does not satisfy the low-energy threshold.

Example 21 includes the method of example 20, further including assigning a first data rate to the BLE radio when the charging rate is a first charging rate, adjusting the first data rate to a second data rate for the BLE radio when the first charging rate is changed to a second charging rate, the second charging rate less than the first charging rate, the second data rate less than the first data rate, and when the first computation task is to be executed by the BLE radio, facilitating communication of data between the BLE radio and a device separate from the field device based on the second data rate.

Example 22 includes the method of example 21, wherein adjusting the first data rate to the second data rate includes adjusting at least one of (1) a first data quantity to a second data quantity to be communicated during a radiofrequency operation, or (2) a first data interval to a second data interval, the first data interval and the second data interval corresponding to time durations between radiofrequency operations of the BLE radio.

Example 23 includes the method of example 22, wherein the field device is to charge the power supply, and further including determining a first charging rate of the power supply based on first data in a data buffer, the field device to write the first data to the data buffer, determining a power budget associated with the BLE radio based on the first charging rate, and adjusting the power budget when the first charging rate is changed to a second charging rate when the field device writes second data to the data buffer, the second charging rate different from the first charging rate, the second data different from the first data.

Example 24 includes the method of example 20, further including instructing the BLE radio to execute the second computation task by facilitating communication of a first data quantity between the BLE radio and a device separate from the field device at a first data interval when the charging rate is a first charging rate, and instructing the BLE radio to execute the second computation by facilitating communication of a second data quantity between the BLE radio and the device at a second data interval when the charging rate is a second charging rate, the second data quantity less than the first data quantity, the second data interval longer than the first data interval, the second charging rate less than the first charging rate, the first data interval and the second data interval corresponding to time durations between radiofrequency operations of the BLE radio.

Example 25 includes the method of example 20, wherein the energy threshold is a first energy threshold corresponding to a first energy quantity stored by the power supply, the first computation task is not to be executed by the BLE radio, and further including determining that a first task queue having a first priority includes the first computation task, determining that a second task queue having a second priority includes a fourth computation task, the first priority greater than the second priority, calculating a second energy quantity to execute the first computation task, calculating a third energy quantity to execute the fourth computation task, determining a difference between the first energy quantity and a sum of the second energy quantity and the third energy quantity, and when the difference is greater than a fourth energy quantity associated with a second energy threshold, executing the first computation task and the fourth computation task, the first computation task to be executed at a first time, the fourth computation task to be executed at a second time after the first time, the fourth energy quantity less than the first energy quantity.

Example 26 includes the method of example 25, when the difference is not greater than the fourth energy quantity, further including dividing the fourth computation task into at least a fifth computation task and a sixth computation task, executing the first computation task and the fifth computation task, the first computation task to be executed at the first time, the fifth computation task to be executed at the second time, and executing the sixth computation task, the sixth computation task to be executed at a third time after the second time, the network bridge in the sleep mode from the second time to the third time.

Example 27 includes the method of example 20, wherein the second computation task and the third computation task are radiofrequency operations of the BLE radio, and further including identifying a fourth computation task to be executed, the fourth computation task not to be executed by the BLE radio, executing the fourth computation task when at least one of (i) the BLE radio is in a first BLE state or (ii) the power supply is in a first power supply state when the energy stored satisfies the energy threshold, and deferring execution of the fourth computation task when at least one of (iii) the BLE radio is in a second BLE state different from the first BLE state or (iv) the power supply is in a second power supply state when the energy stored does not satisfy the energy threshold, wherein the fourth computation task is to be deferred until at least one of the BLE radio is in the first BLE state or the power supply is in the first power supply state.

Although certain example methods, apparatus, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage a power profile of a network bridge of a field device in a process control environment, the apparatus comprising:
   a Bluetooth Low Energy (BLE) radio; and
   a power manager to:
      determine a first charging rate of a power supply based on first data in a data buffer, the field device to write the first data to the data buffer;
      determine a power budget associated with the BLE radio based on the first charging rate;
      adjust the power budget in response to a change of the first charging rate to a second charging rate, the change to the second charging rate in response to a write by the field device of second data to the data buffer, the second charging rate different from the first charging rate, the second data different from the first data;
      determine whether to divide a first computation task into at least a second computation task and a third computation task based on (1) the power budget and (2) at least one of the first charging rate or the second charging rate of the power supply; and
      in response to a determination to divide the first computation task, after the first computation task is to be executed by the BLE radio:
         instruct the BLE radio to enter a sleep mode after the second computation task is executed; and
         invoke the BLE radio to transition from the sleep mode to an operating mode to execute the third computation task, the invocation in response to a measurement associated with the power supply satisfying a power budget threshold.

2. The apparatus of claim 1, wherein the measurement is a first measurement and the power budget threshold is a first power budget threshold, and further including:
   an input/output interface to:
      obtain a first interrupt from a first comparator, the first comparator to compare the first measurement to the first power budget threshold; and
      obtain a second interrupt from a second comparator, the second comparator to compare a second measurement associated with the power supply to a second power budget threshold, the first power budget threshold greater than the second power budget threshold; and
   the power manager to:
      instruct the BLE radio to enter the operating mode in response to a first indication based on the first interrupt that the first measurement satisfies the first power budget threshold; and direct the BLE radio to enter the sleep mode in response to a second indication based on the second interrupt that the second measurement does not satisfy the second power budget threshold.

3. The apparatus of claim 1, further including a BLE stack handler to:

assign a first data rate to the BLE radio based on the first charging rate;

adjust the first data rate to a second data rate for the BLE radio in response to the change of the first charging rate to the second charging rate, the second charging rate less than the first charging rate, the second data rate less than the first data rate; and after the first computation task is to be executed by the BLE radio, facilitate communication of data between the BLE radio and a device separate from the field device based on the second data rate.

4. The apparatus of claim 3, wherein the BLE stack handler is to adjust the first data rate to the second data rate in response to an adjustment of at least one of (1) a first data quantity to a second data quantity, or (2) a first data interval to a second data interval, the first data quantity or the second data quantity corresponding to a quantity of data to be communicated during a radiofrequency operation, the first data interval and the second data interval corresponding to time durations between radiofrequency operations of the BLE radio.

5. The apparatus of claim 1, further including a BLE stack handler to:

facilitate communication of a first data quantity between the BLE radio and a device separate from the field device at a first data interval based on the first charging rate to execute the second computation task; and facilitate communication of a second data quantity between the BLE radio and the device at a second data interval based on the second charging rate to execute the second computation task, the second data quantity less than the first data quantity, the second data interval longer than the first data interval, the second charging rate less than the first charging rate, the first data interval and the second data interval corresponding to time durations between radiofrequency operations of the BLE radio.

6. The apparatus of claim 1, wherein the power budget threshold is a first power budget threshold corresponding to a first energy quantity stored by the power supply, the first computation task is not to be executed by the BLE radio, and the power manager is to:

determine that a first task queue includes the first computation task, the first task queue having a first priority;

determine that a second task queue includes a fourth computation task, the second task queue having a second priority less than the first priority;

calculate a second energy quantity to execute the first computation task;

calculate a third energy quantity to execute the fourth computation task;

determine a difference between the first energy quantity and a sum of the second energy quantity and the third energy quantity; and in response to a determination that the difference is greater than a fourth energy quantity associated with a second power budget threshold, invoke a platform manager to execute the first computation task and the fourth computation task, the first computation task to be executed at a first time, the fourth computation task to be executed at a second time after the first time, the fourth energy quantity less than the first energy quantity.

7. The apparatus of claim 6, in response to a determination that the difference is not greater than the fourth energy quantity, the power manager is to:

divide the fourth computation task into at least a fifth computation task and a sixth computation task;

instruct the platform manager to execute the first computation task and the fifth computation task, the first computation task to be executed at the first time, the fifth computation task to be executed at the second time; and instruct the platform manager to execute the sixth computation task, the sixth computation task to be executed at a third time after the second time, the platform manager in the sleep mode from the second time to the third time.

8. The apparatus of claim 1, wherein the second computation task and the third computation task are radiofrequency operations of the BLE radio, and the power manager is to:

identify a fourth computation task to be executed, the fourth computation task not to be executed by the BLE radio;

invoke a platform manager to execute the fourth computation task in response to at least one of (i) the BLE radio is in a first BLE state or (ii) the power supply is in a first power supply state in response to the power budget satisfying the power budget threshold; and invoke the platform manager to defer execution of the fourth computation task in response to at least one of (iii) the BLE radio is in a second BLE state different from the first BLE state or (iv) the power supply is in a second power supply state in response to the power budget not satisfying the power budget threshold, wherein the fourth computation task is to be deferred until at least one of the BLE radio is in the first BLE state or the power supply is in the first power supply state.

9. The apparatus of claim 1, wherein the field device is a valve controller, a pressure transmitter, a temperature transmitter, a level transmitter, a pH transmitter, or a valve positioner.

10. A non-transitory computer readable storage medium comprising instructions that, when executed, cause at least one processor of a network bridge of a field device in a process control environment to at least:

determine a first charging rate of a power supply based on first data in a data buffer, the field device to write the first data to the data buffer;

determine a power budget associated with the BLE radio based on the first charging rate;

adjust the power budget in response to a change of the first charging rate to a second charging rate, the change to the second charging rate in response to a write by the field device of second data to the data buffer, the second charging rate different from the first charging rate, the second data different from the first data;

determine whether to divide a first computation task into at least a second computation task and a third computation task based on (1) power budget and (2) at least one of the first charging rate or the second charging rate of the power supply; and in response to a determination to divide the first computation task, after the first computation task is to be executed by the BLE radio:

instruct the BLE radio to enter a sleep mode after the second computation task is executed; and invoke the BLE radio to transition from the sleep mode to an operating mode to execute the third computation task, the invocation in response to a measurement associated with the power supply satisfying a power budget threshold.

11. The non-transitory computer readable storage medium of claim 10, wherein the measurement is a first measurement and the power budget threshold is a first power budget threshold, and the instructions, when executed, cause the at least one processor to:

obtain a first interrupt from a first comparator, the first comparator is to compare the first measurement to the first power budget threshold;

obtain a second interrupt from a second comparator, the second comparator is to compare a second measurement associated with the power supply to a second power budget threshold;

instruct the BLE radio to enter the operating mode in response to a first indication based on the first interrupt that the first measurement satisfies the first power budget threshold; and direct the BLE radio to enter the sleep mode in response to a second indication based on the second interrupt that the second measurement does not satisfy the second power budget threshold.

12. The non-transitory computer readable storage medium of claim 10, wherein the instructions, when executed, cause the at least one processor to:

assign a first data rate to the BLE radio based on the first charging rate;

adjust the first data rate to a second data rate for the BLE radio in response to the change of the first charging rate to the second charging rate, the second charging rate less than the first charging rate, the second data rate less than the first data rate; and after the first computation task is to be executed by the BLE radio, facilitate communication of data between the BLE radio and a device separate from the field device based on the second data rate.

13. The non-transitory computer readable storage medium of claim 12, wherein the instructions, when executed, cause the at least one processor to adjust the first data rate to the second data rate in response to an adjustment of at least one of (1) a first data quantity to a second data quantity, or (2) a first data interval to a second data interval, the first data quantity or the second data quantity corresponding to a quantity of data to be communicated during a radiofrequency operation, the first data interval and the second data interval corresponding to time durations between radiofrequency operations of the BLE radio.

14. The non-transitory computer readable storage medium of claim 10, wherein the instructions, when executed, cause the at least one processor to:

facilitate communication of a first data quantity between the BLE radio and a device separate from the field device at a first data interval based on the first charging rate to execute the second computation task; and facilitate communication of a second data quantity between the BLE radio and the device at a second data interval based on the second charging rate to execute the second computation task, the second data quantity less than the first data quantity, the second data interval longer than the first data interval, the second charging rate less than the first charging rate, the first data interval and the second data interval corresponding to time durations between radiofrequency operations of the BLE radio.

15. The non-transitory computer readable storage medium of claim 10, wherein the power budget threshold is a first power budget threshold corresponding to a first energy quantity stored by the power supply, the first computation task is not to be executed by the BLE radio, and the instructions, when executed, cause the at least one processor to:

determine that a first task queue includes the first computation task, the first task queue having a first priority;

determine that a second task queue includes a fourth computation task, the second task queue having a second priority less than the first priority;

calculate a second energy quantity to execute the first computation task;

calculate a third energy quantity to execute the fourth computation task;

determine a difference between the first energy quantity and a sum of the second energy quantity and the third energy quantity; and in response to a determination that the difference is greater than a fourth energy quantity associated with a second power budget threshold, execute the first computation task and the fourth computation task, the first computation task to be executed at a first time, the fourth computation task to be executed at a second time after the first time, the fourth energy quantity less than the first energy quantity.

16. The non-transitory computer readable storage medium of claim 15, in response to a determination that the difference is not greater than the fourth energy quantity, the instructions, when executed, cause the at least one processor to:

divide the fourth computation task into at least a fifth computation task and a sixth computation task;

execute the first computation task and the fifth computation task, the first computation task to be executed at the first time, the fifth computation task to be executed at the second time; and execute the sixth computation task, the sixth computation task to be executed at a third time after the second time, the at least one processor in the sleep mode from the second time to the third time.

17. The non-transitory computer readable storage medium of claim 10, wherein the second computation task and the third computation task are radiofrequency operations of the BLE radio, and the instructions, when executed, cause the at least one processor to:

identify a fourth computation task to be executed, the fourth computation task not to be executed by the BLE radio;

execute the fourth computation task in response to at least one of (i) the BLE radio is in a first BLE state or (ii) the power supply is in a first power supply state in response to the power budget satisfying the power budget threshold; and defer execution of the fourth computation task in response to at least one of (iii) the BLE radio is in a second BLE state different from the first BLE state or (iv) the power supply is in a second power supply state in response to the power budget not satisfying the power budget threshold, wherein the fourth computation task is to be deferred until at least one of the BLE radio is in the first BLE state or the power supply is in the first power supply state.

18. The non-transitory computer readable storage medium of claim 9, wherein the field device is a valve controller, a pressure transmitter, a temperature transmitter, a level transmitter, a pH transmitter, or a valve positioner.

19. A method to manage a power profile of a network bridge of a field device in a process control environment, the method comprising:
   determining a first charging rate of a power supply based on first data in a data buffer, the field device to write the first data to the data buffer;
   determining a power budget associated with the BLE radio based on the first charging rate;
   adjusting the power budget in response to a change of the first charging rate to a second charging rate, the change to the second charging rate in response to a write by the field device of second data to the data buffer, the second charging rate different from the first charging rate, the second data different from the first data;
   determining whether to divide a first computation task into at least a second computation task and a third computation task based on (1) the power budget and (2) at least one of the first charging rate or the second charging rate of the power supply; and
   in response to a determination to divide the first computation task, after the first computation task is to be executed by the BLE radio:
      instructing the BLE radio to enter a sleep mode after the second computation task is executed; and
      invoking the BLE radio to transition from the sleep mode to an operating mode to execute the third computation task, the invoking in response to a measurement associated with the power supply satisfying a power budget threshold.

20. The method of claim 19, wherein the measurement is a first measurement and the power budget threshold is a first power budget threshold, and further including:
   obtaining a first interrupt from a first comparator, the first comparator to compare the first measurement to the first power budget threshold;
   obtaining a second interrupt from a second comparator, the second comparator to compare a second measurement associated with the power supply to second power budget threshold, the first power budget threshold greater than the second power budget threshold;
   instructing the BLE radio to enter the operating mode in response to a first indication based on the first interrupt that the first measurement satisfies the first power budget threshold; and
   directing the BLE radio to enter the sleep mode in response to a second indication based on the second interrupt that the second measurement does not satisfy the second power budget threshold.

21. The method of claim 19, further including:
   assigning a first data rate to the BLE radio based on the first charging rate;
   adjusting the first data rate to a second data rate for the BLE radio in response to the change of the first charging rate to the second charging rate, the second charging rate less than the first charging rate, the second data rate less than the first data rate; and
   after the first computation task is to be executed by the BLE radio, facilitating communication of data between the BLE radio and a device separate from the field device based on the second data rate.

22. The method of claim 21, wherein adjusting the first data rate to the second data rate includes adjusting at least one of (1) a first data quantity to a second data quantity, or (2) a first data interval to a second data interval, the first data quantity or the second data quantity corresponding to a quantity of data to be communicated during a radiofrequency operation, the first data interval and the second data interval corresponding to time durations between radiofrequency operations of the BLE radio.

23. The method of claim 21, further including:
   based on the first charging rate, instructing the BLE radio to execute the second computation task by facilitating communication of a first data quantity between the BLE radio and a device separate from the field device at a first data interval; and
   based on the second charging rate, instructing the BLE radio to execute the second computation task by facilitating communication of a second data quantity between the BLE radio and the device at a second data interval, the second data quantity less than the first data quantity, the second data interval longer than the first data interval, the second charging rate less than the first charging rate, the first data interval and the second data interval corresponding to time durations between radiofrequency operations of the BLE radio.

24. The method of claim 19, wherein the power budget threshold is a first power budget threshold corresponding to a first energy quantity stored by the power supply, the first computation task is not to be executed by the BLE radio, and further including:
   determining that a first task queue includes the first computation task, the first task queue having a first priority;
   determining that a second task queue includes a fourth computation task, the second task queue having a second priority less than the first priority;
   calculating a second energy quantity to execute the first computation task;
   calculating a third energy quantity to execute the fourth computation task;
   determining a difference between the first energy quantity and a sum of the second energy quantity and the third energy quantity; and
   in response to determining that the difference is greater than a fourth energy quantity associated with a second power budget threshold, executing the first computation task and the fourth computation task, the first computation task to be executed at a first time, the fourth computation task to be executed at a second time after the first time, the fourth energy quantity less than the first energy quantity.

25. The method of claim 24, in response to determining that the difference is not greater than the fourth energy quantity, further including:
   dividing the fourth computation task into at least a fifth computation task and a sixth computation task;
   executing the first computation task and the fifth computation task, the first computation task to be executed at the first time, the fifth computation task to be executed at the second time; and
   executing the sixth computation task, the sixth computation task to be executed at a third time after the second time, the network bridge in the sleep mode from the second time to the third time.

26. The method of claim 19, wherein the second computation task and the third computation task are radiofrequency operations of the BLE radio, and further including:
   identifying a fourth computation task to be executed, the fourth computation task not to be executed by the BLE radio;

executing the fourth computation task in response to at least one of (i) the BLE radio is in a first BLE state or (ii) the power supply is in a first power supply state in response to the power budget satisfying the power budget threshold; and deferring execution of the fourth computation task in response to at least one of (iii) the BLE radio is in a second BLE state different from the first BLE state or (iv) the power supply is in a second power supply state in response to the power budget not satisfying the power budget threshold, wherein the fourth computation task is to be deferred until at least one of the BLE radio is in the first BLE state or the power supply is in the first power supply state.

27. The method of claim 19, wherein the field device is a valve controller, a pressure transmitter, a temperature transmitter, a level transmitter, a pH transmitter, or a valve positioner.

\* \* \* \* \*